(12) United States Patent
Newhouse et al.

(10) Patent No.: US 12,294,086 B2
(45) Date of Patent: May 6, 2025

(54) LOW COST METAL ELECTRODES

(71) Applicant: FORM ENERGY INC., Somerville, MA (US)

(72) Inventors: Jocelyn Marie Newhouse, Somerville, MA (US); Jarrod David Milshtein, Cambridge, MA (US); Rupak Chakraborty, Brookline, MA (US); Amelie Nina Kharey, Cambridge, MA (US); William Henry Woodford, Cambridge, MA (US); Yet-Ming Chiang, Weston, MA (US); Michael Gibson, Philadelphia, PA (US); Annelise Christine Thompson, Medford, MA (US); Weston Smith, Boston, MA (US); Joseph Anthony Pantano, Canton, MA (US); Isabella Caruso, Cambridge, MA (US); Benjamin Thomas Hultman, Somerville, MA (US); Max Rae Chu, Brookline, MA (US); Liang Su, Medfield, MA (US); Nicholas Perkins, Cambridge, MA (US); Florian Wehner, Brookline, MA (US); Rebecca Eisenach, Somerville, MA (US); Mitchell Terrance Westwood, Cambridge, MA (US); Tristan Gilbert, Evergreen, CO (US);
(Continued)

(73) Assignee: FORM ENERGY, INC., Somerville, MA (US)

( * ) Notice: Subject to any disclaimer, the term of this patent is extended or adjusted under 35 U.S.C. 154(b) by 126 days.

(21) Appl. No.: 16/938,862

(22) Filed: Jul. 24, 2020

(65) Prior Publication Data
US 2021/0028457 A1    Jan. 28, 2021

Related U.S. Application Data

(60) Provisional application No. 63/021,566, filed on May 7, 2020, provisional application No. 62/879,126, filed on Jul. 26, 2019.

(51) Int. Cl.
*H01M 4/58* (2010.01)
*H01M 4/04* (2006.01)
(Continued)

(52) U.S. Cl.
CPC ........... *H01M 4/58* (2013.01); *H01M 4/0438* (2013.01); *H01M 4/628* (2013.01); *H01M 4/661* (2013.01);
(Continued)

(58) Field of Classification Search
None
See application file for complete search history.

(56) References Cited

U.S. PATENT DOCUMENTS

| 678,722 A | 7/1901 | Edison |
| 692,507 A | 2/1902 | Edison |

(Continued)

FOREIGN PATENT DOCUMENTS

| CA | 3105128 A1 | 1/2020 |
| CN | 1271186 A | 10/2000 |

(Continued)

OTHER PUBLICATIONS

Al, W. et al., "A Novel Graphene-Polysulfide Anode Material for High-Performance Lithium-Ion Batteries," Scientific Reports, vol. 3, No. 234, pp. 1-5, DOI: 10.1038/srep0234, (2013).
(Continued)

*Primary Examiner* — Tracy M Dove
(74) *Attorney, Agent, or Firm* — The Marbury Law Group, PLLC

(57) ABSTRACT

Systems and methods of the various embodiments may provide metal electrodes for electrochemical cells. In vari-
(Continued)

ous embodiments, the electrodes may comprise iron. Various methods may enable achieving high surface area with low cost for production of metal electrodes, such as iron electrodes.

27 Claims, 30 Drawing Sheets

(72) Inventors: Andrew Liotta, Cambridge, MA (US); Thomas Conry, San Francisco, CA (US); Rachel Elizabeth Mumma, Somerville, MA (US); Brandon Uber, Boston, MA (US); Eric Weber, Pittsburgh, PA (US); Danielle Cassidy Smith, Cambridge, MA (US); Brooke Wojeski, Somerville, MA (US)

(51) Int. Cl.
*H01M 4/24* (2006.01)
*H01M 4/62* (2006.01)
*H01M 4/66* (2006.01)
*H01M 10/26* (2006.01)
H01M 4/02 (2006.01)

(52) U.S. Cl.
CPC ...... *H01M 10/26* (2013.01); *H01M 2004/021* (2013.01)

(56) References Cited

U.S. PATENT DOCUMENTS

| | | |
|---|---|---|
| 983,430 A | 2/1911 | Estelle |
| 1,940,385 A | 12/1933 | Karl et al. |
| 1,988,861 A | 1/1935 | Ernst et al. |
| 2,104,973 A | 1/1938 | Adolf et al. |
| 2,131,592 A | 9/1938 | Erich et al. |
| 2,571,927 A | 10/1951 | Georg et al. |
| 2,643,276 A | 6/1953 | Salauze |
| 2,646,454 A | 7/1953 | Victor et al. |
| 2,661,387 A | 12/1953 | Karl et al. |
| 2,683,182 A | 7/1954 | Salauze |
| 2,798,110 A | 7/1957 | Freimut et al. |
| 2,862,989 A | 12/1958 | Strauss |
| 2,871,281 A | 1/1959 | Moulton et al. |
| 2,905,739 A | 9/1959 | Strauss |
| 2,915,576 A | 12/1959 | Strauss |
| 2,920,127 A | 1/1960 | Hans et al. |
| 2,930,829 A | 3/1960 | Jacquier et al. |
| 2,980,747 A | 4/1961 | Daley et al. |
| 2,980,748 A | 4/1961 | Jean et al. |
| 2,988,584 A | 6/1961 | Freimut et al. |
| 2,988,585 A | 6/1961 | Freimut et al. |
| 2,994,728 A | 8/1961 | Andre et al. |
| 2,997,516 A | 8/1961 | Friiz et al. |
| 3,003,014 A | 10/1961 | Fritz et al. |
| 3,055,963 A | 9/1962 | Willi et al. |
| 3,059,041 A | 10/1962 | Hans et al. |
| 3,066,178 A | 11/1962 | Winkler |
| 3,080,440 A | 3/1963 | Paul et al. |
| 3,096,215 A | 7/1963 | Ernst et al. |
| 3,117,033 A | 1/1964 | Fri et al. |
| 3,174,879 A | 3/1965 | Douchan et al. |
| 3,226,260 A | 12/1965 | Drengler |
| 3,262,815 A | 7/1966 | Alois et al. |
| 3,266,936 A | 8/1966 | Willi et al. |
| 3,323,951 A | 6/1967 | Kreiselmaier |
| 3,326,676 A | 6/1967 | Werner et al. |
| 3,342,639 A | 9/1967 | Rodolphe et al. |
| 3,345,212 A | 10/1967 | Schweitzer |
| 3,378,406 A | 4/1968 | Rosansky |
| 3,393,094 A | 7/1968 | Douchan et al. |
| 3,424,618 A | 1/1969 | Weilnbock et al. |
| 3,438,812 A | 4/1969 | Cherney et al. |
| 3,462,303 A | 8/1969 | Reber et al. |
| 3,484,291 A | 12/1969 | MacKenzie et al. |
| 3,507,696 A | 4/1970 | Jackovitz et al. |
| 3,525,640 A | 8/1970 | McCormick et al. |
| 3,526,822 A | 9/1970 | Dickfeldt et al. |
| 3,527,613 A | 9/1970 | Hardman et al. |
| 3,598,653 A | 8/1971 | Fukuda et al. |
| 3,622,398 A | 11/1971 | Sekido et al. |
| 3,630,778 A | 12/1971 | Kreidl et al. |
| 3,647,544 A | 3/1972 | Schneider |
| 3,650,835 A | 3/1972 | Jackovitz et al. |
| 3,679,482 A | 7/1972 | Hardman et al. |
| 3,701,691 A | 10/1972 | Sassmannshausen et al. |
| 3,713,889 A | 1/1973 | Lecouffe |
| 3,785,867 A | 1/1974 | Edwards et al. |
| 3,802,878 A | 4/1974 | Lindstrom |
| 3,819,413 A | 6/1974 | Nippe et al. |
| 3,836,397 A | 9/1974 | Hardman |
| 3,847,603 A | 11/1974 | Fukuda et al. |
| 3,847,668 A | 11/1974 | Kramer et al. |
| 3,849,198 A | 11/1974 | Seidel |
| 3,853,624 A | 12/1974 | Brown et al. |
| 3,871,921 A | 3/1975 | Beatty et al. |
| 3,895,961 A | 7/1975 | Gutridge |
| 3,898,098 A | 8/1975 | Giles |
| 3,898,099 A | 8/1975 | Baker et al. |
| 3,918,989 A | 11/1975 | Gillman et al. |
| 3,947,292 A | 3/1976 | Jackovitz et al. |
| 3,976,502 A | 8/1976 | Sekido et al. |
| 3,977,906 A | 8/1976 | Beatty et al. |
| 3,980,501 A | 9/1976 | Feder et al. |
| 3,982,966 A | 9/1976 | Beatty et al. |
| 3,987,266 A | 10/1976 | Betz |
| 3,993,504 A | 11/1976 | Kramer et al. |
| 4,000,004 A | 12/1976 | Takahashi et al. |
| 4,011,365 A | 3/1977 | Lindstrom |
| 4,021,911 A | 5/1977 | Kononenko et al. |
| 4,032,693 A | 6/1977 | Lindstrom |
| 4,037,033 A | 7/1977 | Takamura et al. |
| 4,049,878 A | 9/1977 | Lindstrom |
| 4,064,331 A | 12/1977 | Patton et al. |
| 4,078,120 A | 3/1978 | Lindstrom |
| 4,083,940 A | 4/1978 | Das |
| 4,091,178 A | 5/1978 | Kordesch |
| 4,109,060 A | 8/1978 | Andersson et al. |
| 4,123,568 A | 10/1978 | Kononenko et al. |
| 4,132,547 A | 1/1979 | Buzzelli et al. |
| 4,143,212 A | 3/1979 | Ueno et al. |
| 4,166,886 A | 9/1979 | Bonnaterre |
| 4,168,349 A | 9/1979 | Buzzelli |
| 4,207,383 A | 6/1980 | Oliapuram |
| 4,236,927 A | 12/1980 | Buhl et al. |
| 4,246,324 A | 1/1981 | de Nora et al. |
| 4,250,236 A | 2/1981 | Haschka et al. |
| 4,320,184 A | 3/1982 | Bernstein et al. |
| 4,332,869 A | 6/1982 | Margalit et al. |
| 4,335,192 A | 6/1982 | Oliapuram |
| 4,356,027 A | 10/1982 | Sugiyama et al. |
| 4,356,101 A | 10/1982 | Jackovitz et al. |
| 4,383,015 A | 5/1983 | Buzzelli |
| 4,384,928 A | 5/1983 | Hall |
| 4,434,214 A | 2/1984 | Suzuki |
| 4,436,795 A | 3/1984 | Cooper et al. |
| 4,447,509 A | 5/1984 | Maskalick |
| 4,448,858 A | 5/1984 | Graf et al. |
| 4,448,860 A | 5/1984 | Von et al. |
| 4,450,211 A | 5/1984 | Vignaud |
| 4,474,862 A | 10/1984 | Buzzelli et al. |
| 4,485,154 A | 11/1984 | Remick et al. |
| 4,519,425 A | 5/1985 | Seidel |
| 4,552,630 A | 11/1985 | Wheeler et al. |
| 4,643,959 A | 2/1987 | Glotzl et al. |
| 4,680,100 A | 7/1987 | Morin |
| 4,689,880 A | 9/1987 | Brezillon et al. |
| 4,735,874 A | 4/1988 | Glotzel et al. |
| 4,804,390 A | 2/1989 | Lloyd et al. |
| 4,826,744 A | 5/1989 | Itou et al. |
| 4,828,942 A | 5/1989 | Licht |

(56) References Cited

U.S. PATENT DOCUMENTS

| | | |
|---|---|---|
| 4,842,963 A | 6/1989 | Ross, Jr. |
| 4,863,484 A | 9/1989 | Beauchamp et al. |
| 4,897,324 A | 1/1990 | Glaser |
| 4,900,642 A | 2/1990 | Tomantschger et al. |
| 4,925,747 A | 5/1990 | Kordesch et al. |
| 4,950,561 A | 8/1990 | Niksa et al. |
| 4,957,827 A | 9/1990 | Kordesch et al. |
| 4,977,044 A | 12/1990 | Ludwig |
| 5,011,747 A | 4/1991 | Strong et al. |
| 5,043,234 A | 8/1991 | Tomantschger et al. |
| 5,077,151 A | 12/1991 | Yasuda et al. |
| 5,122,426 A | 6/1992 | Simon et al. |
| 5,143,799 A | 9/1992 | Tsenter |
| 5,145,752 A | 9/1992 | Goldstein et al. |
| 5,162,169 A | 11/1992 | Tomantschger et al. |
| 5,190,833 A | 3/1993 | Goldstein et al. |
| 5,254,414 A | 10/1993 | Tsenter |
| 5,281,495 A | 1/1994 | Hirakawa et al. |
| 5,290,640 A | 3/1994 | Tsenter et al. |
| 5,300,371 A | 4/1994 | Tomantschger et al. |
| 5,397,532 A | 3/1995 | Blaimschein |
| 5,405,719 A | 4/1995 | Sonoda et al. |
| 5,411,815 A | 5/1995 | Goldstein |
| 5,415,949 A | 5/1995 | Stone et al. |
| 5,429,885 A | 7/1995 | Stockburger et al. |
| 5,432,022 A | 7/1995 | Cheiky |
| 5,441,820 A | 8/1995 | Siu et al. |
| 5,447,805 A | 9/1995 | Harats et al. |
| 5,447,806 A | 9/1995 | Hoge et al. |
| 5,451,475 A | 9/1995 | Ohta et al. |
| 5,549,991 A | 8/1996 | Licht et al. |
| 5,569,551 A | 10/1996 | Pedicini et al. |
| 5,569,554 A | 10/1996 | Tsenter |
| 5,576,116 A | 11/1996 | Sanchez et al. |
| 5,595,949 A | 1/1997 | Goldstein et al. |
| 5,665,481 A | 9/1997 | Shuster et al. |
| 5,700,596 A | 12/1997 | Ikoma et al. |
| 5,733,384 A | 3/1998 | Cao et al. |
| 5,753,384 A | 5/1998 | Kimberg |
| 5,773,163 A | 6/1998 | Suzuki et al. |
| 5,780,184 A | 7/1998 | Coco et al. |
| 5,788,943 A | 8/1998 | Aladjov |
| 5,789,097 A | 8/1998 | Kistrup et al. |
| 6,183,899 B1 | 2/2001 | Sanchez et al. |
| 6,194,098 B1 | 2/2001 | Ying et al. |
| 6,210,832 B1 | 4/2001 | Visco et al. |
| 6,228,535 B1 | 5/2001 | Fierro et al. |
| 6,249,940 B1 | 6/2001 | Asano et al. |
| 6,268,085 B1 | 7/2001 | Manthiram et al. |
| 6,333,123 B1 | 12/2001 | Davis et al. |
| 6,358,643 B1 | 3/2002 | Katz et al. |
| 6,392,389 B1 | 5/2002 | Kohler |
| 6,410,160 B1 | 6/2002 | Landin et al. |
| 6,416,649 B1 | 7/2002 | Ray et al. |
| 6,458,480 B1 | 10/2002 | Morris et al. |
| 6,475,658 B1 | 11/2002 | Pedicini et al. |
| 6,489,056 B1 | 12/2002 | Davis et al. |
| 6,537,701 B1 | 3/2003 | Nimon et al. |
| 6,620,548 B1 | 9/2003 | Satoguchi et al. |
| 6,673,483 B2 | 1/2004 | Jordy et al. |
| 6,680,140 B1 | 1/2004 | Berlureau et al. |
| 6,777,129 B2 | 8/2004 | Komori et al. |
| 6,849,172 B2 | 2/2005 | Rigby et al. |
| 6,849,356 B2 | 2/2005 | Dow et al. |
| 6,918,945 B2 | 7/2005 | Jenosono et al. |
| 6,994,933 B1 | 2/2006 | Bates |
| 7,060,388 B2 | 6/2006 | Naruoka |
| 7,070,632 B1 | 7/2006 | Yisco et al. |
| 7,112,383 B2 | 9/2006 | Konabe |
| 7,261,970 B2 | 8/2007 | Young et al. |
| 7,527,890 B2 | 5/2009 | Kodama et al. |
| 8,168,337 B2 | 5/2012 | Friesen et al. |
| 8,309,259 B2 | 11/2012 | Friesen et al. |
| 8,329,346 B2 | 12/2012 | Janse Van Rensburg et al. |
| 8,397,508 B2 | 3/2013 | Weimer et al. |
| 8,480,932 B2 | 7/2013 | Takeuchi et al. |
| 8,486,563 B2 | 7/2013 | Chou et al. |
| 8,491,763 B2 | 7/2013 | Friesen |
| 8,492,052 B2 | 7/2013 | Friesen et al. |
| 8,563,150 B2 | 10/2013 | Bugnet et al. |
| 8,659,268 B2 | 2/2014 | Krishnan et al. |
| 8,703,332 B2 | 4/2014 | Patoux et al. |
| 8,728,671 B1 | 5/2014 | Brost et al. |
| 8,741,491 B2 | 6/2014 | Wolfe et al. |
| 8,758,948 B2 | 6/2014 | Narayan et al. |
| 8,859,145 B2 | 10/2014 | Stevanovic et al. |
| 8,877,391 B2 | 11/2014 | Friesen et al. |
| 8,895,197 B2 | 11/2014 | Friesen et al. |
| 8,904,626 B2 | 12/2014 | Liu et al. |
| 8,906,563 B2 | 12/2014 | Friesen et al. |
| 8,911,910 B2 | 12/2014 | Krishnan et al. |
| 8,920,969 B2 | 12/2014 | Issaev et al. |
| 9,065,120 B2 | 6/2015 | Carlson |
| 9,105,910 B2 | 8/2015 | Friesen et al. |
| 9,105,946 B2 | 8/2015 | Friesen et al. |
| 9,136,563 B2 | 9/2015 | Hucker et al. |
| 9,147,919 B2 | 9/2015 | Friesen et al. |
| 9,172,123 B2 | 10/2015 | Albertus et al. |
| 9,178,207 B2 | 11/2015 | Friesen et al. |
| 9,214,830 B2 | 12/2015 | Friesen et al. |
| 9,263,779 B2 | 2/2016 | Lee et al. |
| 9,269,995 B2 | 2/2016 | Friesen et al. |
| 9,269,996 B2 | 2/2016 | Friesen et al. |
| 9,287,592 B2 | 3/2016 | Gifford et al. |
| 9,368,486 B2 | 6/2016 | Licht |
| 9,368,788 B2 | 6/2016 | Ogg et al. |
| 9,419,273 B2 | 8/2016 | Kakeya et al. |
| 9,450,233 B2 | 9/2016 | Ogg |
| 9,478,793 B2 | 10/2016 | Ogg et al. |
| 9,478,806 B2 | 10/2016 | Ogg et al. |
| 9,537,144 B2 | 1/2017 | Huang et al. |
| 9,559,385 B2 | 1/2017 | Ogg et al. |
| 9,577,298 B2 | 2/2017 | Narayan et al. |
| 9,583,779 B2 | 2/2017 | Chiang et al. |
| 9,660,265 B2 | 5/2017 | Visco et al. |
| 9,680,151 B2 | 6/2017 | Mullins |
| 9,680,154 B2 | 6/2017 | Chen et al. |
| 9,728,774 B2 | 8/2017 | Schuh et al. |
| 9,732,409 B2 | 8/2017 | Ogg et al. |
| 9,755,231 B2 | 9/2017 | Lee et al. |
| 9,780,379 B2 | 10/2017 | Zhamu et al. |
| 9,816,170 B2 | 11/2017 | Ogg et al. |
| 9,843,064 B2 | 12/2017 | Brandon et al. |
| 9,893,397 B2 | 2/2018 | Yoshida et al. |
| 9,911,985 B2 | 3/2018 | Dong et al. |
| 9,941,548 B2 | 4/2018 | Vu et al. |
| 9,947,481 B2 | 4/2018 | Solomon et al. |
| 9,972,874 B2 | 5/2018 | Toussaint et al. |
| 10,008,754 B2 | 6/2018 | Englert |
| 10,014,530 B2 | 7/2018 | Lang et al. |
| 10,033,036 B2 | 7/2018 | Christensen et al. |
| 10,044,082 B2 | 8/2018 | Suyama et al. |
| 10,147,988 B2 | 12/2018 | Park et al. |
| 10,177,417 B2 | 1/2019 | Van et al. |
| 10,177,426 B2 | 1/2019 | Nitta |
| 10,522,840 B2 | 12/2019 | Gayden |
| 2002/0010261 A1 | 1/2002 | Callahan et al. |
| 2002/0061427 A1 | 5/2002 | Vu et al. |
| 2002/0142202 A1 | 10/2002 | Li et al. |
| 2002/0142203 A1 | 10/2002 | Ma et al. |
| 2002/0146600 A1 | 10/2002 | Vartak et al. |
| 2002/0155351 A1 | 10/2002 | Licht |
| 2002/0160247 A1 | 10/2002 | Tzeng et al. |
| 2002/0177036 A1 | 11/2002 | Faris |
| 2003/0049520 A1 | 3/2003 | Davis et al. |
| 2004/0031143 A1 | 2/2004 | Morris et al. |
| 2004/0069622 A1 | 4/2004 | Martelli et al. |
| 2004/0197643 A1 | 10/2004 | Buckle |
| 2004/0221426 A1 | 11/2004 | Igawa et al. |
| 2004/0265684 A1 | 12/2004 | Faris et al. |
| 2005/0042503 A1 | 2/2005 | Kim et al. |
| 2005/0048351 A1 | 3/2005 | Hood et al. |
| 2005/0123815 A1 | 6/2005 | Tsai et al. |
| 2006/0040174 A1 | 2/2006 | Peabody |

(56) References Cited

U.S. PATENT DOCUMENTS

| | | |
|---|---|---|
| 2006/0194107 A1 | 8/2006 | Licht |
| 2007/0077491 A1 | 4/2007 | Burchardt |
| 2007/0202365 A1 | 8/2007 | Sawa et al. |
| 2008/0131762 A1 | 6/2008 | Joo et al. |
| 2008/0145721 A1 | 6/2008 | Shapiro et al. |
| 2008/0261094 A1 | 10/2008 | Licht et al. |
| 2009/0130539 A1 | 5/2009 | Van Burdine |
| 2009/0284229 A1 | 11/2009 | Friesen et al. |
| 2010/0043824 A1 | 2/2010 | Greeley et al. |
| 2010/0062313 A1 | 3/2010 | Browning et al. |
| 2010/0069228 A1 | 3/2010 | Dopp et al. |
| 2010/0119895 A1 | 5/2010 | Friesen |
| 2010/0119919 A1 | 5/2010 | Iarochenko et al. |
| 2010/0143824 A1 | 6/2010 | Tucker et al. |
| 2010/0285375 A1 | 11/2010 | Friesen et al. |
| 2010/0310905 A1 | 12/2010 | Oriet et al. |
| 2010/0316935 A1 | 12/2010 | Friesen et al. |
| 2011/0020534 A1 | 1/2011 | Chou et al. |
| 2011/0027648 A1 | 2/2011 | Rolison et al. |
| 2011/0070487 A1 | 3/2011 | Padhi et al. |
| 2011/0070506 A1 | 3/2011 | Friesen et al. |
| 2011/0086278 A1 | 4/2011 | Friesen et al. |
| 2011/0114496 A1 | 5/2011 | Dopp et al. |
| 2011/0200893 A1 | 8/2011 | Friesen et al. |
| 2011/0250512 A1 | 10/2011 | Friesen et al. |
| 2011/0300429 A1 | 12/2011 | MsWHORTER |
| 2011/0316485 A1 | 12/2011 | Krishnan et al. |
| 2012/0015264 A1 | 1/2012 | Friesen et al. |
| 2012/0021303 A1 | 1/2012 | Amendola et al. |
| 2012/0034498 A1 | 2/2012 | Hsu et al. |
| 2012/0052404 A1 | 3/2012 | Friesen et al. |
| 2012/0068667 A1 | 3/2012 | Friesen et al. |
| 2012/0070746 A1 | 3/2012 | Mikhaylik et al. |
| 2012/0098499 A1 | 4/2012 | Friesen et al. |
| 2012/0139496 A1 | 6/2012 | Krishnan et al. |
| 2012/0140378 A1 | 6/2012 | Tan et al. |
| 2012/0171594 A1 | 7/2012 | Mizuno et al. |
| 2012/0187918 A1 | 7/2012 | Narayan et al. |
| 2012/0202127 A1 | 8/2012 | Friesen et al. |
| 2012/0295172 A1 | 11/2012 | Peled et al. |
| 2012/0321969 A1 | 12/2012 | Friesen et al. |
| 2013/0022881 A1 | 1/2013 | Friesen et al. |
| 2013/0095393 A1 | 4/2013 | Friesen et al. |
| 2013/0115523 A1 | 5/2013 | Friesen et al. |
| 2013/0115525 A1 | 5/2013 | Friesen et al. |
| 2013/0115526 A1 | 5/2013 | Friesen et al. |
| 2013/0115531 A1 | 5/2013 | Amendola et al. |
| 2013/0115533 A1 | 5/2013 | Friesen et al. |
| 2013/0122344 A1 | 5/2013 | Msco et al. |
| 2013/0149615 A1* | 6/2013 | Narayan ............... H01M 4/366 427/126.3 |
| 2013/0183591 A1 | 7/2013 | Dickson |
| 2013/0189592 A1 | 7/2013 | Roumi et al. |
| 2013/0285597 A1 | 10/2013 | Goldstein |
| 2013/0295471 A1 | 11/2013 | Visco et al. |
| 2014/0075745 A1 | 3/2014 | Lu et al. |
| 2014/0091631 A1 | 4/2014 | Naden et al. |
| 2014/0162129 A1 | 6/2014 | Kim et al. |
| 2014/0217985 A1 | 8/2014 | Gifford et al. |
| 2014/0220256 A1 | 8/2014 | Ogg |
| 2014/0220432 A1 | 8/2014 | Ogg et al. |
| 2014/0220434 A1 | 8/2014 | Ogg |
| 2014/0220435 A1 | 8/2014 | Ogg et al. |
| 2014/0220440 A1 | 8/2014 | Ogg |
| 2014/0220460 A1 | 8/2014 | Ogg et al. |
| 2014/0227615 A1 | 8/2014 | Friesen et al. |
| 2014/0234730 A1 | 8/2014 | Albertus et al. |
| 2014/0262760 A1 | 9/2014 | Hayes et al. |
| 2014/0266055 A1 | 9/2014 | Trimble et al. |
| 2014/0266056 A1 | 9/2014 | Trimble et al. |
| 2014/0322598 A1 | 10/2014 | Ogg |
| 2014/0329126 A1 | 11/2014 | Ho et al. |
| 2014/0342214 A1 | 11/2014 | Wegner et al. |
| 2014/0377626 A1* | 12/2014 | Vu ..................... H01M 10/0413 429/128 |
| 2015/0010812 A1 | 1/2015 | Ohyama et al. |
| 2015/0010833 A1 | 1/2015 | Amendola et al. |
| 2015/0044572 A1 | 2/2015 | Hucker et al. |
| 2015/0048777 A1 | 2/2015 | Goldstein |
| 2015/0056505 A1 | 2/2015 | Ogg |
| 2015/0064512 A1 | 3/2015 | Turney et al. |
| 2015/0064561 A1 | 3/2015 | Ogg et al. |
| 2015/0064562 A1 | 3/2015 | Ogg et al. |
| 2015/0072227 A1 | 3/2015 | Ogg |
| 2015/0086884 A1 | 3/2015 | Narayan et al. |
| 2015/0104679 A1 | 4/2015 | Trimble et al. |
| 2015/0140471 A1 | 5/2015 | Dong |
| 2015/0162601 A1 | 6/2015 | Ogg et al. |
| 2015/0171455 A1* | 6/2015 | Mills ..................... H01M 8/144 429/422 |
| 2015/0221999 A1 | 8/2015 | Friesen et al. |
| 2015/0228991 A1 | 8/2015 | Friesen et al. |
| 2015/0280216 A1 | 10/2015 | Sumiyama et al. |
| 2015/0311519 A1 | 10/2015 | Kawanaka et al. |
| 2015/0372357 A1 | 12/2015 | Kruglak et al. |
| 2016/0006090 A1 | 1/2016 | Licht |
| 2016/0020493 A1 | 1/2016 | Van Dijk et al. |
| 2016/0036094 A1 | 2/2016 | Ogg |
| 2016/0036095 A1 | 2/2016 | Ogg |
| 2016/0049689 A1 | 2/2016 | Zinck et al. |
| 2016/0056518 A1 | 2/2016 | Benkert et al. |
| 2016/0064789 A1 | 3/2016 | Friesen et al. |
| 2016/0087320 A1 | 3/2016 | Suyama |
| 2016/0111730 A1 | 4/2016 | Kim et al. |
| 2016/0118636 A1 | 4/2016 | Jin et al. |
| 2016/0137498 A1 | 5/2016 | Gnotke |
| 2016/0190563 A1 | 6/2016 | Yan et al. |
| 2016/0197351 A1* | 7/2016 | Tani ..................... H01M 4/628 429/162 |
| 2016/0248136 A1 | 8/2016 | Bugga et al. |
| 2016/0268622 A1 | 9/2016 | Lu et al. |
| 2016/0276697 A1 | 9/2016 | Esswein et al. |
| 2016/0308220 A1 | 10/2016 | Qi et al. |
| 2016/0351896 A1 | 12/2016 | Yushin et al. |
| 2016/0351907 A1 | 12/2016 | Tsutsumi |
| 2017/0040597 A1 | 2/2017 | Ogg et al. |
| 2017/0092990 A1 | 3/2017 | Tarrant |
| 2017/0141434 A1 | 5/2017 | Narayan et al. |
| 2017/0162857 A1 | 6/2017 | Ogg et al. |
| 2017/0194635 A1 | 7/2017 | Kudo et al. |
| 2017/0194795 A1 | 7/2017 | Ensling et al. |
| 2017/0207432 A1 | 7/2017 | Vu et al. |
| 2017/0207464 A1 | 7/2017 | Gyenge et al. |
| 2017/0237063 A1 | 8/2017 | Ogg |
| 2018/0010228 A1 | 1/2018 | Ogg et al. |
| 2018/0123116 A1 | 5/2018 | Lee et al. |
| 2018/0214949 A1 | 8/2018 | Martin et al. |
| 2018/0219220 A1 | 8/2018 | Hayashi et al. |
| 2018/0241107 A1 | 8/2018 | Su et al. |
| 2018/0287237 A1 | 10/2018 | Manthiram et al. |
| 2019/0123339 A1 | 4/2019 | Yushin et al. |
| 2019/0207274 A1 | 7/2019 | Ladpli et al. |
| 2019/0296325 A1 | 9/2019 | Sekiguchi et al. |
| 2020/0003570 A1 | 1/2020 | Finsterwalder et al. |
| 2020/0006745 A1 | 1/2020 | Westwood et al. |
| 2020/0006796 A1 | 1/2020 | Su et al. |
| 2020/0006828 A1 | 1/2020 | Milshtein et al. |
| 2020/0006896 A1 | 1/2020 | Su et al. |
| 2020/0036002 A1 | 1/2020 | Chakraborty et al. |
| 2020/0044267 A1 | 2/2020 | Perry |
| 2020/0136153 A1 | 4/2020 | Jaramillo et al. |
| 2020/0353660 A1 | 11/2020 | Lee |
| 2020/0411879 A1 | 12/2020 | Hartman et al. |
| 2020/0411932 A1 | 12/2020 | Weber et al. |
| 2021/0028452 A1 | 1/2021 | Su et al. |
| 2022/0352498 A1 | 11/2022 | Narayan et al. |

FOREIGN PATENT DOCUMENTS

| | | |
|---|---|---|
| CN | 101651208 A | 2/2010 |
| CN | 202797189 U | 3/2013 |
| CN | 103098299 A | 5/2013 |
| CN | 103326022 A | 9/2013 |
| CN | 102623710 B | 7/2014 |

(56) References Cited

FOREIGN PATENT DOCUMENTS

| | | |
|---|---|---|
| CN | 102623757 B | 7/2014 |
| CN | 102623758 B | 7/2014 |
| CN | 105408500 A | 3/2016 |
| CN | 105780081 A | 7/2016 |
| CN | 106207121 A | 12/2016 |
| CN | 106784815 A | 5/2017 |
| CN | 206340592 U | 7/2017 |
| CN | 107863530 A | 3/2018 |
| CN | 109478653 A | 3/2019 |
| CN | 110957481 A | 4/2020 |
| DE | 1671929 A1 | 10/1971 |
| DE | 69306598 T2 | 6/1997 |
| EP | 0030954 A1 | 7/1981 |
| EP | 0146946 A1 | 7/1985 |
| EP | 0677883 A1 | 10/1995 |
| EP | 0624283 B1 | 12/1995 |
| EP | 0637291 B1 | 10/1997 |
| EP | 0664932 B1 | 1/1998 |
| EP | 0823135 B1 | 11/1998 |
| EP | 0835334 B1 | 9/2002 |
| EP | 1027747 B1 | 9/2002 |
| EP | 1413001 B1 | 4/2005 |
| EP | 1266413 B1 | 5/2005 |
| EP | 1977475 B1 | 2/2012 |
| EP | 2486622 B1 | 7/2014 |
| EP | 2424016 B1 | 10/2014 |
| EP | 2973803 A1 | 1/2016 |
| EP | 2823528 B1 | 3/2016 |
| EP | 2586092 B1 | 1/2017 |
| EP | 2619835 B1 | 6/2017 |
| EP | 2792004 B1 | 11/2017 |
| EP | 2721688 B1 | 2/2018 |
| EP | 2774205 B1 | 3/2018 |
| EP | 2954583 B1 | 4/2018 |
| EP | 2559097 B1 | 5/2018 |
| EP | 3322003 A1 | 5/2018 |
| EP | 2596545 B1 | 6/2018 |
| EP | 2659536 B1 | 8/2018 |
| EP | 2973803 B1 | 7/2021 |
| FR | 2770342 A1 | 4/1999 |
| FR | 2998719 A1 | 5/2014 |
| GB | 1179777 A | 1/1970 |
| GB | 1242832 A | 8/1971 |
| GB | 1359746 A | 7/1974 |
| GB | 1557773 A | 12/1979 |
| GB | 1564438 A | 4/1980 |
| IN | 201917002254 A | 4/2019 |
| JP | S47024533 A | 10/1972 |
| JP | S4888439 A | 11/1973 |
| JP | S50127136 A | 10/1975 |
| JP | S50154746 A | 12/1975 |
| JP | S5288738 A | 7/1977 |
| JP | S52102540 A | 8/1977 |
| JP | S5443109 A | 4/1979 |
| JP | H0714575 A | 1/1995 |
| JP | 2001313093 A | 11/2001 |
| JP | 2002194411 A | 7/2002 |
| JP | 3387724 B2 | 1/2003 |
| JP | 2005079029 A | 3/2005 |
| JP | 2008293678 A | 12/2008 |
| JP | 2009129646 A | 6/2009 |
| JP | 2010140736 A | 6/2010 |
| JP | 2010192313 A | 9/2010 |
| JP | 2010262876 A | 11/2010 |
| JP | 2013134838 A | 7/2013 |
| JP | 2014127289 A | 7/2014 |
| JP | 2014150056 A | 8/2014 |
| JP | 2015076379 A | 4/2015 |
| JP | 5952540 B2 | 6/2016 |
| JP | 2016528669 A | 9/2016 |
| JP | 2016528669 A1 | 9/2016 |
| JP | 6032018 B2 | 11/2016 |
| JP | 6234917 B2 | 11/2017 |
| JP | 2017216126 A | 12/2017 |
| JP | 2018006057 A | 1/2018 |
| JP | 2018067399 A | 4/2018 |
| JP | 6352884 B2 | 6/2018 |
| JP | 6363244 B2 | 7/2018 |
| JP | 2018529207 A | 10/2018 |
| JP | 2019220340 A | 12/2019 |
| JP | 2020021732 A | 2/2020 |
| JP | 6682102 B2 | 3/2020 |
| KR | 1020140068850 A | 6/2014 |
| KR | 10-20160115912 A | 10/2016 |
| KR | 20170061206 A | 6/2017 |
| KR | 20180063144 A | 6/2018 |
| KR | 101922920 B1 | 11/2018 |
| KR | 20190012064 A | 2/2019 |
| KR | 20190079988 A | 7/2019 |
| RU | 2012950 C1 | 5/1994 |
| RU | 2518466 C1 | 6/2014 |
| RU | 2551849 C2 | 5/2015 |
| TW | 552731 B | 9/2003 |
| TW | 200421657 A | 10/2004 |
| WO | 8304381 A1 | 12/1983 |
| WO | 8402232 A1 | 6/1984 |
| WO | WO8402429 A1 | 6/1984 |
| WO | 8904067 A1 | 5/1989 |
| WO | 8904070 A1 | 5/1989 |
| WO | 8905528 A1 | 6/1989 |
| WO | 9117581 A1 | 11/1991 |
| WO | 9120102 A1 | 12/1991 |
| WO | 9312553 A1 | 6/1993 |
| WO | 9401896 A1 | 1/1994 |
| WO | 02069422 A2 | 9/2002 |
| WO | 03012908 A2 | 2/2003 |
| WO | 2005004260 A1 | 1/2005 |
| WO | 2008058165 A2 | 5/2008 |
| WO | 2010060333 A1 | 6/2010 |
| WO | 2010069209 A1 | 6/2010 |
| WO | WO2010065890 A1 | 6/2010 |
| WO | WO2011035176 A1 | 3/2011 |
| WO | 2012012731 A2 | 1/2012 |
| WO | WO2012012558 A2 | 1/2012 |
| WO | 2012023018 A1 | 2/2012 |
| WO | 2012174433 A2 | 12/2012 |
| WO | WO2012174433 A3 | 12/2012 |
| WO | WO2013005050 A1 | 1/2013 |
| WO | WO2013066828 A1 | 5/2013 |
| WO | 2013177671 A1 | 12/2013 |
| WO | 2014067982 A1 | 5/2014 |
| WO | 2014124107 A2 | 8/2014 |
| WO | 2014124110 A1 | 8/2014 |
| WO | 2014142666 A1 | 9/2014 |
| WO | 2014185494 A1 | 11/2014 |
| WO | 2015016950 A1 | 2/2015 |
| WO | 2015016956 A1 | 2/2015 |
| WO | WO2015042573 A1 | 3/2015 |
| WO | WO2015145690 A1 | 10/2015 |
| WO | WO2015150784 A1 | 10/2015 |
| WO | 2016110862 A1 | 7/2016 |
| WO | WO2016123113 A1 | 8/2016 |
| WO | WO2016149702 A1 | 9/2016 |
| WO | 2016193963 A1 | 12/2016 |
| WO | 2017006666 A1 | 1/2017 |
| WO | WO2017049414 A1 | 3/2017 |
| WO | WO2017075577 A1 | 5/2017 |
| WO | WO2017117373 A1 | 7/2017 |
| WO | 2017223219 A1 | 12/2017 |
| WO | WO2018009930 A2 | 1/2018 |
| WO | WO2018018036 A1 | 1/2018 |
| WO | WO2018052376 A1 | 3/2018 |
| WO | WO2018187561 A1 | 10/2018 |
| WO | 2019133702 A1 | 7/2019 |
| WO | 2020023912 A1 | 1/2020 |
| WO | WO2020006419 A1 | 1/2020 |
| WO | WO2020006436 A1 | 1/2020 |
| WO | WO2020006506 A3 | 1/2020 |
| WO | 2020264344 A1 | 12/2020 |
| WO | WO2020264415 A1 | 12/2020 |
| WO | 2021021681 A1 | 2/2021 |
| WO | 2021021685 A1 | 2/2021 |
| WO | 2021102016 A1 | 5/2021 |
| WO | WO2021216769 A1 | 10/2021 |

(56) References Cited

FOREIGN PATENT DOCUMENTS

| WO | WO2021236347 A1 | 11/2021 |
| WO | WO2022103893 A1 | 5/2022 |
| WO | 20220155254 A1 | 7/2022 |
| WO | WO2022155254 A1 | 7/2022 |
| WO | WO2022232465 A1 | 11/2022 |

OTHER PUBLICATIONS

Al-Hoshan, M. S. et al., "Synthesis, Physicochemical and Electrochemical Properties of Nicekl Ferrite Spinels Obtained by Hydrothermal Method for the Oxygen Evolution Reaction (OER)," Int. J. Electrochem. Sci., vol. 7, pp. 1959-4973, (2012).
Arunchander, A. et al., "Synthesis of flower-like molybdenum sulfide/graphene hybrid as an efficient oxygen reduction electrocatalyst for anion exchange membrane fuel cells," Journal of Power Sources, vol. 353, pp. 104-114, (2017).
Bandal, H. et al., "Iron-based heterogeneous catalysts for oxygen evolution reaction; change in perspective from activity promoter to active catalyst," Journal of Power Sources, vol. 395, pp. 106-127, (2018).
Blurton, K. F. et al., "Metal/Air Batteries: Their Status and Potential—A Review," Journal of Power Sources, vol. 4, pp. 263-279, (1979).
Burke, M. S. et al., "Cobalt-Iron (Oxy)Hudroxide Oxygen Evlolution Electrocatalysts: The Role of Structur5e and Composition on Activity, Stability, and Mechanism," J. Am. Chem. Soc., vol. 137, pp. 3638-3648, DOI: 10.1021/jacs.5b00281, (2015).
Burke, M. S. et al., "Oxygen Evolution Reaction Electrocatalysis on Transition Metal Oxides and (Oxy)hydroxides Activity Trends and Design Principles," Department of Chemistry and Biochemistry, University of Oregon, Eugene, Oregon 97403, United States, Chemistry of Materials, 10 pages, (2015).
Chen, Y. et al., "Harvesting polysul!des by sealing the sulfur electrode in a composite ion-selective net," Journal of Power Sources, vol. 368, pp. 38-45, (2017).
Chiang, Y.M. et al., High Capacity, Temperature-Stable Lithium Aluminum Manganese Oxide Cahtodes for Rechargeable Batteries, Electrochemical and Solid-State Letters, vol. 2, No. 3, pp. 107-110, (1990).
Colli, A. N. et al., "High energy density MnO4-/MnO42 redox couple for alkaline redox flow batteries," Chem. Commun., vol. 52, pp. 14039-14042, (2016).
Cui, B. et al., "Improved Cycle Iron Molten Air Battery Performance Using a Robust Fin Air Electrode," Journal of The Electrochemical Society, vol. 164, No. 2, pp. A88-A92, (2017).
Demir-Cakan, R. et al., "An aqueous electrolyte rechargeable Li-ion/polysul!de battery," Journal of Materials Chemistry A, View Article Online DOI: 10.1039/c4ta01308e, 5 pages, (2014).
Demir-Cakan, R. et al., "Use of ion-selective polymer membranes for an aqueous electrolyte rechargeable Li-ion-polysulphide battery," View Online DOI: 10.1039/c4ta05756b, J. Mater Chem. A, vol. 3, pp. 2869-2875, (2015).
Egashira, M. et al., "Iron-Air (Secondary and Primpary)," Yamaguchi University, Yamaguchi, Japan & 2009 Elsevier B.V. All rights reserved, pp. 372-375, (2009).
Figueredo-Rodriguez, H. A. et al., "A Rechargeable, Aqueous Iron Air Battery with Nanostructured Electrodes Capable of High Energy Density Operation," Journal of The Electrochemical Society, vol. 164, No. 6, pp. A1148-A1157, (2017).
Gross, M. M. et al., "Aqueous Polysulfide—Air Battery with a Mediator-Ion Solid Electrolyte and a Copper Sul?de Catalyst for Polysulfide Redox," View Online DOI: 10.1021/acsaem.8b01679, ACS Applied Energy Materials, vol. 1, No. 12, pp. 7230-7236, (2018).
Hall, D. E., "Ni(OH)2_Impregnated Anodes for alkaline Water Electrolysis," J. Electrochem. So., vol. 130, No. 2, pp. 317-321, (1983).

Hall, D. E., "Electrolysis: Corrosion Resistance," J. Electrochem. Soc., vol. 129, No. 2, pp. 310-315, (1982).
Hang, B. T. et al., "Effect of metal-sulfide additives on electrochemical properties of nano-sized Fe2O3-loaded carbon for Fe/air battery anodes," Journal of Power Sources, vol. 168, pp. 522-532, (2007).
Hang, B. T. et al., "Effect of additives on the electrochemical properties of Fe2O3/C nanocomposite for Fe/air battery anode," Journal of Electroanalytical Chemistry, vol. 762, pp. 59-65, (2016).
Smith, R. D. L. et al., "Water Oxidation Catalysis: Electrocatalytic Response to Metal Stoichiometry in Amorphous Metal Oxide Films Containing Iron, Cobalt, and Nickel," J. Am. Chem. Soc., vol. 135, No. 31, pp. 11580-115, (2013).
Notification Concerning Transmittal of International Preliminary Report on Patentability and Written Opinion of the International Search Authority for International Patent Application No. PCT/US2018/026243, dated Oct. 17, 2019 9 pages.
International Search Report and Written Opinion of the International Searching Authority for International Patent Application No. PCT/US2018/026243, dated Jul. 27, 2018, 12 pages.
International Search Report and Written Opinion of the International Searching Authority for International Patent Application No. PCT/US2019/039844, dated Oct. 23, 2019, 15 pages.
International Search Report and Written Opinion of the International Searching Authority for International Patent Application No. PCT/US2019/039867, dated Nov. 15, 2019, 19 pages.
International Search Report and Written Opinion of the International Searching Authority for International Patent Application No. PCT/US2019/039973, dated Jan. 13, 2020, 26 pages.
International Search Report and Written Opinion of the International Searching Authority for International Patent Application No. PCT/US2019/043745, dated Nov. 13, 2019, 17 pages.
Ji, X. et al., "Stabilizing lithium-sulphur cathodes using polysulphide reservoirs," View Online DOI: 10.1038/ncomms1293, Nature Communications, vol. 2, No. 325, 8 pages, (2011).
Jin, X. et al., "A high-!delity multiphysics model for the new solid oxide iron-air redox battery part I: Bridging mass transport and charge transfer with redox cycle kinetics," Journal of Power Sources, vol. 280, pp. 195-204, (2015).
Kadyk, T. et al., "How to Enhance Gas Removal from Porous Electrodes?" View Online DOI: 10.1038/SREP38780, Scientific Reports, vol. 6, No. 38780, pp. 1-14, (2016).
Klaus, S. et al., "E!ects of Fe Electrolyte Impurities on Ni(OH)2/NiOOH Structure and Oxygen Evolution Activity," View Online DOI:10.1021/acs.jpcc.5b00105, Journal of Physical Chemistry C, vol. 119, No. 13, pp. 7243-7254, (2015).
Licht, S., "A Novel Aqueous Aluminum permanganate fuel cell," Electrochemistry Communications, vol. 1, pp. 33-36, (1999).
Li, Z. et al., "A high-energy and low-cost polysullde/iodide redox "ow battery, Nano Energy, vol. 30, pp. 283-292, (2016).
Sevinc, S. et al., "In-situ tracking of NaFePO4 formation in aqueous electrolytes and its electrochemical performances in Na-ion/polysul!de batteries," Journal of Power Sources, vol. 412, pp. 55-62, (2019).
Mainar, A. R. et al., "Alkaline aqueous electrolytes for secondary zinc-air batteries: an overview," Int. J. Energy Res. 2016; vol. 40, pp. 1032-1049, (2016).
Malkhandi, S. et al., "Organo-Sulfur Additives for Suppressing Hydrogen Evolution in Iron-air Battery," Abstract #688, 220th ECS Meeting, 2011 The Electrochemical Society.
Matsuda, A. et al., "Preparation of hydroxide ion conductive KOH-ZrO2 electrolyte for all-solid state iron/air secondary battery," Solid State Ionics, vol. 262, pp. 188-191, (2014).
Maurya, S. et al., "A review on recent developments of anion exchange membranes for fuel cells and redox flow batteries," View online DOI: 10.1039/c5ra04741b, RSC Adv., vol. 5, pp. 37206-37230, (2015).
McKerracher, R. D. et al., "A Review of the Iron-Air Secondary Battery for Energy Storage," View online DOI: 10.1002/cplu.201402238, ChemPlusChem 2015, vol. 80, pp. 323-335, (2015).
Merle, G. et al., "Anion exchange membranes for alkaline fuel cells: A review," Journal of Membrane Science, vol. 377, pp. 1-35, (2011).

(56) References Cited

OTHER PUBLICATIONS

Mitra, D. et al., "An Efficient and Robust Surface-Modified Iron Electrode for Oxygen Evolution in AlkalineWater Electrolysis,"Journal of The Electrochemical Society, vol. 165, No. 5, pp. F392-F400, (2018).

Mitra, D. et al., "A Stable and Electrocatalytic Iron Electrode for Oxygen Evolution in Alkaline Water Electrolysis," View Online https://doi.org/10.1007/s11244-018-0971-9, Springer Science+ Business Media, LLC, part of Springer Nature 2018.

Narayan, S. R. et al., "Bi-Functional Oxygen Electrodes—Challenges and Prospects," The Electrochemical Society Interface, Summer 2015, pp. 65-69, (2015).

Neburchilov, V. et al., "Metal-Air and Metal-Sulfur Batteries: Fundamentals and Applications," CRC Press Taylor & Francis Group, 6000 Broken Sound Parkway NW, Suite 300, Boca Raton, FL 33487-2742, ©2017 by Taylor & Francis Group, LLC, CRC Press is an imprint of Taylor & Francis Group, an Informa business.

Ojefors, L. et al., "An-iron-Air Vehicle Battery," Journal of Power Sources, vol. 2, pp. 287-296, (1977).

Pan, J. et al., "Constructing Ionic Highway in Alkaline Polymer Electrolytes," Energy Environ. Sci. 2014, vol. 7, pp. 354-360, (2014).

Roe, S. et al., "A High Energy Density Vanadium Redox Flow Battery with 3 M Vanadium Electrolyte," Journal of The Electrochemical Society, vol. 163, No. 1, pp A5023-A5028, (2016).

Sen, R. K. et al., "Metal-Air Battery Assessment," Prepared for Office of Energy Storage and Distribution Conservation and Renewable Energy, The U.S. Department of Energy under Contract DE-AC06-76RLO 1830, Pacific Northwest Laboratory, Operated for the U.S. Department of Energy, 96 pages, (1988).

Tekin, B. et al., "A New Sodium-Based Aqueous Rechargeable Battery System: The Special Case of Na0.44MnO2/Dissolved Sodium Polysulfide," View online DOI: 10.1002/ente.201700245, Energy Technol. vol. 5, pp. 2182-2188, (2017).

Tian, B. et al., "The effect of Na2S additive in alkaline electrolyte on improved performances of Fe-based air batteries," Electrochimica Acta, vol. 259, pp. 196-203, (2018).

Trocino, S. et al., "High performance solid-state iron-air rechargeable ceramic battery operating at intermediate temperatures (500-650 °C)," Applied Energy, pp. 233-234 & pp. 386-394, (2019).

Vijayamohanan, K. et al., "Rechargeable Alkaline Iron Electrodes," Journal of Power Sources, vol. 34, pp. 269-285, (1991).

Wei, X. et al., "An Aqueous Redox Flow Battery Based on Neutral Alkali Metal Ferri/ferrocyanide and Polysulfide Electrolytes," Journal of The Electrochemical Society, vol. 163, No. 1, pp. A5150-A5153, (2016).

Weinrich, H. et al., "Understanding the Nanoscale Redox-Behavior of Iron-Anodes for Rechargeable Iron-Air Batteries," View Online https://doi.org/10.1016/j.nanoen.2017.10.023, Nano Energy, Institute of Energy and Climate Research-Fundamental Electrochemistry (IEK-9) Center for Nanophase Materials Sciences, Oak Ridge National Laboratory, Oak Ridge, Tennessee 378, US, 46 pages, (2017).

Wilke, S. K. et al., "Structural evolution of directionally freeze-cast iron foams during oxidation/reduction cycles," Acta Materialia, vol. 162, pp. 90-102, (2019).

Yang, B. et al., "Organo-Sulfur Molecules enable iron-based battery electrodes to meet the challenges of large-scale electrical energy storage," Energy Environ. Sci., vol. 7, pp. 2753-2763, (2014).

Yang, C. et al., "Unique aqueous Li-ion/sulfur chemistry with high energy density and reversibility," View online, www.onas.org/cgi/doi/10.1073/pnas.1703937114, PNAS, vol. 114, No. 24, pp. 6197-6202, (2017).

You, S. et al., "A microbial fuel cell using permanganate as the cathodic electron acceptor," Journal of Power Sources, vol. 162, pp. 1409-1415, (2006).

Yu, X. et al., "A Voltage-Enhanced, Low-Cost Aqueous Iron-Air Battery Enabled with a Mediator-Ion Solid Electrolyte," View Online DOI: 10.1021/acsenergylett.7b00168, ACS Energy Lett., vol. 2, pp. 1050-1055, (2017).

Kun, S. et al., "Materials and Device Constructions for Aqueous Lithium-Sulfur Batteries," View online DOI: 10.1002/adfm.201707593, Adv. Funct. Mater., vol. 28, pp. 1-17 (1707593), (2018).

Notification of Transmittal of the International Search Report and Written Opinion of the International Search Authority for International Patent Application No. PCT/US2020/039889, dated Oct. 15, 2020, 11 pages.

Perkins, N. R. et al., "Hydrogen Oxidation Electrodes and Electrochemical Cells Including the Same," U.S. Appl. No. 16/951,396, filed Nov. 18, 2020.

Carta, M. et al., "The synthesis of microporous polymers using Troger's base formation", Polymer Chemistry, 2014, vol. 5, pp. 5267-5272.

Bisoi, S. et al., "Gas separation properties of Troeger's base-bridged polyamides", e-Polymers, 2017, vol. 17, No. 4, pp. 283-293, DOI: https://doi.org/10.1515/epoly-2016-0291.

Li, Z. et al., "Air-breathing aqueous sulfur flow battery for ultralow-cost long-duration electrical storage", Joule, 2017, vol. 1, No. 2, pp. 306-327.

Notification of Transmittal of the International Search Report and Written Opinion of the International Search Authority for International Patent Application No. PCT/US2020/039942, dated Oct. 22, 2020, 17 pages.

Notification of Transmittal of the International Search Report and Written Opinion of the International Search Authority for International Patent Application No. PCT/US2020/039976, dated Oct. 23, 2020, 11 pages.

Notification of Transmittal of the International Search Report and Written Opinion of the International Search Authority for International Patent Application No. PCT/US2020/043630, dated Nov. 11, 2020, 10 pages.

Notification of Transmittal of the International Search Report and Written Opinion of the International Search Authority for International Patent Application No. PCT/US2020/043639, dated Nov. 13, 2020, 11 pages.

International Preliminary Report on Patentability for International Application No. PCT/US2021/031182, dated Nov. 17, 2022, 8 Pages.

International Search Report and Written Opinion for International Application No. PCT/US2022/026844, dated Sep. 21, 2022, 15 pages.

Office Action for Russian Application No. 2021100085, dated Jan. 30, 2023, 19 pages.

Thompson A.C., et al., "Electrolyte Formulations and Additives for Iron Anode Electrochemical Systems," U.S. Appl. No. 17/661,256, filed Apr. 28, 2022, 105 pages.

Kalaignan G.P., et al., "Iron-Copper Electrodes for Alkaline Batteries," Bulletin of Electrochemistry, Mar.-Apr. 1996, vol. 12, No. 3-4, pp. 213-217.

Kao C-Y., et al., "Iron/Carbon-black Composite Nanoparticles as an Iron Electrode Material in a Paste Type Rechargeable Alkaline Battery," Journal of Power Sources, 2010, vol. 195, pp. 2399-2404.

Kao C.Y., et al., "Synthesis and Characterization of the Iron/Copper Composite as an Electrode Material for the Rechargeable Alkaline Battery," Journal of Power Sources, 2011, vol. 196, pp. 5746-5750.

Kitamura H., et al., "Effect of Charge Current Density on Electrochemical Performance of Fe/c Electrodes in Alkaline Solutions," Journal of the Electrochemical Society, 2012, vol. 159, No. 6, pp. A720-A724.

Kumar H., et al., "Fabrication Fe/Fe3/O4/Graphene Nanocomposite Electrode Material for Rechargeable Ni/Fe Batteries in Hybrid Electric Vehicles," International Letters of Chemistry, Physics and Astronomy, 2013, vol. 14, pp. 15-25.

Lee T.S., "Hydrogen Overpotential in Pure Metals in Alkaline Solution," Journal of Electrochemical Society, Aug. 1971, vol. 118, No. 8, pp. 1278-1282.

Li Z., et al., "Air-Breathing Aqueous Sulfur Flow Battery for Ultralow-Cost Long-Duration Electrical Storage," Joule 1, Cell Press, Oct. 11, 2017, vol. 1, No. 2, pp. 306-327, doi:10.1016/j.joule.2017.08.007, ISSN 2542-4351, XP055667017.

(56) References Cited

OTHER PUBLICATIONS

Licht S., "Aqueous Solubilities, Solubility Products and Standard Oxidation-Reduction Potentials of the Metal Sulfides," Journal of the Electrochemical Society, Dec. 1988, vol. 135, No. 12, pp. 2971-2975.

Liu J., et al., "A Flexible Alkaline Rechargeable Ni/Fe Battery Based on Graphene Foam/Carbon Nanotubes Hybrid Film," Nano Letters, 2014, vol. 14, No. 12, pp. 7180-7187, Retrieved from the Internet: URL: https://doi.org/10.1021/nl503852m.

Liu W., et al., "Sulfidation Mechanism of ZnO Roasted With Pyrite," Scientific Reports, Jun. 2018, vol. 8, No. 1, 12 pages, DOI:10.1038/S41598-018-27968-z.

Mabbett I., et al., "Rapid Processing and Scanning Electrochemical Techniques Applied to Sintered Nickel Electrodes of Varying Thickness and Rate Capability," Rapid Processing & Scanning EC Techniques Applied to Sintered Ni Electrodes, ECS Transactions, 2015, 64 (18), pp. 1-12.

Machine translation of CN 110957481 A, 2020, 7 pages.

Machine translation of WO2014185494A1, 2014, 20 pages.

Malkhandi S., et al., "Self-Assembled Monolayers of n-Alkanethiols Suppress Hydrogen Evolution and Increase the Efficiency of Rechargeable Iron Battery Electrodes," Journal of American Chemical Society, 2013, vol. 135, pp. 347-353, dx.doi.org/10.1021/ja3095119.

Manohar A. K., et al., "Mechanism of Formation of Carbonyl Iron Electrodes in Alkaline Batteries," Abstract #371, Honolulu PRiME 2012, The Electrochemical Society, 2012, 1 page.

Manohar A.K., et al., "A High-Performance Rechargeable Iron Electrode for Large-Scale Battery-based Energy Storage," Journal of The Electrochemical Society, 2012, vol. 159, No. 8, pp. A1209-A1214.

Manohar A.K., et al., "Enhancing the Performance of the Rechargeable Iron Electrode in Alkaline Batteries with with Bismuth Oxide and Iron Sulfide Additives," Journal of The Electrochemical Society, 2013, vol. 160, No. 11, pp. A2078-A084.

Manohar A.K., et al., "The Role of Sulfide Additives in Achieving Long Cycle Life Rechargeable Iron Electrodes in Alkaline Batteries," Journal of the Electrochemical Society, 2015, vol. 162, No. 9, pp. A1864-A1872.

Mitra D., et al., "Highly-Active, Durable and Inexpensive Iron-Based Electrocatalyst for Oxygen Evolution," 2016 ECS—The Electrochemical Society ECS Meeting Abstracts, vol. MA2016-02, A01—Batteries and Energy Technology Joint General Session, 2016, 2 pages.

Murcia D.C.F., et al., "Determination of Zinc Sulfide Solubility to High Temperatures," Journal of Solution Chemistry, 2017, vol. 46, No. 9-10, pp. 1805-1817, Retrieved from the Internet: URL: https://doi.org/10.1007/s10953-017-0648-1.

Notice of Rejection of Japanese Office Action dated May 12, 2015 for Application No. 2013-520885, 8 Pages.

Paulraj A.R., et al., "Core/Shell Structure Nano-Iron/Iron Carbide Electrodes for Rechargeable Alkaline Iron Batteries," Journal of The Electrochemical Society, 2017, vol. 164, No. 7, pp. A1665-A1672.

Paulraj A.R., et al., "Electrochemical Performance and in Operando Charge Efficiency Measurements of Cu/Sn-Doped Nano Iron Electrodes," Batteries, 2019, vol. 5, No. 1, pp. 1-15, DOI: 10.3390/batteries5010001.

Paulraj A.R., et al., "Electrochemical Study of Nano-Iron/Iron Carbide as Rechargeable Electrodes," 2016 ECS—The Electrochemical Society, ECS Meeting Abstracts, vol. MA2016-02, A01-Batteries and Energy Technology Joint General Session, 2016, 2 pages.

Periasamy P., et al., "Cyclic Voltammetric Studies of Porous Iron Electrodes in Alkaline Solutions used for Alkaline Batteries," Journal of Power Sources, 1996, vol. 58, pp. 35-40.

Posada J.O.G., et al., "Post-hoc Comparisons Among Iron Electrode Formulations based on Bismuth, Bismuth Sulphide, Iron Sulphide, and Potassium Sulphide under Strong Alkaline Conditions," Journal of Power Sources, 2014, vol. 268, Article 810e815, 7 Pages.

Rajan A.S., et al., "An In situ Carbon-grafted Alkaline Iron Electrode for Iron-based Accumulators," Energy & Environmental Science, 2014, vol. 7, pp. 1110-1116.

Rajan A.S., et al., "Carbonyl-Iron Electrodes for Rechargeable-Iron Batteries," Electrochemical Energy Technology, 2014, vol. 1, pp. 2-9.

Ravikumar M.K., et al., "In Situ Crystallographic Probing on Ameliorating Effect of Sulfide Additives and Carbon Grafting in Iron Electrodes," Journal of The Electrochemical Society, 2015, vol. 162, No. 12, 12 Pages.

Reardon E.J., "Zerovalent Irons—Styles of Corrosion and Inorganic Control on Hydrogen Pressure Buildup," Environmental Science & Technology, 2005, vol. 39, No. 18, pp. 7311-7317.

Reinders L.A., "Selective Separation of Heavy Metals in Aqueous Systems by Sulfide Precipitation: A Theoretical Equilibrium Model public Deposited," 1992, 86 pages, https://doi.org/10.17615/t2bhsa90.

Rickard D., et al., "Chemistry of Iron Sulfides," Chemical Reviews, 2007, vol. 107, pp. 514-562.

Rosenblum P., "Solubility in the Potassium Stannate—Potassium Hydroxide—Water System at 0 to 95.0 degree C," Canadian Journal of Chemistry, 1968, vol. 46, pp. 2715-2719.

Sayilgan E., et al., "A Review of Technologies for the Recovery of Metals from Spent Alkaline and Zinc-Carbon Batteries," Hydrometallurgy, 2009, vol. 97, No. 3-4, pp. 158-166, XP026116549.

Serebrennikova I., et al., "Steel Corrosion in Alkaline Batteries," Electrochimica Acta, 2009, vol. 54, pp. 5216-5222.

Shanmugam N., et al., "Effect of Annealing on the ZnS Nanocrystals Prepared by Chemical Precipitation Method," Journal of Nanomaterials, 2013, vol. 2013, Article ID 351798, 7 Pages.

Shukla A.K., et al., "Nickel-based Rechargeable Batteries," Journal of Power Sources, 2001, vol. 100, pp. 125-148.

Singh R. N., et al., "Iron Molybdates as Electrocatalysts for O2 Evolution Reaction in Alkaline Solutions," International Journal of Hydrogen Energy, vol. 34, No. 11, 2009, pp. 4693-4700.

Su D., et al., "Improved Electrochemical Performance of Na-ion Batteries in Ether-Based Electrolytes : A Case Study of ZnS Nanospheres," Advanced Energy Materials, vol. 6, Nov. 24, 2015 (Online publication date), Article No. 1501785, pp. 1-13.

Vega M.F., et al., "Influence of the Heating Rate on the Quality of Metallurgical Coke," ACS Omega, vol. 6, 2021, pp. 34615-34623.

Veselov S.V., et al., "The Capability of Multilayer Cermet Coating Fabrication on Steel with Electrophoretic Deposition," ECS Transactions, 2018, vol. 82, No. 1, pp. 67-71.

Vijayamohanan K., et al., "Formation Mechanism of Porous Alkaline Iron Electrodes," Journal of Power Sources, 1990, vol. 32, pp. 329-339.

Wang M., et al., "Surface Stoichiometry of Zinc Sulfide and Its Effect on the Adsorption Behaviors of Xanthate," Chemistry Central Journal, 2011, vol. 5, 73, Retrieve from URL: http://journal.chemistrycentral.eom/content/5/1/73.

Written Opinion for International Application No. PCT/US2016/023439, dated Aug. 31, 2016, 14 Pages.

Yang C., et al., "A High-Performance Sintered Iron Electrode for Rechargeable Alkaline Batteries to Enable Large-Scale Energy Storage," Journal of the Electrochemical Society, 2017, vol. 164, No. 2, pp. A418-A429.

Yang C., et al., "Performance of Rechargeable Sintered Iron Electrodes for Large-Scale Energy Storage," abstract 2015, The Electrochemical Society, Meeting Abstracts, MA2015- 01 673, 2015, 2 pages.

Zhang L., et al., "Unusual Formation of Single-Crystal Manganese Sulfide Microboxes Co-Mediated by the Cubic Crystal Structure and Shape," Angewandte Chemie, vol. 124, Jun. 8, 2012 (Online publication date), pp. 7379-7382.

Zielinski J., et al., "Reduction of Fe2O3 With Hydrogen," Applied Catalysis A General, 2010, pp. 1-18, DOI: 10.1016/i.apcata.2010.04.003.

Abd El Haleem S.M., et al., "Electrochemical Behaviour of Iron in Alkaline Sulphide Solutions," The International Journal of Corrosion Processes and Corrosion Control, Engineering, Science and Technology, 2008, vol. 43, No. 2, pp. 173-178, DOI: 10.1179/174327807X234769.

(56) References Cited

OTHER PUBLICATIONS

Anh T.T., et al., "The Influence of Carbon Additive on the Electrochemical Behaviors of Fe2O3/C Electrodes in Alkaline Solution," Vietnam Journal of Science and Technology, 2018, vol. 56, No. 1, pp. 24-30, DOI: 10.15625/2525-2518/56/1/9271.

Argonne National Laboratory: "Design and Cost Study of a Nickel-Iron Oxide Battery for Electric Vehicles," Public Report, vol. II, Final Report Contract No. 31-109-38-3723, Aug. 23, 1977, 76 Pages.

Argonne National Laboratory: "Development of Near-Term Batteries for Electric Vehicles," Summery Report, Oct. 1977-Sep. 1979, 19 Pages.

Baratin F., "Investigation of the Cu—Fe—S—H2O System at 200 degree C," 1980, 6 Pages.

Cerny J., et al., "Voltammetric Study of an Iron Electrode in Alkaline Electrolytes," Journal of Power Sources, 1989, vol. 25, pp. 111-122.

Chamoun M., et al., "Stannate Increases Hydrogen Evolution Overpotential on Rechargeable Alkaline Iron Electrodes," Journal of The Electrochemical Society, 2017, vol. 164, No. 6, pp. A1251-A1257.

Chladil L., et al., "Influence of Zinc Ions on Properties of Non-Sintered Ni(OH)2 Electrodes," Meet, Abstract #338, 224th ECS Meeting, 2013-338, The Electrochemical Society, 2013, 1 Page.

Clever H.L., et al., "The Solubility of Some Sparingly Soluble Salts of Zinc and Cadmium in Water and in Aqueous Electrolyte Solutions," Journal of Physical and Chemical Reference Data, 1992, vol. 21, No. 5, pp. 941-1004, httos://doi.ora/10.1063/1.555909.

Corrigan D.A., "The Catalysis of the Oxygen Evolution Reaction by Iron Impurities in Thin Film Nickel Oxide Electrodes," Journal of Electrochemical Society, 1987, vol. 134, No. 2, pp. 377-384.

Daskalakis K.D., et al.,"The solubility of Sphalerite (ZnS) in Sulfidic Solutions at 25C and 1 atm Pressure," Geochimica et Cosmochimica Acta, vol. 57. No 20, Oct. 1993, pp. 4923-4931.

Edison: "Manual of Storage Battery Practice," The Committee on Electric Storage Batteries of the Association of Edison Illuminating Companies, 1914, 11 Pages.

Extended European Search Report for European Application No. 12845396.6, dated Jun. 8, 2016, 8 Pages.

Extended European Search Report for European Application No. 18176436.6, dated Sep. 28, 2018, 16 Pages.

Extended European Search Report for European Application No. 18189034.4, dated Oct. 12, 2018, 8 Pages.

Extended European Search Report for European Application No. 19839894.3, dated May 10, 2022, 7 Pages.

Extended European Search Report for European Application No. 20196772.6, dated Jan. 22, 2021, 6 Pages.

Ferreira S.R., et al., "Selected Test Results from the Encell Technology Nickel Iron Battery," Test Results from Encell Ni—Fe Battery, Sandia Report, SAND2014-17462, Unlimited Release Printed Sep. 2014, 36 Pages.

First Examination Report received for Indian Patent Application No. 202117008130, dated Aug. 4, 2022, 7 pages.

Gayer K.H., et al., "The Solubility of Ferrous Hydroxide and Ferric Hydroxide in Acidic and Basic Media at 25C," The Journal of Physical Chemistry, 1956, vol. 60, No. 11, pp. 1569-1571, DOI: https://doi.ora/10.1021/i150545a021.

Han J., et al., "Mechanism Study on the Sulfidation of ZnO with Sulfur and Iron Oxide at High Temperature," Scientific Reports, Feb. 10, 2017, vol. 7, No. 42536, 12 Pages, DOI: 10.1038/srep42536.

Hang B.T., et al., "Fe2O3-Filled Carbon Nanotubes as a Negative Electrode for an Fe-air Battery," Journal of Power Sources, 2008, vol. 178, pp. 393-401.

Hariprakash B., et al., "A Sealed, Starved-electrolyte Nickel Iron Battery," Journal of Applied Electrochemistry, 2005, vol. 35, pp. 27-32, DOI: 10.1007/s10800-004-2052-y.

Hariprakash B., et al., "Ceria-Supported Platinum as Hydrogen-oxygen Recombinant Catalyst for Sealed Lead-acid Batteries," Electrochemical and Solid-State Letters, 2001, vol. 4, No. 3, pp. A23-A26.

Hayashi K., et al., "Development Iron-Based Rechargeable Batteries with Sintered Porous Iron Electrodes," ECS Transactions, The Electrochemical Society, 2017, vol. 75, No. 18, pp. 111-116, DOI: 10.1149/07518.0111ecst.

Hayashi K., et al., "Electrochemical Performance of Sintered Porous Negative Electrodes Fabricated with Atomized Powders for Iron-Based Alkaline Rechargeable Batteries," Journal of The Electrochemical Society, 2017, vol. 164, No. 9, pp. A2049-A2055, DOI: 10.1149/2.1311709jes.

Hayashi K., et al., "Performance of Rechargeable Iron Alkaline Batteries with Sulfur-Containing Atomized Powders as Negative Electrodes," ECS Meeting Abstracts, vol. MA2017-02, A01-Battery and Energy Technology Joint General Session, abstract 2017, 2 pages.

Indian First Examination Report for Application No. 201617013657, dated Aug. 27, 2019, 6 Pages.

International Preliminary Report on Patentability for International Application No. PCT/US2010/049361, dated Mar. 29, 2012, 06 Pages.

International Preliminary Report on Patentability for International Application No. PCT/US2012/062502, dated May 14, 2015, 13 Pages.

International Preliminary Report on Patentability for International Application No. PCT/US2016/014936, dated Aug. 10, 2017, 07 Pages.

International Preliminary Report on Patentability for International Application No. PCT/US2016/023439, dated May 31, 2017, 21 Pages.

International Preliminary Report on Patentability for International Application No. PCT/US2019/043745, dated Feb. 11, 2021, 14 Pages.

International Preliminary Report on Patentability for International Application No. PCT/US2020/031182, dated Nov. 18, 2021, 6 Pages.

International Preliminary Report on Patentability for International Application No. PCT/US2020/039976, dated Jan. 6, 2022, 08 Pages.

International Preliminary Report on Patentability for International Application No. PCT/US2020/043630, dated Feb. 10, 2022, 7 Pages.

International Preliminary Report on Patentability for International Application No. PCT/US2020/043639, dated Feb. 10, 2022, 8 Pages.

International Preliminary Report on Patentability for International Application No. PCT/US2020/058859, dated May 19, 2022, 8 Pages.

International Search Report and Written Opinion for International Application No. PCT/US2009/040658, dated Aug. 24, 2009, 6 Pages.

International Search Report and Written Opinion for International Application No. PCT/US2010/049361, dated Dec. 29, 2010, 08 Pages.

International Search Report and Written Opinion for International Application No. PCT/US2012/062502, dated Jan. 24, 2013, 13 Pages.

International Search Report and Written Opinion for International Application No. PCT/US2016/014936, dated May 12, 2016, 08 Pages.

International Search Report and Written Opinion for International Application No. PCT/US2021/028477, dated Aug. 4, 2021, 13 Pages.

International Search Report and Written Opinion for International Application No. PCT/US2021/031182, dated Dec. 31, 2021, 11 Pages.

International Search Report and Written Opinion for International Application No. PCT/US2021/058859, dated Mar. 8, 2022, 10 Pages.

(56) References Cited

OTHER PUBLICATIONS

International Search Report and Written Opinion for International Application No. PCT/US2022/012191, dated May 4, 2022, 13 pages.
International Search Report for International Application No. PCT/US2016/023439, dated Aug. 31, 2016, 06 Pages.
Jackovitz J.F., et al., "Chapter 25: Iron Electrode Batteries," Linden Handbook of Batteries, 2004, 26 Pages.
Jayalakshmi M., et al., "Passivation of Iron in Alkaline Carbonate Solutions," Journal of Power Sources, 1991, vol. 35, pp. 131-142.
Jozwiak W.K., et al., "Reduction Behavior of Iron Oxides in Hydrogen and Carbon Monoxide Atmospheres," Applied Catalysis A: General, 2007, vol. 326, pp. 17-27.
Ferreira A.S., et al., "Statistical Analysis of the Spray Roasting Operation for the Production of High Quality Fe2O3 from Steel Pickling Liquors," Process Safety and Environmental Protection, 2011, vol. 89, pp. 172-178.
First Examination Report received for Saudi Arabia Patent Application No. 522431488, dated Jun. 13, 2023, 14 pages.
International Preliminary Report on Patentability for International Application No. PCT/US2021/058859, mailed May 25, 2023, 7 pages.
International Preliminary Report on Patentability for International Application No. PCT/US2022/012191, mailed Jul. 4, 2023, 10 Pages.
International Search Report and Written Opinion for International Application No. PCT/US2022/048092, mailed Feb. 27, 2023, 12 Pages.
International Search Report and Written Opinion for International Application No. PCT/US2023/011769, mailed Jun. 8, 2023, 14 Pages.
International Search Report and Written Opinion for International Application No. PCT/US2023/012448, mailed Jun. 21, 2023, 12 Pages.
International Search Report for Application No. PCT/US2018/067662, mailed on Mar. 18, 2019, 3 pages.
International Search Report for Application No. PCT/US2023/019847, mailed on Aug. 31, 2023, 9 pages.
Lin M., et al., "Application of Hydrometallurgy Techniques in Quartz Processing A and Purification: a Review," Metallurgical Research Technology, Apr. 25, 2018, vol. 115(3), pp. 1-13.
Margarido F., et al., "Kinetics of Acid Leaching Refining of an Industrial Fe—Si Alloy," Hydrometallurgy, 1993, vol. 34, pp. 1-11.
Office Action for Brazilian Application No. BR112021000258-8, dated May 2, 2023, 10 Pages.
Office Action for Japanese Application No. 2021527026, dated Aug. 22, 2023, 19 Pages.
Wang H-F., et al., "Materials Design for Rechargeable Metal-air Batteries," Matter, Sep. 4, 2019, vol. 1, pp. 565-595.
Weinrich H., et al., "Electrode Thickness-Dependent Formation of Porous Iron Electrodes for Secondary Alkaline ron-Air Batteries," Electrochimica Acta, 2019, vol. 314, pp. 61-71.
Wen Z., et al., "Air Electrode for the Lithium-air Batteries: Materials and Structure Designs," ChemPlusChem, 2015, (published online) Oct. 21, 2014, vol. 80, pp. 270-287.
First Examination Report received for Saudi Arabia Patent Application No. 522440999, dated Sep. 28, 2023, 14 pages.
International Preliminary Report on Patentability for International Application No. PCT/US2022/026844, mailed Nov. 9, 2023, 10 Pages.

Office Action (Inquiry) of the Substantive Examination for Patent Application in Russian Federation No. 2022103201, dated Nov. 16, 2023, 16 pages—including English-language translation.
Luk S., et al., "Surface Area, Density, and Porosity of Powders," ASM Handbook, Powder Metallurgy, 2015, vol. 7, pp. 132-144.
Bhadeshia H. K. D. H, "Cementite," International Materials Reviews, vol. 65.1, 2020), pp. 1-27.
Andreas V., "Iron-Carbon Phase Diagram Explained," Oct. 3, 2020, 9 pages, Retrieved from the Internet: URL: https://fractory.com/iron-carbon-phase-diagram/.
Gorji N. E., et al., "Recyclability of Stainless Steel (316 L) Powder Within the Additive Manufacturing Process," Materialia, vol. 8, 2019, 100489, 9 pages.
Isostatic Pressing Association "Advantages," Retrieved from the Internet: URL: http://ipa-web.org/advantages.html, Dec. 22, 2019, 4 pages.
Janot R., et al.. "Ball-milling in Liquid Media: Applications to the Preparation of Anodic Materials for Lithium-ion Batteries," Progress in Materials Science, vol. 50.1, 2005, pp. 1-92.
Manohar A.K., et al., "Understanding the Factors Affecting the Formation of Carbonyl Iron Electrodes in Rechargeable Alkaline Iron Batteries." Journal of the Electrochemical Society, vol. 159(12), 2012, A2148-A2155.
Milne, I., et al., "1.18-Castings. In Comprehensive Structural Integrity," Jolly M, 2003, 90 pages.
Poquillon, D., et al. "Cold Compaction of Iron Powdersrelations Between Powder Morphology and Mechanical Properties: Part I: Powder Preparation and Compaction," Powder Technology, vol. 126.1, 2002, pp. 65-74.
Weinrich H., et al., "Electrode Thickness-Dependent Formation of Porous Iron Electrodes for Secondary Alkaline Iron-Air Batteries," Electrochimica Acta, 2019, vol. 314, pp. 61-71.
Office Action in CN201980063958.6, mailed Mar. 13, 2024, 16 pages.
Office Action in IN202117008130, mailed Mar. 19, 2024, 3 pages.
Office Action in JP2021527026, mailed Apr. 23, 2024, 11 pages.
Non-Final Office Action in U.S. Appl. No. 17/313,892, mailed Jan. 19, 2024, 8 pages.
Non-Final Office Action in U.S. Appl. No. 16/938,924, mailed Jan. 24, 2024, 20 pages.
ASM Handbook, vol. 7: Powder Metallurgy, 2015, p. 132.
Final Office Action in U.S. Appl. No. 16/914,012, mailed Mar. 25, 2024, 10 pages.
Notification on the Results of Examining Patentability of Invention in RU2022131395/07, mailed May 27, 2024, 12 pages.
Office Action in SA522441194, mailed May 14, 2024, 5 pages.
Office Action in EP20846138.4, mailed Oct. 17, 2023, 6 pages.
Office Action in SA522431488, mailed Dec. 13 , 2023, 6 pages.
International Search Report and Written Opinion in PCT/US2023/030484, mailed Dec. 8, 2023, 14 pages.
Zhang, T. et al., "A Facile Strategy for the Preparation of MoS3 and its Application as a Negative Electrode for Supercapacitors," Chemistry—An Asian Journal. Sep. 2016. 6;11(17):2392-8.
International Search Report and Written Opinion in PCT/US2024/014834, mailed Jun. 18, 2024, 13 pages.
Office Action in JP2022505454, mailed Jul. 30, 2024, includes English-language translation, 20 pages.
Non-Final Office Action in U.S. Appl. No. 17/236,677, mailed Aug. 5, 2024, 12 pages.
Examination Report in IN202217008140, mailed Aug. 19, 2024, 6 pages.

* cited by examiner

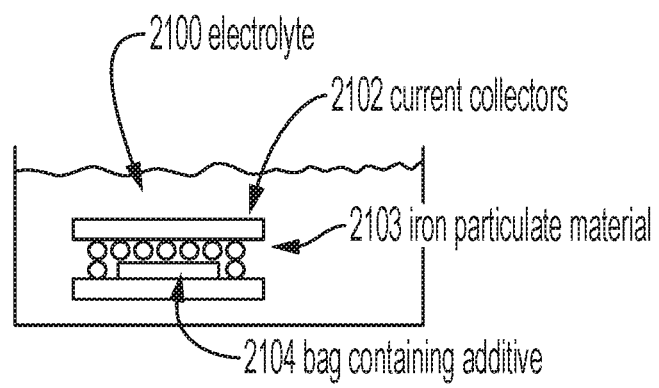
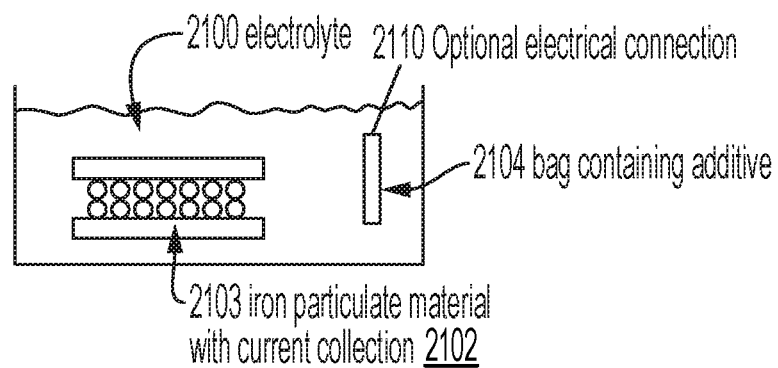
FIG. 21

LOW COST METAL ELECTRODES

RELATED APPLICATIONS

This application claims the benefit of priority to U.S. Provisional Patent Application No. 62/879,126 entitled "Low Cost Metal Electrodes" filed Jul. 26, 2019 and U.S. Provisional Patent Application No. 63/021,566 entitled "Low Cost Metal Electrodes" filed May 7, 2020 and the entire contents of both applications are hereby incorporated by reference for all purposes.

BACKGROUND

Energy storage technologies are playing an increasingly important role in electric power grids; at a most basic level, these energy storage assets provide smoothing to better match generation and demand on a grid. The services performed by energy storage devices are beneficial to electric power grids across multiple time scales, from milliseconds to years. Today, energy storage technologies exist that can support timescales from milliseconds to hours, but there is a need for long and ultra-long duration (collectively, >8 h) energy storage systems.

This Background section is intended to introduce various aspects of the art, which may be associated with embodiments of the present inventions. Thus, the foregoing discussion in this section provides a framework for better understanding the present inventions, and is not to be viewed as an admission of prior art.

SUMMARY

Materials, designs, and methods of fabrication for metal electrodes for electrochemical cells are disclosed. In various embodiments, the electrode comprises iron. Various methods for achieving high surface area with low cost and high simple, highly scalable manufacturing methods are described.

Various embodiments may include a battery comprising: a first electrode; an electrolyte; and a second electrode, wherein at least one of the first electrode and the second electrode comprises atomized metal powder.

Various embodiments may include a battery comprising: a first electrode; an electrolyte; and a second electrode, wherein at least one of the first electrode and the second electrode comprises iron agglomerates.

Various embodiments may include a method of making an electrode, comprising: electrochemically producing metal powder; and forming the metal powder into an electrode.

BRIEF DESCRIPTION OF THE FIGURES

The accompanying drawings, which are incorporated herein and constitute part of this specification, illustrate example embodiments of the claims, and together with the general description given above and the detailed description given below, serve to explain the features of the claims.

FIG. 21 illustrates example additive holder configurations.

DETAILED DESCRIPTION

Figure 1:
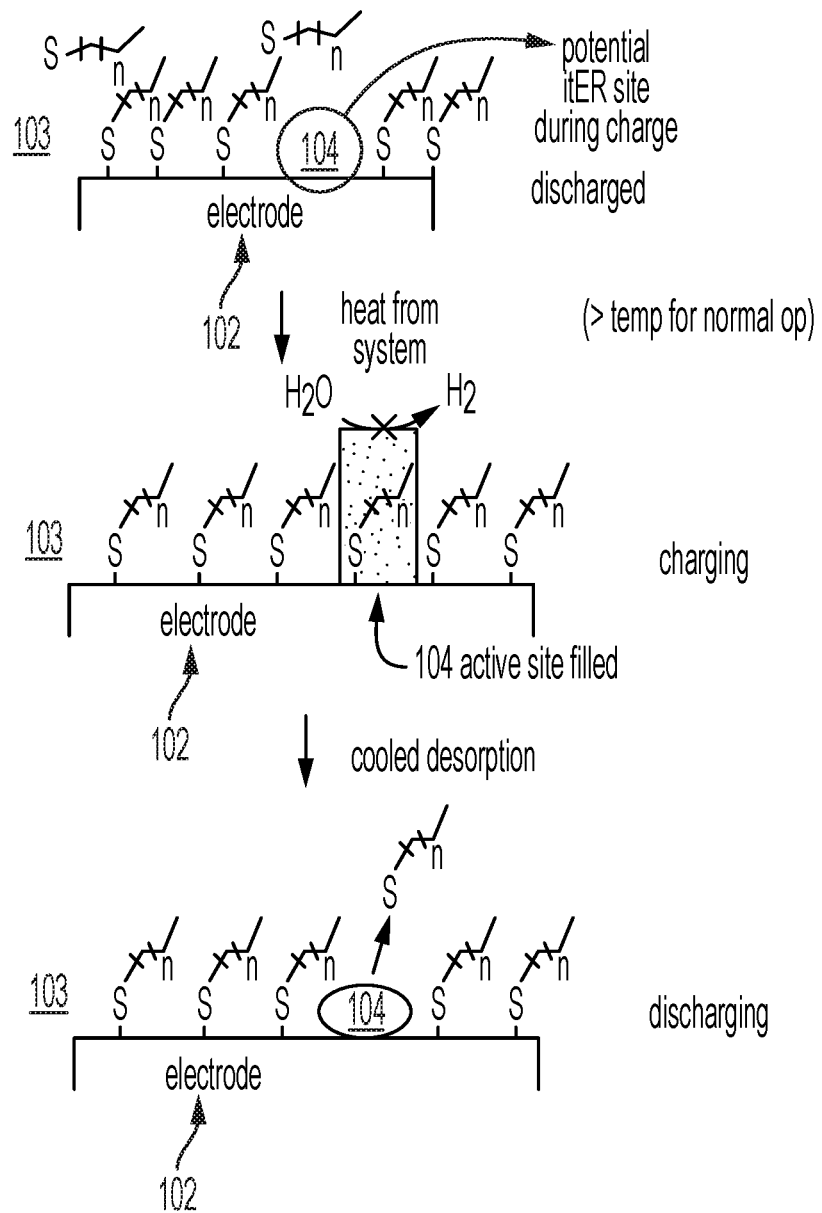
FIG. 1 illustrates an example discharge method.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention. Unless otherwise noted, the accompanying drawings are not drawn to scale.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" and the symbol "~" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

As used herein, unless specified otherwise the terms %, weight % and mass % are used interchangeably and refer to the weight of a first component as a percentage of the weight of the total, e.g., formulation, mixture, particle, pellet, agglomerate, material, structure or product. As used herein, unless specified otherwise "volume %" and "% volume" and similar such terms refer to the volume of a first component as a percentage of the volume of the total, e.g., formulation, mixture, particle, pellet, agglomerate, material, structure or product.

The following examples are provided to illustrate various embodiments of the present systems and methods of the present inventions. These examples are for illustrative purposes, may be prophetic, and should not be viewed as limiting, and do not otherwise limit the scope of the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in-part, based on the teachings of this specification. Further, the various embodiments and examples set forth in this specification may be used with each other, in whole or in part, and in different and various combinations. Thus, the configurations provided in the various embodiments of this specification may be used with each other. For example, the components of an embodiment having A, A' and B and the components of an embodiment having A", C and D can be used with each other in various combination, e.g., A, C, D, and A. A" C and D, etc., in accordance with the teaching of this Specification. Thus, the scope of protection afforded the present inventions should not be limited to a particular embodiment, configuration or arrangement that is set forth in a particular embodiment, example, or in an embodiment in a particular figure.

As used herein, unless specified otherwise, the terms specific gravity, which is also called apparent density, should be given their broadest possible meanings, and generally mean weight per unit until volume of a structure, e.g., volumetric shape of material. This property would include internal porosity of a particle as part of its volume. It can be measured with a low viscosity fluid that wets the particle surface, among other techniques.

As used herein, unless specified otherwise, the terms actual density, which may also be called true density, should be given their broadest possible meanings, and general mean weight per unit volume of a material, when there are no voids present in that material. This measurement and property essentially eliminates any internal porosity from the material, e.g., it does not include any voids in the material.

Thus, a collection of porous foam balls (e.g., Nerf® balls) can be used to illustrate the relationship between the three density properties. The weight of the balls filling a container would be the bulk density for the balls:

$$\text{Bulk Density} = \frac{\text{weight of balls}}{\text{volume of container filled}}$$

The weight of a single ball per the ball's spherical volume would be its apparent density:

$$\text{Apparent Density} = \frac{\text{weight of one ball}}{\text{volume of that ball}}$$

The weight of the material making up the skeleton of the ball, i.e., the ball with all void volume removed, per the remaining volume of that material would be the skeletal density:

$$\text{Skeletal Density} = \frac{\text{weight of material}}{\text{volume of void free material}}$$

As used herein, unless specified otherwise, the term agglomerate and aggregate should be given their broadest possible meanings, and in general mean assemblages of particles in a powder.

Embodiments of the present invention include apparatus, systems, and methods for long-duration, and ultra-long-duration, low-cost, energy storage. Herein, "long duration" and "ultra-long duration" and similar such terms, unless expressly stated otherwise, should be given their broadest possible meaning and include periods of energy storage of 8 hours or longer, such as periods of energy storage of 8 hours, periods of energy storage ranging from 8 hours to 20 hours, periods of energy storage of 20 hours, periods of energy storage ranging from 20 hours to 24 hours, periods of energy storage of 24 hours, periods of energy storage ranging from 24 hours to a week, periods of energy storage ranging from a week to a year (e.g., such as from several days to several weeks to several months), etc. and would include LODES systems. Further, the terms "long duration" and "ultra-long duration", "energy storage cells" including "electrochemical cells", and similar such terms, unless expressly stated otherwise, should be given their broadest possible interpretation; and include electrochemical cells that may be configured to store energy over time spans of days, weeks, or seasons.

In general, in an embodiment, the long duration energy storage cell can be a long duration electrochemical cell. In general, this long duration electrochemical cell can store electricity generated from an electrical generation system, when: (i) the power source or fuel for that generation is available, abundant, inexpensive, and combinations and variations of these; (ii) when the power requirements or electrical needs of the electrical grid, customer or other user, are less than the amount of electricity generated by the electrical generation system, the price paid for providing such power to the grid, customer or other user, is below an economically efficient point for the generation of such power (e.g., cost of generation exceeds market price for the electricity), and combinations and variations of these; and (iii) combinations and variations of (i) and (ii) as well as other reasons. This electricity stored in the long duration electrochemical cell can then be distributed to the grid, customer or other user, at times when it is economical or otherwise needed. For example, the electrochemical cells may be configured to store energy generated by solar cells during the summer months, when sunshine is plentiful and solar power generation exceeds power grid requirements, and discharge the stored energy during the winter months, when sunshine may be insufficient to satisfy power grid requirements.

Various embodiments are discussed in relation to the use of direct reduced iron (DRI) as a material a battery (or cell), as a component of a battery (or cell) and combinations and variations of these. In various embodiments, the DRI may be produced from, or may be, material which is obtained from the reduction of natural or processed iron ores, such reduction being conducted without reaching the melting temperature of iron. In various embodiments the iron ore may be taconite or magnetite or hematite or goethite, etc. In various embodiments, the DRI may be in the form of pellets, which may be spherical or substantially spherical. In various embodiments the DRI may be porous, containing open and/or closed internal porosity. In various embodiments the DRI may comprise materials that have been further processed by hot or cold briquetting. In various embodiments, the DRI may be produced by reducing iron ore pellets to form a more metallic (more reduced, less highly oxidized) material, such as iron metal ($Fe^0$), wustite (FeO), or a composite pellet comprising iron metal and residual oxide phases. In various non-limiting embodiments, the DRI may be reduced iron ore taconite, direct reduced ("DR") taconite, reduced "Blast Furnace (BF) Grade" pellets, reduced "Electric Arc Furnace (EAF)-Grade" pellets, "Cold Direct Reduced Iron (CDRI)" pellets, direct reduced iron ("DRI") pellets, Hot Briquetted Iron (HBI), or any combination thereof. In the iron and steelmaking industry, DRI is sometimes referred to as "sponge iron;" this usage is particularly common in India. Embodiments of iron materials, including for example embodiments of DRI materials, for use in various embodiments described herein, including as electrode materials, may have, one, more than one, or all of the material properties as described in Table 1 below. As used in the Specification, including Table 1, the following terms, have the following meaning, unless expressly stated otherwise: "Specific surface area" means, the total surface area of a material per unit of mass, which includes the surface area of the pores in a porous structure; "Carbon content" or "Carbon (wt %)" means the mass of total carbon as percent of total mass of DRI; "Cementite content" or "Cementite (wt %)" means the mass of $Fe_3C$ as percent of total mass of DRI; "Total Fe (wt %)" means the mass of total iron as percent of total mass of DRI; "Metallic Fe (wt %)" means the mass of iron in the $Fe^0$ state as percent of total mass of DRI; and "Metallization" means the mass of iron in the $Fe^0$ state as percent of total iron mass. Weight and volume percentages and apparent densities as used herein are understood to exclude any electrolyte that has infiltrated porosity or fugitive additives within porosity unless otherwise stated.

TABLE 1

| Material Property | Embodiment Range |
|---|---|
| Specific surface area* | 0.01-25 $m^2/g$ |
| Actual density** | 4.6-7.1 g/cc |
| Apparent density*** | 2.3-6.5 g/cc |
| Minimum $d_{pore,\ 90\%\ volume}$**** | 10 nm-50 μm |
| Minimum $d_{pore,\ 50\%\ surface\ area}$***** | 1 nm-15 μm |
| Total Fe (wt %)# | 65-95% |
| Metallic Fe (wt %)## | 46-90% |
| Metallization (%)### | 59-96% |
| Carbon (wt %)#### | 0-5% |
| $Fe^{2+}$ (wt %)##### | 1-9% |
| $Fe^{3+}$ (wt %)$ | 0.9-25% |
| $SiO_2$ (wt %)$$ | 1-15% |
| Ferrite (wt %, XRD)$$$ | 22-97% |
| Wustite (FeO, wt %, XRD)$$$$ | 0-13% |
| Goethite (FeOOH, wt %, XRD)$$$$$ | 0-23% |
| Cementite ($Fe_3C$, wt %, XRD)+ | <<80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption and a Protein Retention (PR) method may be employed to provide results that can be correlated with BET results.
**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.
***Apparent density preferably determined by immersion in water, and more preferably as is set forth in ISO 15968 (the entire disclosure of which is incorporated herein by reference); recognizing that other tests may be employed to provide results that can be correlated with He pycnometry results. Porosity may be defined as the ratio of apparent density to actual density:

$$Porosity = \frac{apparent\ density}{actual\ density}$$

****$d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 90\%\ volume}$ is the pore diameter above which 90% of the total pore volume exists.

TABLE 1-continued

| Material Property | Embodiment Range |
|---|---|

*****$d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 50\%\ surface\ area}$ is the pore diameter above which 50% of free surface area exists.
Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.
Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titimetry, may be employed to provide results that can be correlated with iron(III) chloride titrimetry.
Metallization (%) preferably determined by the ratio of metallic Fe to total Fe, each as preferably determined by the methods previously described.
Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.
$Fe^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.
$$Fe^{3+}$ (wt %) preferably determined by the mass balance relation between and among Total Fe (wt %), Metallic Fe (wt %), $Fe^{2+}$ (wt %) and $Fe^{3+}$ (wt %). Specifically the equality Total Fe (wt %) = Metallic Fe (wt %) + $Fe^{2+}$ (wt %) + $Fe^{3+}$ (wt %) must be true by conservation of mass, so $Fe^{3+}$ (wt %) may be calculated as $Fe^{3+}$ (wt %) = Total Fe (wt %) − Metallic Fe (wt %) − $Fe^{2+}$ (wt %).
$$$SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.
$$$$Ferrite (wt %, XRD) preferably determined by x-ray diffraction (XRD).
$$$$Wustite (FeO, wt %, XRD) preferably determined by x-ray diffraction (XRD).
$$$$$Goethite (FeOOH, wt %, XRD) preferably determined by x-ray diffraction (XRD).
+Cementite ($Fe_3C$, wt %, XRD) preferably determined by x-ray diffraction (XRD).

Additionally, embodiments of iron materials, including for example embodiments of DRI materials, for use in various embodiments described herein, including as electrode materials, may have one or more of the following properties, features or characteristics, (noting that values from one row or one column may be present with values in different rows or columns) as set forth in Table 1A.

TABLE 1A

| Fe total (wt %)[1] | >60% | >70% | >80% | ~83-94% |
|---|---|---|---|---|
| $SiO_2$ (wt %)[11] | <12% | <7.5% | 1-10% | 1.5-7.5% |
| $Al_2O_3$ (wt %)[111] | <10% | <5% | 0.2-5% | 0.3-3% |
| MgO (wt %)[1111] | <10% | <5% | 0.1-10% | 0.25-2% |
| CaO (wt %)[11111] | <10% | <5% | 0.9-10% | 0.75-2.5% |
| $TiO_2$ (wt %)[&] | <10% | <2.5% | 0.05-5% | 0.25-1.5% |
| Size (largest cross-sectional distance, e.g. for a sphere the diameter) | <200 mm | ~50 to ~150 mm | ~2 to ~30 mm | ~4 to ~20 mm |
| Actual Density (g/cm³)[&&] | ~5 | ~5.8 to ~6.2 | ~4.0 to ~6.5 | <7.8 |
| Apparent Density (g/cm³)[&&&] | <7.8 | >5 | >4 | 3.4~3.6 |
| Bulk Density (kg/m³)[&&&&] | <7 | >1.5 | ~2.4 to ~3.4 | ~1.5 to ~2.0 |
| Porosity (%)[&&&&&] | >15% | >50% | ~20% to ~90% | ~50% to ~70% |

[1]Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.
[11]$SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.

TABLE 1A-continued

‡‡‡Al₂O₃ (wt %) preferably determined by flame atomic absorption spectrometric method, and more preferably as is set forth in ISO 4688-1 (the entire disclosure of which is incorporated herein by reference); recognizing that other tests, such as x-ray diffraction (XRD), may be employed to provide results that can be correlated with flame atomic absorption spectrometric method. In certain methods, the Al₂O₃ wt % is not determined directly, but rather the Al concentration (inclusive of neutral and ionic species) is measured, and the Al₂O₃ wt % is calculated assuming the stoichiometry of Al₂O₃; that is, a 2:3 molar ratio of Al:O is assumed.
‡‡‡‡MgO (wt %) preferably determined by flame atomic absorption spectrometric method, and more preferably as is set forth in ISO 10204 (the entire disclosure of which is incorporated herein by reference); recognizing that other tests, such as x-ray diffraction (XRD), may be employed to provide results that can be correlated with flame atomic absorption spectrometric method. In certain methods, the MgO wt % is not determined directly, but rather the Mg concentration (inclusive of neutral and ionic species) is measured, and the MgO wt % is calculated assuming the stoichiometry of MgO; that is, a 1:1 molar ratio of Mg:O is assumed.
‡‡‡‡‡CaO (wt %) preferably determined by flame atomic absorption spectrometric method, and more preferably as is set forth in ISO 10203 (the entire disclosure of which is incorporated herein by reference); recognizing that other tests, such as x-ray diffraction (XRD), may be employed to provide results that can be correlated with flame atomic absorption spectrometric method. In certain methods, the CaO wt % is not determined directly, but rather the Ca concentration (inclusive of neutral and ionic species) is measured, and the CaO wt % is calculated assuming the stoichiometry of CaO; that is, a 1:1 molar ratio of Ca:O is assumed.
&TiO₂ (wt %) preferably determined by a diantipyrylmethane spectrophotometric method, and more preferably as is set forth in ISO 4691 (the entire disclosure of which is incorporated herein by reference); recognizing that other tests, such as x-ray diffraction (XRD), may be employed to provide results that can be correlated with the diantipyrylmethane spectrophotometric method method. In certain methods, the TiO₂ wt % is not determined directly, but rather the Ti concentration (inclusive of neutral and ionic species is measured, and the TiO₂ wt % is calculated assuming the stoichiometry of TiO₂; that is, a 1:2 molar ratio of Ti:O is assumed.
&&Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.
&&&Apparent density preferably determined by immersion in water, and more preferably as is set forth in ISO 15968 (the entire disclosure of which is incorporated herein by reference); recognizing that other tests may be employed to provide results that can be correlated with He pycnometry results.
&&&&Bulk Density (kg/m³) preferably determined by measuring the mass of a test portion introduced into a container of known volume until its surface is level, and more preferably as is set forth in Method 2 of ISO 3852 (the entire disclosure of which is incorporated herein by reference); recognizing that other tests may be employed to provide results that can be correlated with the massing method.
&&&&&Porosity determined preferably by the ratio of the apparent density to the actual density:

$$\text{Porosity} = \frac{\text{apparent density}}{\text{actual density}}$$

The properties set forth in Table 1, may also be present in embodiments with, in addition to, or instead of the properties in Table 1A. Greater and lesser values for these properties may also be present in various embodiments.

In embodiments the specific surface area for the pellets can be from about 0.05 m²/g to about 35 m²/g, from about 0.1 m²/g to about 5 m²/g, from about 0.5 m²/g to about 10 m²/g, from about 0.2 m²/g to about 5 m²/g, from about 1 m²/g to about 5 m²/g, from about 1 m²/g to about 20 m²/g, greater than about 1 m²/g, greater than about 2 m²/g, less than about 5 m²/g, less than about 15 m²/g, less than about 20 m²/g, and combinations and variations of these, as well as greater and smaller values.

In general, iron ore pellets are produced by crushing, grinding or milling of iron ore to a fine powdery form, which is then concentrated by removing impurity phases (so called "gangue") which are liberated by the grinding operation. In general, as the ore is ground to finer (smaller) particle sizes, the purity of the resulting concentrate is increased. The concentrate is then formed into a pellet by a pelletizing or balling process (using, for example, a drum or disk pelletizer). In general, greater energy input is required to produce higher purity ore pellets. Iron ore pellets are commonly marketed or sold under two principal categories: Blast Furnace (BF) grade pellets and Direct Reduction (DR Grade) (also sometimes referred to as Electric Arc Furnace (EAF) Grade) with the principal distinction being the content of $SiO_2$ and other impurity phases being higher in the BF grade pellets relative to DR Grade pellets. Typical key specifications for a DR Grade pellet or feedstock are a total Fe content by mass percentage in the range of 63-69 wt % such as 67 wt % and a $SiO_2$ content by mass percentage of less than 3 wt % such as 1 wt %. Typical key specifications for a BF grade pellet or feedstock are a total Fe content by mass percentage in the range of 60-67 wt % such as 63 wt % and a $SiO_2$ content by mass percentage in the range of 2-8 wt % such as 4 wt %.

In certain embodiments the DRI may be produced by the reduction of a "Blast Furnace" pellet, in which case the resulting DRI may have material properties as described in Table 2 below. The use of reduced BF grade DRI may be advantageous due to the lesser input energy required to produce the pellet, which translates to a lower cost of the finished material.

TABLE 2

| Material Property | Embodiment Range |
| --- | --- |
| Specific surface area* | 0.21-25 m²/g |
| Actual density** | 5.5-6.7 g/cc |
| Apparent density*** | 3.1-4.8 g/cc |
| Minimum $d_{pore,\ 90\%\ volume}$**** | 50 nm-50 μm |
| Minimum $d_{pore,\ 50\%\ surface\ area}$***** | 1 nm-10 μm |
| Total Fe (wt %)# | 81.8-89.2% |
| Metallic Fe (wt %)## | 68.7-83.2% |
| Metallization (%)### | 84-95% |
| Carbon (wt %)#### | 0.03-0.35% |
| $Fe^{2+}$ (wt %)##### | 2-8.7% |
| $Fe^{3+}$ (wt %)$ | 0.9-5.2% |
| $SiO_2$ (wt %)$$ | 3-7% |
| Ferrite (wt %, XRD)$$$ | 80-96% |
| Wustite (FeO, wt %, XRD)$$$$ | 2-13% |
| Goethite (FeOOH, wt %, XRD)$$$$$ | 0-11% |
| Cementite ($Fe_3C$, wt %, XRD)+ | 0-80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption and a Protein Retention (PR) method may be employed to provide results that can be correlated with BET results.
**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.
***Apparent density preferably determined by immersion in water, and more preferably as is set forth in ISO 15968 (the entire disclosure of which is incorporated herein by reference); recognizing that other tests may be employed to provide results that can be correlated with He pycnometry results. Porosity may be defined as the ratio of apparent density to actual density:

$$\text{Porosity} = \frac{\text{apparent density}}{\text{actual density}}$$

****$d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 90\%\ volume}$ is the pore diameter above which 90% of the total pore volume exists.
*****$d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 50\%\ surface\ area}$ is the pore diameter above which 50% of free surface area exists.
Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.
Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titimetry, may be employed to provide results that can be correlated with iron(III) chloride titrimetry.
Metallization (%) preferably determined by the ratio of metallic Fe to total Fe, each as preferably determined by the methods previously described.
Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.
$Fe^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.
$Fe^{3+}$ (wt %) preferably determined by the mass balance relation between and among Total Fe (wt %), Metallic Fe (wt %), $Fe^{2+}$ (wt %) and $Fe^{3+}$ (wt %). Specifically the equality Total Fe (wt %) = Metallic Fe (wt %) + $Fe^{2+}$ (wt %) + $Fe^{3+}$ (wt %) must be true by conservation of mass, so $Fe^{3+}$ (wt %) may be calculated as $Fe^{3+}$ (wt %) = Total Fe (wt %) − Metallic Fe (wt %) − $Fe^{2+}$ (wt %).

TABLE 2-continued

| Material Property | Embodiment Range |
| --- | --- |

$^{\$\$}$SiO$_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the SiO$_2$ wt % is not determined directly, but rather the Si concentration (inclusive of neutral and ionic species) is measured, and the SiO$_2$ wt % is calculated assuming the stoichiometry of SiO$_2$; that is, a 1:2 molar ratio of Si:O is assumed.
$^{\$\$\$}$Ferrite (wt %, XRD) preferably determined by x-ray diffraction (XRD).
$^{\$\$\$\$}$Wustite (FeO, wt %, XRD) preferably determined by x-ray diffraction (XRD).
$^{\$\$\$\$\$}$Goethite (FeOOH, wt %, XRD) preferably determined by x-ray diffraction (XRD).
$^{+}$Cementite (Fe$_3$C, wt %, XRD) preferably determined by x-ray diffraction (XRD).

The properties set forth in Table 2, may also be present in embodiments with, in addition to, or instead of the properties in Tables 1 and/or 1A. Greater and lesser values for these properties may also be present in various embodiments.

In certain embodiments the DRI may be produced by the reduction of a DR Grade pellet, in which case the resulting DRI may have material properties as described in Table 3 below. The use of reduced DR grade DRI may be advantageous due to the higher Fe content in the pellet which increases the energy density of the battery.

TABLE 3

| Material Property | Embodiment Range |
| --- | --- |
| Specific surface area* | 0.1-0.7 m$^2$/g as received or 0.19-25 m$^2$/g after performing a pre-charge formation step |
| Actual density** | 4.6-7.1 g/cc |
| Apparent density*** | 2.3-5.7 g/cc |
| Minimum d$_{pore,\ 90\%\ volume}$**** | 50 nm-50 µm |
| Minimum d$_{pore,\ 50\%\ surface\ area}$***** | 1 nm-10 µm |
| Total Fe (wt %)$^{\#}$ | 80-94% |
| Metallic Fe (wt %)$^{\#\#}$ | 64-94% |
| Metallization (%)$^{\#\#\#}$ | 80-100% |
| Carbon (wt %)$^{\#\#\#\#}$ | 0-5% |
| Fe$^{2+}$ (wt %)$^{\#\#\#\#\#}$ | 0-8% |
| Fe$^{3+}$ (wt %)$^{\$}$ | 0-10% |
| SiO$_2$ (wt %)$^{\$\$}$ | 1-4% |
| Ferrite (wt %, XRD)$^{\$\$\$}$ | 22-80% |
| Wustite (FeO, wt %, XRD)$^{\$\$\$\$}$ | 0-13% |
| Goethite (FeOOH, wt %, XRD)$^{\$\$\$\$\$}$ | 0-23% |
| Cementite (Fe$_3$C, wt %, XRD)$^{+}$ | <<80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption' and a Protein Retention (PR) method may be employed to provide results that can be correlated with BET results.
**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.
***Apparent density preferably determined by immersion in water, and more preferably as is set forth in ISO 15968 (the entire disclosure of which is incorporated herein by reference); recognizing that other tests may be employed to provide results that can be correlated with He pycnometry results. Porosity may be defined as the ratio of apparent density to actual density:

$$\text{Porosity} = \frac{\text{apparent density}}{\text{actual density}}$$

****d$_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. d$_{pore,\ 90\%\ volume}$ is the pore diameter above which 90% of the total pore volume exists.
*****d$_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. d$_{pore,\ 50\%\ surface\ area}$ is the pore diameter above which 50% of free surface area exists.
$^{\#}$Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.

TABLE 3-continued

| Material Property | Embodiment Range |
| --- | --- |

$^{\#\#}$Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titimetry, may be employed to provide results that can be correlated with iron(III) chloride titrimetry.
$^{\#\#\#}$Metallization (%) preferably determined by the ratio of metallic Fe to total Fe, each as preferably determined by the methods previously described.
$^{\#\#\#\#}$Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.
$^{\#\#\#\#\#}$Fe$^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.
$^{\$}$Fe$^{3+}$ (wt %) preferably determined by the mass balance relation between and among Total Fe (wt %), Metallic Fe (wt %), Fe$^{2+}$ (wt %) and Fe$^{3+}$ (wt %). Specifically the equality Total Fe (wt %) = Metallic Fe (wt %) + Fe$^{2+}$ (wt %) + Fe$^{3+}$ (wt %) must be true by conservation of mass, so Fe$^{3+}$ (wt %) may be calculated as Fe$^{3+}$ (wt %) = Total Fe (wt %) – Metallic Fe (wt %) – Fe$^{2+}$ (wt %).
$^{\$\$}$ SiO$_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the SiO$_2$ wt % is not determined directly, but rather the Si concentration (inclusive of neutral and ionic species) is measured, and the SiO$_2$ wt % is calculated assuming the stoichiometry of SiO$_2$; that is, a 1:2 molar ratio of Si:O is assumed.
$^{\$\$\$}$Ferrite (wt %, XRD) preferably determined by x-ray diffraction (XRD).
$^{\$\$\$\$}$ Wustite (FeO, wt %, XRD) preferably determined by x-ray diffraction (XRD).
$^{\$\$\$\$\$}$ Goethite (FeOOH, wt %, XRD) preferably determined by x-ray diffraction (XRD).
$^{+}$Cementite (Fe$_3$C, wt %, XRD) preferably determined by x-ray diffraction (XRD).

The properties set forth in Table 3, may also be present in embodiments with, in addition to, or instead of the properties in Tables 1, 1A, and/or 2. Greater and lesser values for these properties may also be present in various embodiments.

An electrochemical cell, such as a battery, stores electrochemical energy by using a difference in electrochemical potential generating a voltage difference between the positive and negative electrodes. This voltage difference produces an electric current if the electrodes are connected by a conductive element. In a battery, the negative electrode and positive electrode are connected by external and internal conductive elements in parallel. Generally, the external element conducts electrons, and the internal element (electrolyte) conducts ions. Because a charge imbalance cannot be sustained between the negative electrode and positive electrode, these two flow streams must supply ions and electrons at the same rate. In operation, the electronic current can be used to drive an external device. A rechargeable battery can be recharged by applying an opposing voltage difference that drives an electronic current and ionic current flowing in an opposite direction as that of a discharging battery in service.

In general, but particularly for long-duration storage applications, electrodes and electrode materials that are low-cost and simple to manufacture are desired. Manufacturing and/or fabrication processes may be evaluated and selected based on multiple criteria including capital cost, material throughput, operating costs, number of unit operations, number of material transfers, number of material handling steps, required energy input, amounts of generated waste products and/or by-products, etc.

The present invention relates to materials, electrodes and methods for electrochemical cells, including long-duration electrochemical cells for long-duration energy storage applications.

Various embodiments are discussed in relation to the use of metal agglomerates as a material in a battery (or cell), as a component of a battery (or cell), such as an electrode, and combinations and variations of these. In various embodiments, the iron material may be an iron powder such as a gas-atomized or water-atomized powder, or a sponge iron powder. In various embodiments, the iron agglomerates may be in the form of pellets, which may be spherical or substantially spherical. In various embodiments the agglomerates may be porous, containing open and/or closed internal porosity. In various embodiments the agglomerates may comprise materials that have been further processed by hot or cold briquetting. Embodiments of agglomerates materials for use in various embodiments described herein, including as electrode materials, may have, one, more than one, or all of the material properties as described in Table 4 below. As used in the Specification, including Table 4, the following terms, have the following meaning, unless expressly stated otherwise: "Specific surface area" means, the total surface area of a material per unit of mass, which includes the surface area of the pores in a porous structure; "Total Fe (wt %)" means the mass of total iron as percent of total mass of agglomerates; "Metallic Fe (wt %)" means the mass of iron in the $Fe^0$ state as percent of total mass of agglomerates.

TABLE 4

| Material Property | Embodiment Range |
|---|---|
| Specific surface area* | 0.01-25 m²/g |
| Skeletal density** | 4.6-7.8 g/cc |
| Apparent density*** | 1.5-6.5 g/cc |
| Total Fe (wt %)# | 65-100% |
| Metallic Fe (wt %)## | 46-100% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption and a Protein Retention (PR) method may be employed to provide results that can be correlated with BET results.
**Skeletal density preferably determined by helium (He) pycnometry, and more preferably as is set forth in ISO 12154 (the entire disclosure of which is incorporated herein by reference); recognizing that other tests may be employed to provide results that can be correlated with He pycnometry results. Skeletal density may also be referred to as "true density" or "actual density" in the art.
***Apparent density preferably determined by immersion in water, and more preferably as is set forth in ISO 15968 (the entire disclosure of which is incorporated herein by reference); recognizing that other tests may be employed to provide results that can be correlated with He pycnometry results. Porosity may be defined as the ratio of apparent density to actual density:

$$Porosity = 1 - \frac{apparent\ density}{actual\ density}$$

Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.
Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titimetry, may be employed to provide results that can be correlated with iron(III) chloride titrimetry.

In embodiments the specific surface area for the agglomerates can be from about 0.05 m²/g to about 35 m²/g, from about 0.1 m²/g to about 5 m²/g, from about 0.5 m²/g to about 10 m²/g, from about 0.2 m²/g to about 5 m²/g, from about 1 m²/g to about 5 m²/g, from about 1 m²/g to about 20 m²/g, greater than about 1 m²/g, greater than about 2 m²/g, less than about 5 m²/g, less than about 15 m²/g, less than about 20 m²/g, and combinations and variations of these, as well as greater and smaller values.

The packing of agglomerates creates macro-pores, e.g., openings, spaces, channels, or voids, in between individual agglomerates. The macro-pores facilitate ion transport through electrodes that in some embodiments have a smallest dimension that is still very thick compared to some other types of battery electrodes, being multi-centimeter in dimension. The micro-pores within the agglomerates allow the high surface area active material of the agglomerates to be in contact with electrolyte to enable high utilization of the active material. This electrode structure lends itself specifically to improving the rate capability of extremely thick electrodes for stationary long duration energy storage, where thick electrodes may be required to achieve extremely high areal capacities.

In various embodiments, a bed of conductive microporous agglomerates comprise an electrode in an energy storage system. In some embodiments, said agglomerates comprise agglomerates of direct reduced iron (DRI). The packing of agglomerates creates macro-pores in between individual agglomerates. The macro-pores facilitate ion transport through electrodes that in some embodiments have a smallest dimension that is still very thick as compared to some other types of battery electrodes, being of multiple centimeters in dimension. The macropores may form a pore space of low tortuosity compared to the micro-pores within the agglomerates. The micro-pores within the agglomerates allow the high surface area active material of the agglomerate to be in contact with electrolyte to enable high utilization of the active material. This electrode structure lends itself specifically to improving the rate capability of extremely thick electrodes for stationary long duration energy storage, where thick electrodes may be required to achieve extremely high areal capacities.

The agglomerates for these embodiments, and in particular for use in embodiments of electrodes for long duration energy storage systems, can be any volumetric shape, e.g., spheres, discs, pucks, beads, tablets, pills, rings, lenses, disks, panels, cones, frustoconical shapes, square blocks, rectangular blocks, trusses, angles, channels, hollow sealed chambers, hollow spheres, blocks, sheets, films, particulates, beams, rods, angles, slabs, cylinders, columns, fibers, staple fibers, tubes, cups, pipes, and combinations and various of these and other more complex shapes. The agglomerates in an electrode can be the same or different shapes. The agglomerates in an electrode that is one of several electrodes in a long duration energy storage system, can be the same as, or different from, the agglomerates in the other electrodes in that storage system.

The size of the agglomerates, unless expressly used otherwise, refers to the largest cross-sectional distance of the agglomerate, e.g., the diameter of the sphere. The agglomerates can be the same or different sizes. It is recognized that the shape and size of both the agglomerates, as well as, typically to a lesser degree, the shape and size of the container or housing holding the agglomerates, determines the nature and size of the macro-pores in the electrode. The agglomerates can have sizes from about 0.1 mm to about 10 cm, about 5 mm to about 100 mm, 10 mm to about 50 mm, about 20 mm, about 25 mm, about 30 mm, greater than 0.1 mm, greater than 1 mm, greater than 5 mm, greater than 10 mm and greater than 25 mm, and combinations and variations of these.

In embodiments, the agglomerates as configured in an electrode can provide an electrode having a bulk density of from about 3 g/cm³ to about 6.5 g/cm³, about 0.1 g/cm³ to about 5.5 g/cm³, about 2.3 g/cm³ to about 3.5 g/cm³, 3.2 g/cm³ to about 4.9 g/cm³, greater than about 0.5 g/cm³, greater than about 1 g/cm³, greater than about 2 g/cm³, greater than about 3 g/cm³, and combinations and various of these as well as greater and lesser values.

In various embodiments, additives beneficial to electrochemical cycling, for instance, hydrogen evolution reaction (HER) suppressants may be added to the bed in solid form, for instance, as a powder, or as solid pellets.

In some embodiments, metal electrodes may have a low initial specific surface area (e.g., less than about 5 m²/g and preferably less than about 1 m²/g). Such electrodes tend to have low self-discharge rates in low-rate, long duration energy storage systems. One example of a low specific surface area metal electrode is a bed of agglomerates. In many typical, modern electrochemical cells, such as lithium ion batteries or nickel-metal-hydride batteries, a high specific surface area is desirable to promote high rate capability (i.e., high power). In long duration systems, the rate capability requirement is significantly reduced, so low specific surface area electrodes can meet target rate-capability requirements while minimizing the rate of self-discharge.

In another embodiment, desirable impurities or additives are incorporated into the agglomerates. When these impurities are solids, they may be incorporated by ball-milling (for example, with a planetary ball mill or similar equipment) the powder additive with metal powder, the agglomerates serving as their own milling media. In this way the powder additive is mechanically introduced into the pores or surface of the agglomerate. Agglomerates may also be coated in beneficial additives, for example, by rolling or dipping in a slurry containing the additives. These desirable impurities may include alkali sulfides. Alkali sulfide salts have been demonstrated to vastly improve active material utilization in Fe anodes. Just as soluble alkali sulfides may be added to the electrolyte, insoluble alkali sulfides may be added to the agglomerates, for example, by the above method.

In various embodiments, the specific surface area of the agglomerates is increased by a factor of 3 or more, preferably a factor of 5 or more, as measured by a technique, such as the Brunauer-Emmett-Teller gas adsorption method. In some embodiments, this surface area increase is accomplished by using the agglomerates as an electrode in an electrochemical cell, and electrochemically reducing it with an applied current.

The ratio of electrolyte to iron material, for example agglomerates in a cell may be from about 0.5 $mL_{electrolyte}$:1 $g_{iron-material}$ to about 5 $mL_{electrolyte}$:1 $g_{iron-material}$, from about 0.6 $mL_{electrolyte}$:1 $g_{iron-material}$ to about 3 $mL_{electrolyte}$:1 $g_{iron-material}$, about 0.6 $mL_{electrolyte}$:1 $g_{iron-material}$, about 0.7 $mL_{electrolyte}$:1 $g_{iron-material}$, about 0.8 $mL_{electrolyte}$:1 $g_{iron-material}$, about 1 $mL_{electrolyte}$:1 $g_{iron-material}$, and combinations and variations of these as well as larger and smaller ratios.

A packed bed of agglomerates may be a desirable configuration of an iron-based electrode as it provides for an electronically conductive percolation path through the packed bed while leaving porosity available to be occupied by an electrolyte that facilitates ion transport. In certain embodiments, the ratio of electrolyte volume to agglomerate mass may be in the range of 0.5 mL/g to 20 mL/g, such as 0.5 mL/g to 5mL/g, or such as 0.6 mL/g or 1.0 mL/g. The agglomerates are generally in contact with surrounding agglomerates through a small contact area compared to the surface area of the agglomerate, and in some instances the contact can be considered a "point contact." Contacts of small cross-sectional area may be constrictions for the flow of electrical current that may result in a relatively low electrical conductivity for the agglomerate bed as a whole, which may in turn lead to high electrode overpotentials and low voltaic efficiency of the battery.

In some embodiments, additives comprising a molybdate ion are used in an alkaline battery comprising an iron anode. Without being bound by any particular scientific interpretation, such additives may aid in suppressing the hydrogen evolution reaction (HER) at the iron electrode and improving the cycling efficiency of the battery. The concentration of the additive is selected to be able to suppress HER while still enabling the desired iron charge/discharge process. As an example, a molybdate ion may be added via a molybdate compound such as $KMoO_4$. In one specific example, the electrolyte contains an additive concentration of 10 mM (mM means millimolar, $10^{-3}$ mol/L concentration) molybdate anion. In other embodiments, the electrolyte contains additive concentrations ranging from 1-100 mM of the molybdate anion.

In some embodiments, a surfactant is used to control wetting and bubbling during operation of a metal air battery. During charging, at least two gas evolution reactions may occur that result in bubble formation. One is hydrogen evolution at the metal anode, which is a parasitic reaction that may contribute to poor coulombic efficiency during cycling of the battery. Another is the oxygen evolution reaction, which is necessary for the functioning of the metal-air battery. A surfactant additive can mitigate undesirable effects associated with both reactions. In the case of HER, a hydrophobic surfactant additive may suppress the hydrogen evolution reaction at the metal anode by physically blocking water (a HER reactant) from the metal anode during charging. In the case of ORR, a surfactant additive may reduce electrolyte surface tension and viscosity at the oxygen evolution electrode to generate smaller, uniformly sized, controllable bubbles during charging. In one non-limiting example, 1-Octanethiol is added to the alkaline electrolyte at a concentration of 10 mM to mitigate both of these challenges.

In some embodiments, corrosion inhibitors used in the field of ferrous metallurgy to inhibit aqueous corrosion are used as components in a battery with an iron negative electrode to improve performance In some embodiments, iron agglomerates are used as the negative electrode, and favorable performance characteristics may be achieved by using one or more corrosion inhibitors in a suitable range of concentrations. In these embodiments, the principles of corrosion science are used to prevent undesirable side reactions (e.g. hydrogen evolution) in the charge condition, mitigate the rate of spontaneous self-discharge during an electrochemical hold, and maximize the utilization of iron active material upon discharge. Generally, there are two classes of corrosion inhibitors: interface inhibitors which react with the metal surface at the metal-environment interface to prevent corrosion, and environmental scavengers that remove corrosive elements from the environment surrounding the metal surface to inhibit corrosion. Under the broad umbrella of corrosion inhibitors, appropriate concentrations of inhibitors may be added to the electrochemical cell to achieve favorable performance characteristics with respect to the efficiency and capacity of an electrochemical cell. For the iron electrode of a metal air battery, one applicable general class of inhibitors are liquid and interphase interface inhibitors. This class encompasses three major types of interface inhibitors: anodic, cathodic, and mixed inhibitors. Anodic inhibitors create a passivation layer that inhibits an anodic metal dissolution reaction. Cathodic inhibitors may decrease the rate of a reduction reaction (HER in the case of an iron electrode), or precipitate at cathodic active sites to block the same reduction reaction. Mixed inhibitors may inhibit corrosion via one or both pathways, and include but are not limited to molecules that adsorb on the metal surface physically or chemically to form a film that may block active sites for a reduction reaction. The inhibitors can be added to a base electrolyte at any concentration.

In various embodiments, an inhibitor that forms a passivation layer on the metal surface is paired with an additive that de-passivates the iron surface. In the correct concentrations, an optimal balance of corrosion inhibition and active material utilization may be achieved. In one specific embodiment, when using direct reduced iron as the negative electrode, 10 mM molybdate anion is used as the passivator, while 10 mM sulfide anion is used as the de-passivator in an alkaline electrolyte comprised of 5.5M potassium or sodium hydroxide. Specific examples of electrolyte compositions include: 5.5 M KOH+0.5 M LiOH+10 mM Na$_2$S+10 mM 1-octanethiol; 5.95 M NaOH+50 mM LiOH+50 mM Na$_2$S+10 mM 1-octanethiol; 5.95 M NaOH+50 mM LiOH+50 mM Na$_2$S+10 mM 1-octanethiol+10 mM K$_2$MoO$_4$; and 5.95 M NaOH+50 mM LiOH+50 mM Na$_2$S+10 mM K$_2$MoO$_4$. However, the present disclosure is not limited to any particular concentration of the above additives in the electrolyte. For example, one or more of the above additives may be included in the electrolyte at concentrations ranging from about 2 mM to about 200 mM, such as from about 5 mM to about 50 mM, or about 5 mM to about 25 mM.

For a physically adsorbed (chemisorbed or physisorbed) inhibitor, interaction with the metal surface is often strongly dependent on temperature.

In one embodiment, an inhibitor is used where desorption of the inhibitor from the iron surface may be favorable at lower temperatures with respect to a normal operational temperature. During charge, the inhibitor forms a film that suppresses the evolution of hydrogen at the electrode. On discharge the temperature of the cell can be increased or decreased such that the inhibitor desorbs from the metal surface and exposes active material to allow for improved electrode utilization. On the subsequent charge, the temperature of the cell may be returned to a normal operational temperature to reform the film and suppress HER. This process may be repeated to achieve high charging efficiencies and high discharge utilization of the iron electrode. In one non-limiting example, octanethiol may be used as an inhibitor that can physisorb or chemisorb on a metal anode (e.g. Fe, Ni). Upon heat treatment of an electrochemical cell up to 60° C., physisorbed octanethiol is desorbed, revealing more active sites that can be oxidized during discharge. Free octanethiol in the electrolyte then physisorbs to the anode again upon cooling. At higher temperatures (>60° C.), octanethiol may chemisorb to the electrode, forming continuous, uniform films across the surface. These chemisorbed species may be desorbed more effectively at low temperatures (<100° C.).

In order to enable performance at higher temperature, organic film-forming inhibitors with oxygen, sulfur, silicon, or nitrogen functional groups can be used to form continuous chemisorbed films on the iron particulate electrode to replicate the depassivating behavior of the sulfide while resisting decomposition or oxidation.

In one embodiment, 1 to 10 mM octanethiol is added to the electrolyte. During charge, the system is allowed to heat to temperatures outside of normal operating conditions (e.g., >50° C.), facilitating the formation of more complete and uniform chemisorbed octanethiol films across the active sites of the iron particulate electrode and preventing hydrogen evolution at the surface. On discharge, the system is cooled and portions of the chemisorbed film desorb from the surface, revealing additional active sites for discharge. The remaining octanethiol acts to depassivate the electrode, facilitating more complete discharge. FIG. 1 illustrates an example method of facilitating such complete discharge. For example, FIG. 1 illustrates the electrode 102 in a discharge state at the top of the figures. A potential hydrogen evolution reaction (HER) site 104 was created during discharge where a octanethiol film desorbed from the electrode 102 surface. In the next step of the method as illustrated in the middle of FIG. 1, 1 to 10 mM octanethiol is added to the electrolyte 103. During charge, the system is allowed to heat to temperatures outside of normal operating conditions (e.g., >50° C.), facilitating the formation of more complete and uniform chemisorbed octanethiol films across the active sites of the iron particulate electrode 102 and preventing hydrogen evolution at the surface of the electrode 102 as the octanethiol film filed in the potential HER site 104. On discharge, the system is cooled and portions of the chemisorbed film desorb from the surface, revealing additional active sites for discharge, such as the HER site 104. The remaining octanethiol acts to depassivate the electrode 102, facilitating more complete discharge.

During an electrochemical rest period, it is desirable to minimize the corrosion of the metal electrode. One type of corrosive media to an iron metal electrode in an aqueous electrolyte is dissolved oxygen. During an electrochemical hold, dissolved oxygen can contact the iron electrode and corrode the active material, discharging the iron electrode.

In one embodiment, an oxygen scavenger (e.g. pyrogallol, ascorbic acid, 8-hydroxyquinoline, sodium peroxide, hydrogen peroxide) may be added to the electrolyte during an electrochemical hold to reduce the concentration of dissolved oxygen in the electrolyte and prevent discharge of the iron electrode.

In one embodiment, an anodic corrosion inhibitor (e.g. K$_2$MoO$_4$) is added to the electrolyte at concentrations between 1 and 10 mM before an electrochemical hold, creating a passive film that blocks the metal surface from corrosive media in the electrolyte to prevent self discharge. After the electrochemical hold, when the electrode must be discharged, an aggressive ion (e.g. $SO_4^{2-}$, $CrO_4^-$, $NO_3^-$) is added to the electrolyte to expose the active material and achieve a high utilization of active material, thus mitigating self discharge.

In certain embodiments, other corrosion inhibitors are incorporated in the electrolyte as additives (i.e., as minority constituents). Electrolyte additives may be selected from the non-limiting set of sodium thiosulfate, sodium thiocyanate, polyethylene glycol (PEG) 1000, trimethylsulfoxonium iodide, zincate (by dissolving ZnO in NaOH), hexanethiol, decanethiol, sodium chloride, sodium permanganate, lead (IV) oxide, lead (II) oxide, magnesium oxide, sodium chlorate, sodium nitrate, sodium acetate, iron phosphate, phosphoric acid, sodium phosphate, ammonium sulfate, ammonium thiosulfate, lithopone, magnesium sulfate, iron(III) acetylacetonate, hydroquinone monomethyl ether, sodium metavanadate, sodium chromate, glutaric acid, dimethyl phthalate, methyl methacrylate, methyl pentynol, adipic acid, allyl urea, citric acid, thiomalic acid, N-(2-aminoethyl)-3-aminopropyl trimethoxysilane, propylene glycol, trimethoxysilyl propyl diethylene, aminopropyl trimethoxysilane, dimethyl acetylenedicarboxylate (DMAD), 1,3-diethylthiourea, N,N'-diethylthiourea, aminomethyl propanol, methyl butynol, amino modified organosilane, succinic acid, isopropanolamine, phenoxyethanol, dipropylene glycol, benzoic acid, N-(2-aminoethyl)-3-aminopropyl, behenamide, 2-phosphonobutane tricarboxylic, mipa borate, 3-methacryloxypropyltrimethoxysilane, 2-ethylhexoic acid, isobutyl alcohol, t-butylaminoethyl methacrylate, diisopropanolamine, propylene glycol n-propyl ether, sodium benzotriazolate, pentasodium aminotrimethylene phosphonate, sodium cocoyl sarcosinate, laurylpyridinium chloride, steartrimonium chloride, stearalkonium chloride, calcium montanate, quaternium-18 chloride, sodium hexametaphosphate, dicyclohexylamine nitrite, lead stearate, calcium dinonylnaphthalene sulfonate, iron(II) sulfide, sodium bisulfide, pyrite, sodium nitrite, complex alkyl phosphate ester (e.g. RHODAFAC® RA 600 Emulsifier), 4-mercaptobenzioc acid, ethylenediaminetetraacetic acid, ethylenediaminetetraacetate (EDTA), 1,3-propylenediaminetetraacetate (PDTA), nitrilotriacetate (NTA), ethylenediaminedisuccinate (EDDS), diethylenetriaminepentaacetate (DTPA), and other aminopolycarboxylates (APCs), diethylenetriaminepentaacetic acid, 2-methylbenzenethiol, 1-octanethiol, manganese dioxide, manganese (III) oxide, manganese (II) oxide, manganese oxyhydroxide, manganese (II) hydroxide, manganese (III) hydroxide, bismuth sulfide, bismuth oxide, antimony(III) sulfide, antimony(III) oxide, antimony(V) oxide, bismuth selenide, antimony selenide, selenium sulfide, selenium(IV) oxide, propargyl alcohol, 5-hexyn-1-ol, 1-hexyn-3-ol, N-allylthiourea, thiourea, 4-methylcatechol, trans-cinnamaldehyde, Iron(III) sulfide, calcium nitrate, hydroxylamines, benzotriazole, furfurylamine, quinoline, tin(II) chloride, ascorbic acid, 8-hydroxyquinoline, pyrogallol, tetraethylammonium hydroxide, calcium carbonate, magnesium carbonate, antimony dialkylphosphorodithioate, potassium stannate, sodium stannate, tannic acid, gelatin, saponin, agar, 8-hydroxyquinoline, bismuth stannate, potassium gluconate, lithium molybdenum oxide, potassium molybdenum oxide, hydrotreated light petroleum oil, heavy naphthenic petroleum oil (e.g. sold as Rustlick® 631), antimony sulfate, antimony acetate, bismuth acetate, hydrogen-treated heavy naphtha (e.g. sold as WD-40®), tetramethylammonium hydroxide, NaSb tartrate, urea, D-glucose, C6Na2O6, antimony potassium tartrate, hydrazine sulfate, silica gel, triethylamine, potassium antimonate trihydrate, sodium hydroxide, 1,3-di-o-tolyl-2-thiourea, 1,2-diethyl-2-thiourea, 1,2-diisopropyl-2-thiourea, N-phenylthiourea, N,N'-diphenylthiourea, sodium antimonyl L-tartrate, rhodizonic acid disodium salt, sodium selenide, potassium sulfide, and combinations thereof.

Additional additives include minerals containing $SiO_2$, which may have beneficial effects on electrochemical performance due to uptake of carbonate from the electrolyte or electrode. Additives which contain such functional groups may be usefully incorporated into iron electrode materials. While the specific mineralogy of ores and other factors may determine the exact $SiO_2$-containing material added, examples of such $SiO_2$-containing additives are silica, cristobalite, sodium silicates, calcium silicates, magnesium silicates, and other alkali metal silicates.

In certain embodiments, electrode agglomerates are prepared by agglomerating metal powders, such as iron containing powders, into approximately spherical agglomerates. In various embodiments the agglomeration is conducted at or about room temperature or at or about ambient outdoor temperature or at elevated temperature. In various embodiments, the agglomeration is conducted in a rotary calciner, in which the powder is simultaneously agglomerated and sintered. In certain embodiments, iron powders such as atomized iron powder, sponge iron powder, iron filings, mill scale, carbonyl iron powder, electrolytic iron powder, and combinations or variations thereof are used as feedstocks. In various embodiments, the heat treatment process is conducted at temperatures such as about 700° C. to about 1200° C. such as about 800° C. to about 1000° C. In various embodiments the gas environment is inert (comprising $N_2$ or Ar) or reducing (comprising $H_2$, $CO_2$, CO, etc) or combinations thereof. In various embodiments the heat treatment process fully or partially sinters together the powder to create agglomerates. In various embodiments the agglomerates have size ranging from 1 um (um=$10^{-6}$ m) to 1 cm (cm=$10^{-2}$ m) such as 10 um, 100 um, or 1 mm (mm=$10^{-3}$ m).

In certain embodiments, the feedstock materials are materials known in the art as pig iron, granulated pig iron, nodule reduced iron, scrap iron, and/or scrap steel.

In various embodiments, a fine iron powder with a substantial population of powder particles being below 44 microns (often written as −325 mesh due to the passage of such particles through a 325 mesh sieve) may be utilized as a portion of the feedstock materials or entirely comprise the feedstock materials.

In certain embodiments, electrodes are fabricated by electrochemical deposition of iron from an aqueous solution. In certain embodiments the deposition solution is acidic, with a pH less than about 4, such as pH about 3, or pH about 2. In certain embodiments, the solution is near neutral, with a pH between about 4 and about 10, such as pH about 5 or pH about 7 or pH about 9. In certain embodiments the electrolyte comprises a salt such as NaCl or LiCl or KCl. In certain embodiments the liquid electrolyte is agitated by stirring, shaking, mixing, or turbulent flow to promote an uneven deposition rate and a porous structure. In certain embodiments the liquid electrolyte is sparged or aspirated, to introduce gas bubbles into the liquid during the deposition process.

In certain embodiments, iron powders are prepared by an electrometallurgical process for making porous iron. Working from a melt, iron-comprising metal is sprayed, bubbled through, or molded onto a substrate or into a mold to produce a low-cost, high surface area iron product. In certain embodiments, these powders are subsequently agglomerated using a rotary calciner or other methods, and may be subsequently assembled into an electrode. In certain embodiments the powders are directly assembled into an electrode, with no intermediate agglomeration process. In certain embodiments, a mixture or combination of agglomerated and non-agglomerated powders are used in an electrode. In certain embodiments, agglomerated and/or non-agglomerated powders produced by the electrometallurgical method are combined with other metals to fabricate an electrode.

Electrochemically produced metals offer a unique opportunity for production of high surface area materials, especially if the metal is in a liquid state, in which case the resulting liquid product is cooled via a variety of methods to achieve the desired properties. For example, iron produced via high temperature electrometallurgical is cooled directly in a high surface area mold, spray deposited (atomized) into particles or dispersed in a cooling media.

In certain embodiments, metal electrodes are directly prepared by electrometallurgical processes such as molten oxide electrolysis. In certain embodiments, porous electrodes are made by intentionally aspirating or sparging gas into a molten oxide electrolysis cell. In certain embodiments, the gas is an inert gas such as $N_2$ or Ar.

In certain embodiments, molten metal from an electrometallurgical process is sprayed, bubbled through, or molded onto a substrate or into a mold to produce a low-cost, high surface area metal electrode. In certain embodiments the metal is substantially iron.

In one non-limiting example, iron ore comprising $Fe_2O_3$, $Fe_3O_4$, and mixtures thereof, is dissolved in an electrolyte comprising $SiO_2$, $Al_2O_3$, MgO, and CaO in weight ratios of 60 wt %, 20 wt %, 10 wt %, and 10 wt %, respectively. The mixture is brought to an elevated temperature of about 1600° C. Metallic iron is electrochemically reduced from the molten oxide mixture and pooled at the cathode. The molten metal is transferred by pipes and valves to a shot tower, and is rapidly cooled in vacuum to produce a fine iron powder with average diameter of 50 um (um=$10^{-6}$ m). The iron powder is subsequently passed into a rotary calciner operating under a nitrogen ($N_2$, 100%) atmosphere at 900° C. to form aggregates with average diameter of 2 mm, which are subsequently assembled by packing into a metal electrode.

In certain embodiments, the electrodes may be fabricated from the thermochemical reduction of iron oxides. In some embodiments, the reduction may proceed almost to complete reduction of the iron oxides to metallic iron. Nearly complete reduction of the iron oxide to metallic iron is the goal of many industrial thermochemical reduction processes for iron. However, there are many potential reasons why incomplete reductions of iron oxides to metallic iron would make such incompletely-reduced products particularly useful for the creation of iron batteries. First, several of the oxide phases created during the reduction of iron are semiconducting, and thus may usefully serve as electronic conductors in an iron electrode material. For example, magnetite is fairly conductive close to room temperature. Wüstite, while less conductive than magnetite, is still highly conductive relative to most oxides. In some embodiments, one may take advantage of the semiconducting nature of wustite and magnetite to form a battery electrode which is possibly a composite with metallic iron. Partially reduced products may also be more electrochemically active. The inventors have observed that wüstite may in some circumstances be more electrochemically active than even metallic iron. Wüstite may be less expensive to thermochemically reduce due to its higher oxidation state than metallic iron Wüstite may therefore be less expensive and higher performance than iron as a component of a battery electrode. In one aspect, a positive electrode for an alkaline iron battery may be produced from indurated pellets composed of hematite traditionally fed to direct reduction or blast furnace processes. The pellets may be reduced in a vertical shaft furnace via appropriate mixtures of hydrocarbons and other reducing gases known in the art of the direct reduction of iron. The reduction process may terminate by way when a metallization of at most 95% is achieved (metallization is a term used in the art of direct reduction of iron to describe the fraction of iron atoms which are fully metallic in their oxidation state). In some instances, a lower metallization may be preferred, with metallizations as low as 0% yielding large quantities of magnetite and wüstite as alternative input materials for a battery. The resulting partially reduced pellets, lump, fragment or other particulate may be packed into a bed of particles in order to serve as an iron electrode material. The electrode material may consist entirely of iron oxides, and comprise primarily a mixture of magnetite and wustite.

Current Collection, Compression, and Other Means of Enhancing Charge Transfer

In some instances, porous iron electrode materials may suffer from high electrical resistance when assembled into a bed. As such, the performance of iron electrode materials inside a battery may be enhanced by methods for decreasing the resistance to charge transfer between and among the particulate materials, and enhanced methods for current collection from the electrode active materials. This section describes methods for enhancing the charge transfer within the packed bed through to the current collectors.

The inventors have discovered through experiment that the performance of porous iron electrodes may be enhanced by applying a compressive force to the anode bed during the course of battery cycling. For example, the contact resistance between porous particulate materials may be decreased by over one order of magnitude by application of a uniaxial compressive stress of 0.01 MPa or more. Too high of compressive stresses may lead to local failure of the electrode material via cracking of the material (and therefore potential local decreases in electrical conduction), densification due to deformation of the porous iron electrode material without cracking (which may in turn lead to a reduction in the pore space available for the formation of discharge product or a decrease in the mass transport through the pore space), or other mechanical failure modes. The application of compressive stresses that do not lead to material failure but are above the stresses needed for reduction of contact resistance may lead to increases in the performance of the porous iron electrode material during electrochemical cycling. Within this regime, further increases in compressive stresses and different configurations of compressive stresses may be used to increase the conductivity of the bed, with stresses on the order of 0.1-10 MPa yielding enhanced performance in some systems. As the applied stresses (and therefore forces) increase, the requirements for the mechanical enclosure which may successfully apply such stresses become more stringent, and generally the costs of the enclosure increases. Thus, in one aspect, a mechanical structure which permits simultaneous current collection and compression of a porous iron electrode material with stresses between 0.1 and 10 MPa is an especially useful means of containing the iron electrode materials within an electrochemical cell.

In various embodiments, it may be useful for a current collector to serve multiple functions in the cell, including serving as a structural member. In one example, the current collector may provide structural support to the electrode by running through a middle of the packed bed of particulate material. In some embodiments, the packed bed may have current collectors on both sides in addition to a central current collector. In some embodiments, the current collector in the middle of the packed bed may be fabricated from a sheet without perforations, whereas the current collectors on the external faces may be perforated or otherwise containing holes to facilitate transport of ions to the electrode active materials. In various embodiments, air electrodes or other positive electrode materials may be placed adjacent to the iron electrode material on both sides such that ions do not need to flow through the electrode material across a given depth in the electrode, this may be due to e.g. a plane of symmetry for the transport. As such, a lack of perforations in the current collector included in the middle of the bed may usefully reduce costs for the center current collecting sheet while having little to no impact on the transport within the system. The iron electrode materials may be mounted to or compressed against a combined structural support and current collector included in the middle of the packed bed. Additional functions performed by a current collecting component in an iron electrode may include: anode locating/mounting, enhanced current collection, adjacent cell separation, and voltage stacking.

The degree to which the resistivity of a porous electrode must be reduced to reach a given level of electrochemical performance is a function of the current collection method, as well as the material properties. If current is being collected from more sides, or with shorter total path lengths to the current collector, a battery may be able to operate efficiently with a higher resistivity path, as the ultimate voltage drop is lower. As such, the compression strategies and the current collection strategies for porous iron electrodes may be usefully co-optimized to yield systems with the lowest total cost for a given level of performance Below, a set of techniques and designs for current collection from, and compression of, porous electrode beds which may be used in combination or separately in order to yield high performance porous battery electrodes with low price.

The current collecting materials may be any of those used in the art to collect current in alkaline batteries at the potentials that anodes in alkaline iron-based batteries may be exposed to. The composition of the electrolyte, the specific potentials used during battery cycling, and other process variables (e.g. temperature) will determine the degree to which various current collecting materials are stable. These materials may include nickel, nickel-plated stainless steel, copper, copper plated stainless steel, iron of sufficient thickness, carbon fiber and other carbon-based materials, and iron coated with cobalt ferrite.

Figure 2:
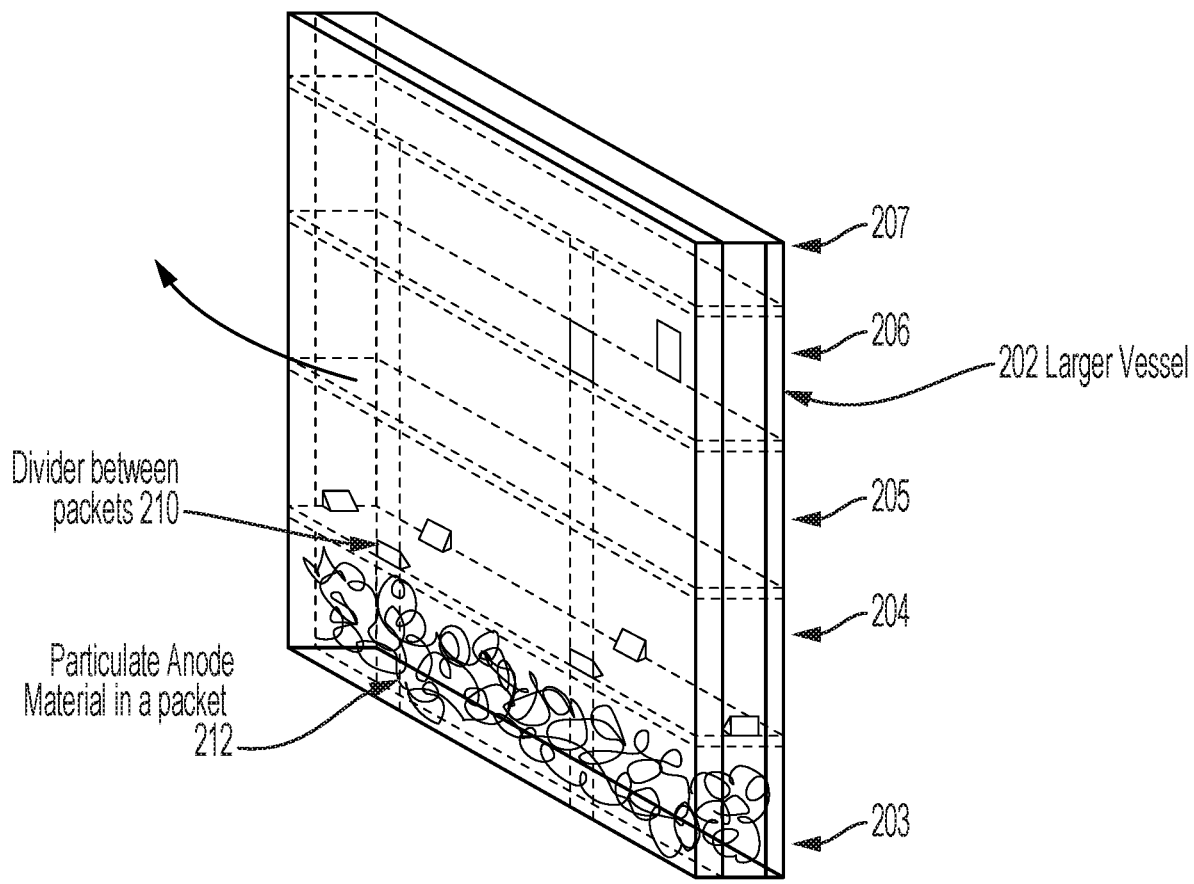
FIGS. 2 and 3 illustrate aspects of an electrode divided up into horizontal layers contained in a larger vessel.
Figure 3:
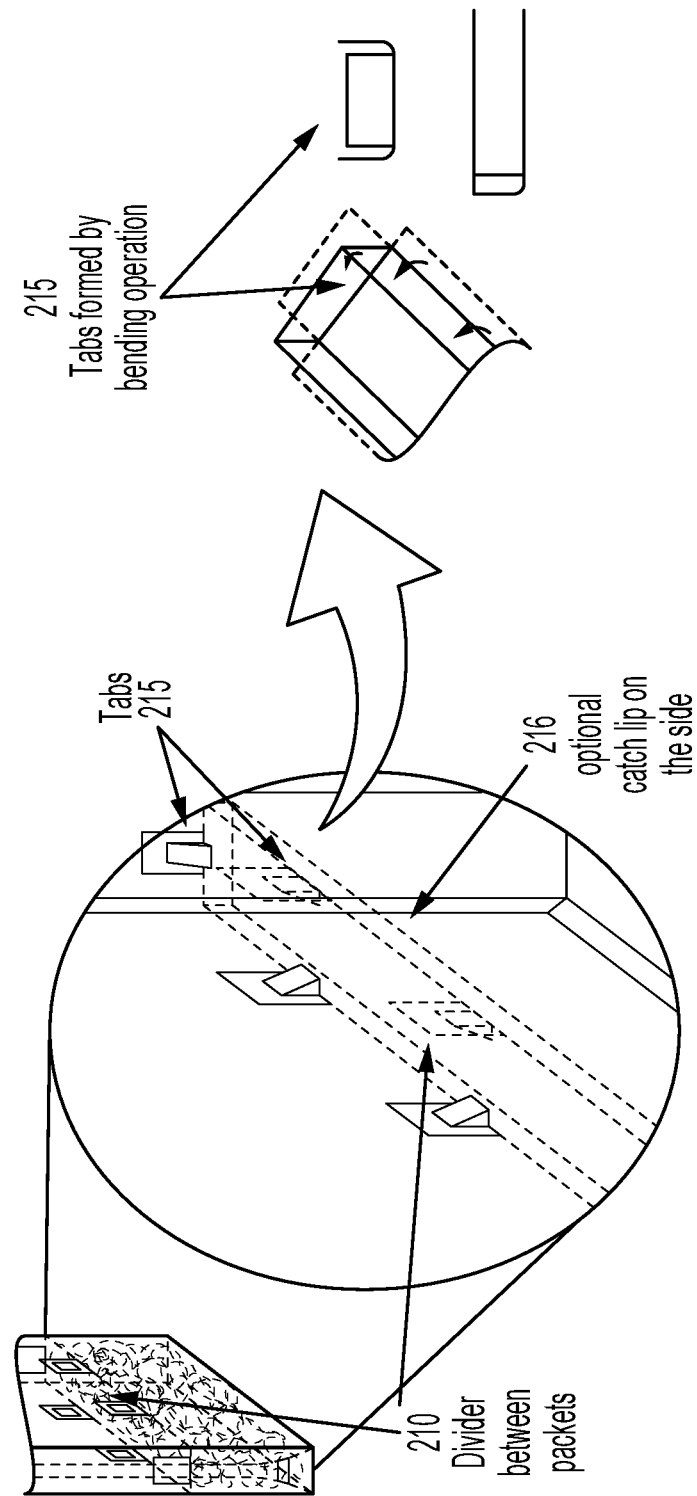

In one aspect, a reactor containing a porous iron electrode may be divided up into horizontal layers contained in a larger vessel. FIGS. 2 and 3 illustrate example aspects of such an embodiment in which a larger vessel 202 is divided into horizontal layers 203-207. With reference to FIGS. 2 and 3, these horizontal layers (e.g., 203-207) may be referred to as packets. In each of these horizontal layers (e.g., 203-207), the anode, such as particulate anode material 212, may be compressed via any of the methods applicable for compressing and containing particulate materials. In doing so, a current-collecting divider 210 between the packet may be inserted into the larger vessel 202 holding the packets (e.g., 203-207). Tabs 215 on the divider 210 or other compliant, conductive mechanisms may be used to hold the compressive forcer (e.g., divider 210) for the packet (e.g., 203-207) in place while also serving as a means of current collection. This is shown in FIGS. 2 and 3. The divider 210 may also include an optional catch lip 216 on the side.

Figure 4:
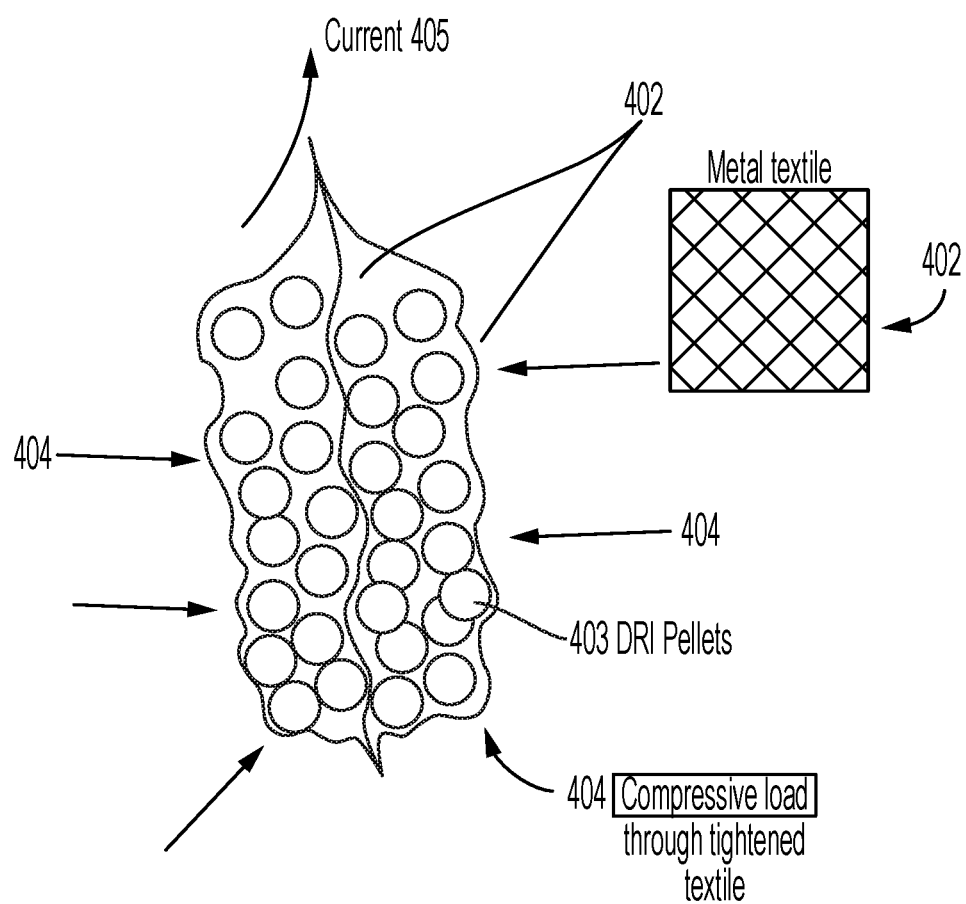
FIG. 4 illustrates a metal textile with an electrode composed of direct reduced iron pellets

In an aspect, the current collector may be a metallic or other conductive textile. Examples include meshes woven of nickel, copper, or graphite fibers. The current collector may surround or be layered into the electrode materials. The current collecting textile may surround a Direct Reduced Iron (DRI) pellet bed as an electrode shown below. The textile may be tightened, cinched, or otherwise brought into close mechanical contact with the electrode material in order to promote sufficient electrical contact with electrode material. An illustrative example is shown in FIG. 4 for the case of a metal textile 402 with an electrode composed of direct reduced iron pellets 403. The metal textile 402 may be a mesh or screen encasing the DRI pellets 403 and providing a compressive force or load 404 on the DRI pellets 403 to press the DRI pellets 403 together within the metal textile 402 mesh and to establish close contact between the metal textile 402 and the DRI pellets 403. The current 405 may be collected by the metal textile 402.

In another aspect, a conductive mesh pouch or bag may be used as a means of simultaneously compressing and current-collecting from an electrode material. More specifically, a mesh pouch or bag may be filled with particulate iron electrode material, the bag may be cinched or otherwise reduced in volume via a belt, string, wire or other cinching mechanism in order to apply compression to the anode material. A conductive mesh tube or similar may be filled with particulate iron electrode material, and the electrode material may be compressed via application of axial tension to the conductive mesh tube. In such a case, the weave of the mesh may be optimized such that the mesh tube undergoes substantial compression upon application of axial tension. One may understand this in analogy to the Chinese finger trap, wherein axial extension of a woven tube causes the diameter of the tube to narrow. The amount of compression applied to the particulate iron material may be adjusted by the thickness of the strands in the weave, the density of the strands in the weave, and the amount of axial force/extension applied to the weave. In some instances, the porous iron electrode material may be composed of direct reduced iron pellets. In some instances, the porous iron electrode material may be composed of crushed direct reduced iron pellets. A binder may usefully be included in the particulate iron material in some cases to aid in adhesion of the pellet.

Figure 5:
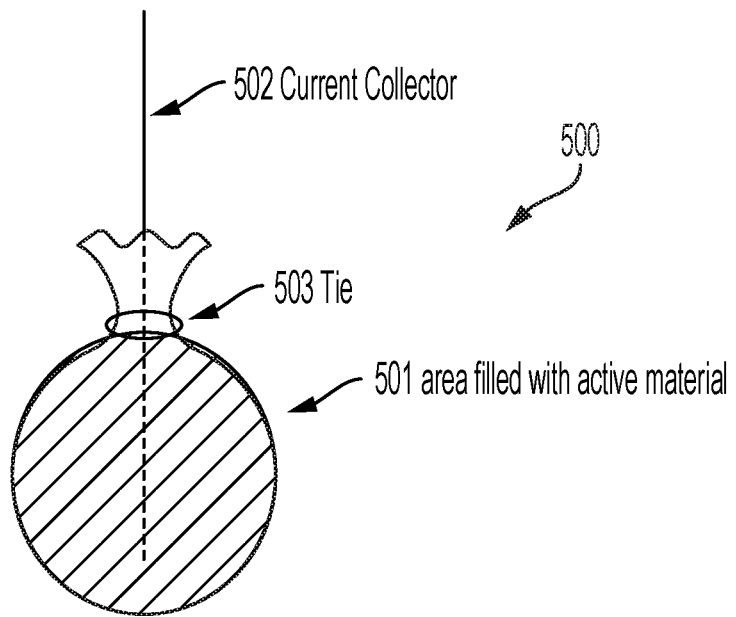
FIGS. 5 and 6 illustrate example porous mesh container aspects.
Figure 6:
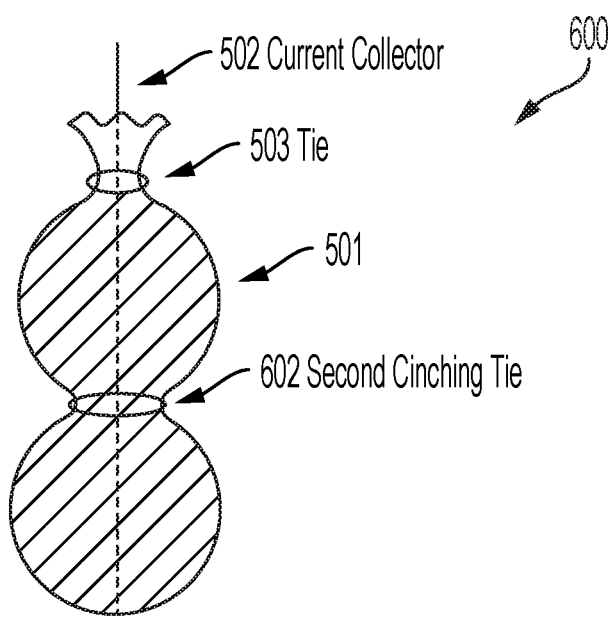

In some aspects, a porous mesh container and the particulate active materials may be disposed in a similar geometric manner to a teabag and tea leaves, for example as illustrated in FIGS. 5 and 6. FIG. 5 illustrates a single cinch configuration 500 in which the porous mesh bag 501 is tied at a single cinch point 503 by the current collector 502. FIG. 6 illustrates a double cinch configuration 600 in which the porous mesh bag 501 is tied at a first cinch point 503 by the current collector 502 and a second cinching point 602. This tea bag container (e.g., 501) may be conducting and serve as a current collector. In some aspects, the tea bag container (e.g., 501) may have a current collector placed inside of the tea bag container's envelope. The tea bag container (e.g., 501) may have ties to aid in compression, including ties that are not at the top of the tea bag container (e.g., 501), such as a second cinch tie 602 or other placed cinch ties. The tea bag container (e.g., 501) may also have ties at the top of the container to maintain active material within the container. In another aspect, the tea bag container (e.g., 501) may be non-conductive and the current collective may be performed solely through a current collector placed inside of the tea bag container's envelope.

Figure 7:
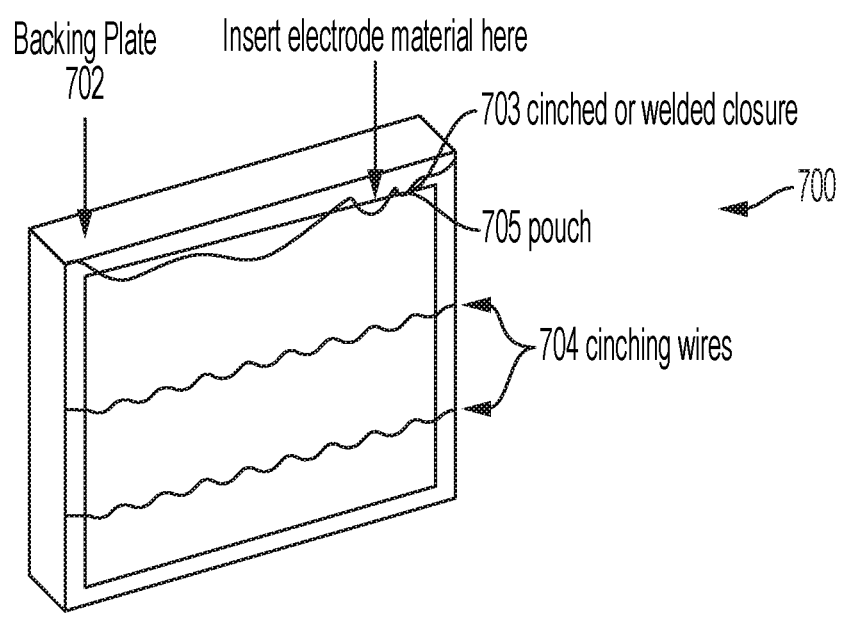
FIG. 7 illustrates an example backing plate.

In another aspect, a loose, flexible, conducting sheet may loosely attached at the edges to a backing plate, which may or may not be rigid, forming a pouch. Cinches, such as wires, inserted through the flexible sheet and the back, are opened to allow filling the pouch with a pellet or powder anode material. The cinches are pulled shut to compress the anode, and may be used for current collection. The cinching wires may be conductive and serve as added current collectors distributed throughout the pouch. The pouch may also be attached in a rigid manner (by e.g. welds), or by connections which are rigid with respect to some forms of motion and flexible with respect to others (e.g. a hinged connection). In some instances, the current collection may take place from one side such that either the backing plate or the pouch are not current-collecting, whereas in other instances it may be advantageous to collect current from both sides of the pouch construction. An example of such a cinched construction 700 with a backing plate 702 is shown by way of non-limiting example in FIG. 7. In some embodiments, the backing plate 702 may be used to rigidly support pouches 705 on both sides as illustrated in FIG. 7 with cinching wires 704 running across the backing plate 702 and pouches 705. Electrode material may be poured into the pouches 705 through an opening that may be then cinched or welded closed to form a closure 703.

In another embodiment, a particulate electrode material may be compressed within perforated sheets. The sheets may be conductive such that they serve as both a means of compressing the electrode material and a means of collecting current from the electrode material. The perforations in the sheet may be selected such that they are smaller than a characteristic size of the particulate material, and thus that the particulate material may not easily escape from the cage formed by the perforated sheet.

In various embodiments, the electrode material may be a particulate material. The desire for facile transport of ions between the positive and negative electrodes may necessitate that the materials surrounding the electrode materials are porous or otherwise perforated. In some instances, a particulate material with a particle size finer than the porosity or perforations may be desired due to e.g. the difficulties of making very fine perforations. In instances where particles finer than the porosity or perforations are desired, the electrode material may be agglomerated via a binder such that a secondary particle forms which is composed of many primary particles. The primary particle sizes thus may be finer than the perforations, but the secondary particle size may be coarser than the perforations. Such coarser particles will be less susceptible to egress through the porosity or perforations of the current collectors and other compressing materials, and may be more effectively compressed as a result. In one aspect, a polymer stable in alkaline conditions may be used to bind an agglomerate together such as poly(ethylene) or poly(tetrafluoroethylene). In another aspect, a polymer may be introduced onto the surface of the primary particles and subsequently pyrolyzed to form a conducting binder on the surface of the primary particles, thereby binding them together. In yet another aspect, a polymeric binder that is only partially stable in the conditions appropriate to the electrode may be introduced between the primary particles. The binder may permit the electrode to be cycled a sufficient amount via e.g. several electrochemical charge and discharge cycles such that a bond forms electrochemically between the various primary particles prior to the disintegration or degradation of the polymer. In another aspect, the shape of the porosity or perforations in the structure compressing the electrode materials may be engineered to retain the electrode materials within the structure, but to maximize the ionic transport through the perforations or porosity. By way of non limiting example, long slits may be introduced into a perforated sheet such that the particles may not exit through the slits, but the amount of area open to mass transport is increased relative to the amount present if the perforations were equiaxed. In one aspect, the particulate electrode material may be composed of direct reduced iron, and the perforated sheet may be composed of stainless steel. In another aspect, the particulate electrode material may be composed of crushed direct reduced iron to a particle size several times smaller than the native pellet size, and the perforations in a current collector may be sized such that the crushed fragments do not escape from the compressing cage.

In one aspect, a bed of particulates is vibrated, shaken, stirred, or moved so particulates settle closer together than when initially filled. This method may also be used periodically during the life of the system to help encourage new contact angles or arrangements between particulates as they change shape or size. In the case of a container which provides pockets for particulates, its orientation may be changed, such as spinning in the case of a wheel-shaped containment.

In another aspect, additives may be included or added to the bed of the electrode material to enhance conduction through the electrode between current collectors. The additives may be usefully concentrated at key points in the electrode structure. In one aspect, a particulate anode material is stuck to a current collector, which may take any shape, including rounded, or a hollow sphere, and may have particulate on both sides, using a conductive glue. The conductive glue may comprise a binder stable in the intended environment, such as alkaline electrolyte, and a conductive particle, such as metal, such as iron, filings or powder, including steel mill dust. The binder may, for example, comprise poly(ethylene) or poly(tetrafluoroethylene). The conductive glue may additionally contain additives useful to battery performance, such as sulfide salt additives, or additives intended to bond with carbonate ions in solution, such as calcium hydroxide. Creating a conductive bond between the electrode particulate materials and the current collector may usefully enhance battery performance at low added cost when the interface resistance between the particulate material and the current collector is one of the larger resistances in the electrochemical system. The composition of the conductive glue may be between 10-80 vol. % of the conductive additive, with the remainder comprising a binder, any additives, and a possible cosolvent or tackifier.

Figure 8:
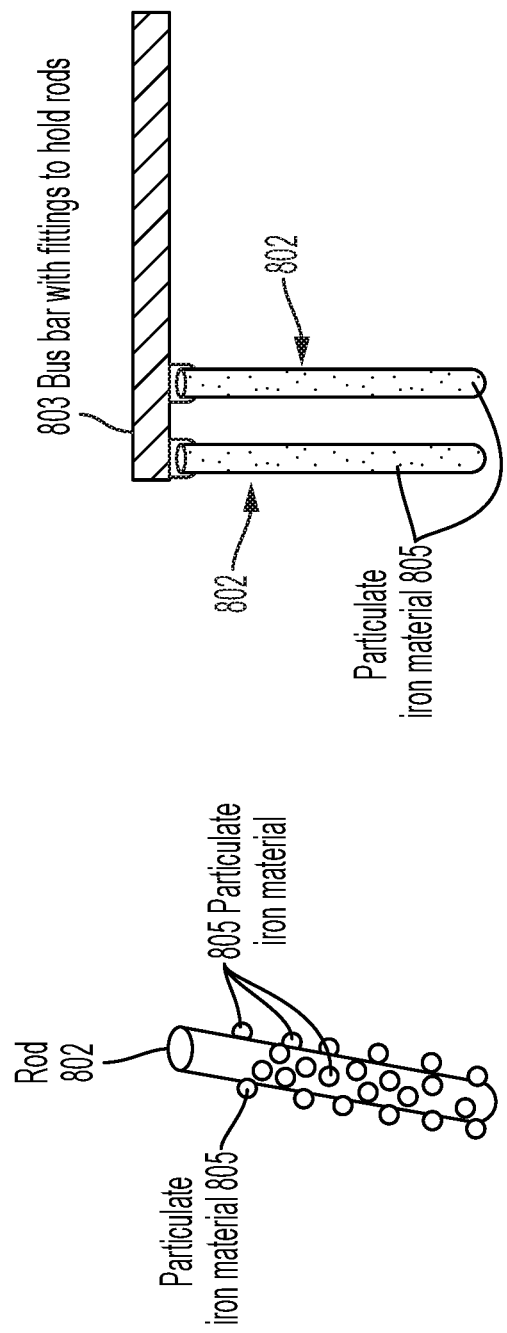
FIG. 8 fastening rail may also serve as a bus bar

In another aspect, current collection may occur by creating a bond between each of the particulate materials and a conductive rod. If the particulate materials are attached by a conductive bond to a current collector, the compressive stresses need not be applied. The particulate materials may be attached to a rod along its length. The mass of anode material may extend past the end of the rod. The anode mass may be attached via sintering, welding, or other metal bonding techniques, by attachment with wire, or by deposition onto the rod from solution or slurry, which may take place via magnetism or evaporation of the solvent. The rod may be used for current collection from the anode. Anodes of this rod format may be snap-fit into a flexible ring-with-a-slit-like fastening mechanism for easy assembly of a compound anode. This fastening rail may also serve as a bus bar. This is schematically shown in FIG. 8 in which rods 802 with attached iron particulate material 805 are fitted to a bus bar 803. The rod 802 may have any cross section, including circular or linear, and need not be straight, but may rather assume a coil or some other shape to enhance packing and limit the bus bar 803 volume needed.

In another aspect, simultaneous current collection and compression may take place via a pouch, open at the top, which may be fabricated, for instance, from crimped or welded sheet metal. The pouch may be filled with a particulate iron electrode material and the top may be rolled down to provide compression of the particulate materials. The compression may make use of a horizontal rod inside the rolled portion to perform the rolling. The pouch may be made of conductive materials suitable to be current collectors in alkaline battery environments, and specifically at iron positive electrodes. Current may be collected from the end(s) of the rod. The pouch may be porous or perforated to permit ionic transport through the pouch, as in a metallic mesh made of nickel.

Figure 9:
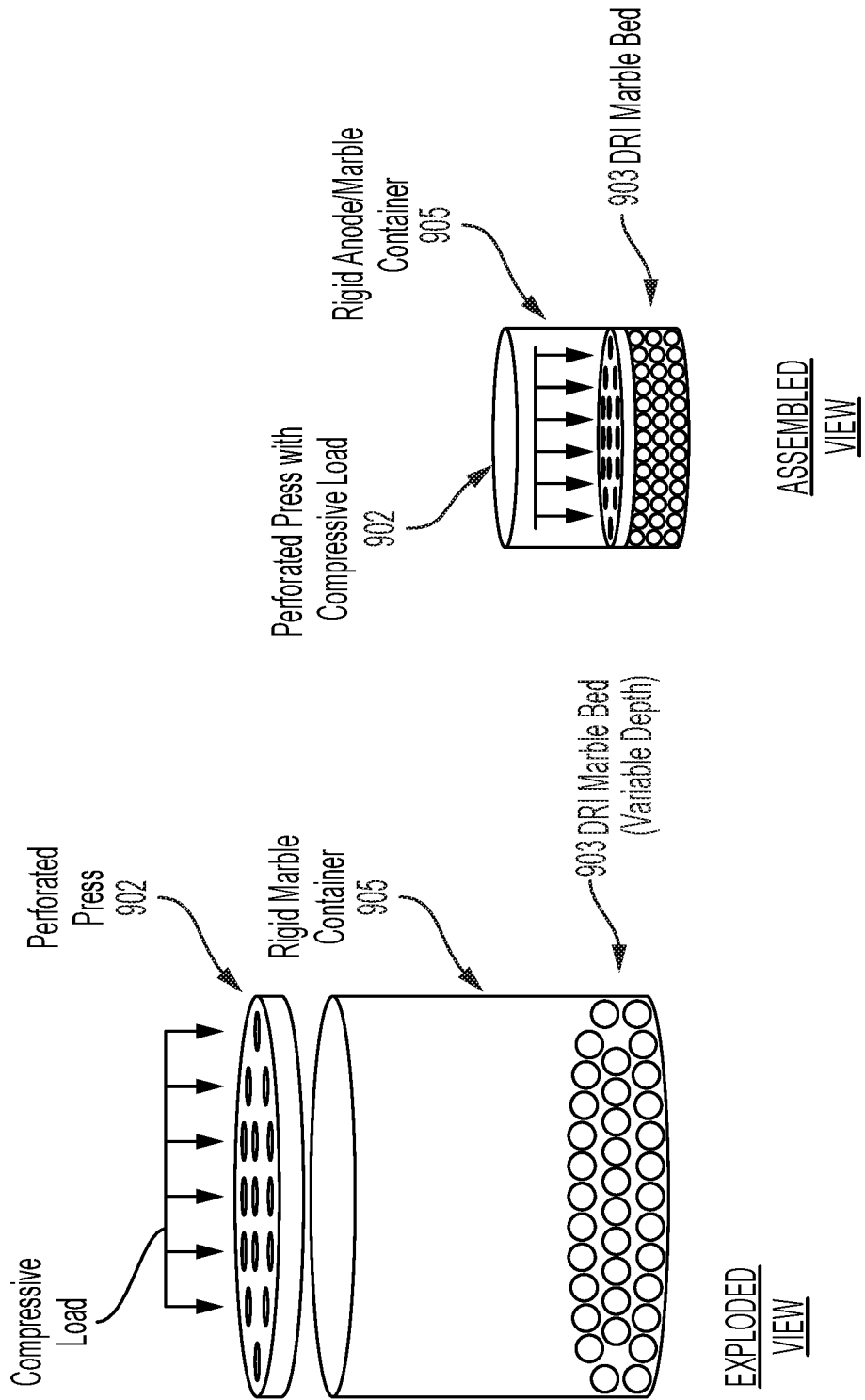
FIG. 9 illustrates a direct reduced iron (DRI) marble bed assembly.

In another aspect, a rigid container may be formed. The rigid container may have at least one conductive wall, and may be constructed of materials suitable for use in an alkaline electrolyte, and further may be suitable to serve in the current collector of an iron positive electrode. The rigid container may be filled with particulate electrode material, and compressed via a piston or plunger mechanism. In one exemplary embodiment, a welded can with a bottom and wrap-around outside is filled with anode pellets (or powder) and compressed from the top using a plunger mechanism. The faces of the rigid container may be constructed of rigid, but ion permeable material such as perforated sheet metal or expanded sheet. In one aspect, an expanded sheet metal comprised the sidewalls of the rigid container. The platen or face used by the plunger may contain tabs or other compliant mechanisms which may mechanically engage with features in the sidewalls of the rigid container such that the plunger may only be needed to provide a compressive force for assembly. The mechanically engaging features thus enable the piston to be used for initial compression but subsequently removed. Compressive load in this and other embodiments may be applied via any of the means common in the art for applying compressive loads, including but not limited to bolts, hydraulics, weight, threaded rods, zip ties, and rivets. FIG. 9 shows an exemplary embodiment wherein a perforated press 902 is used to compress the iron electrode material 903 within a rigid anode container 905. In this case, the iron electrode material 903 may be direct reduced iron pellets, referred to as a DRI marble bed. FIG. 9 shows an exploded view on the left and an assembled view on the right.

In another aspect, iron particulate materials may be sandwiched between two sheets of conductive, compliant material, such as a metal textile, and riveted to be fastened around the edges to provide compression. In some instances, the conductive compliant material may be riveted, cinched, or otherwise reduced in volume intermittently throughout the area of the electrode to provide more uniform compression.

Figure 10:
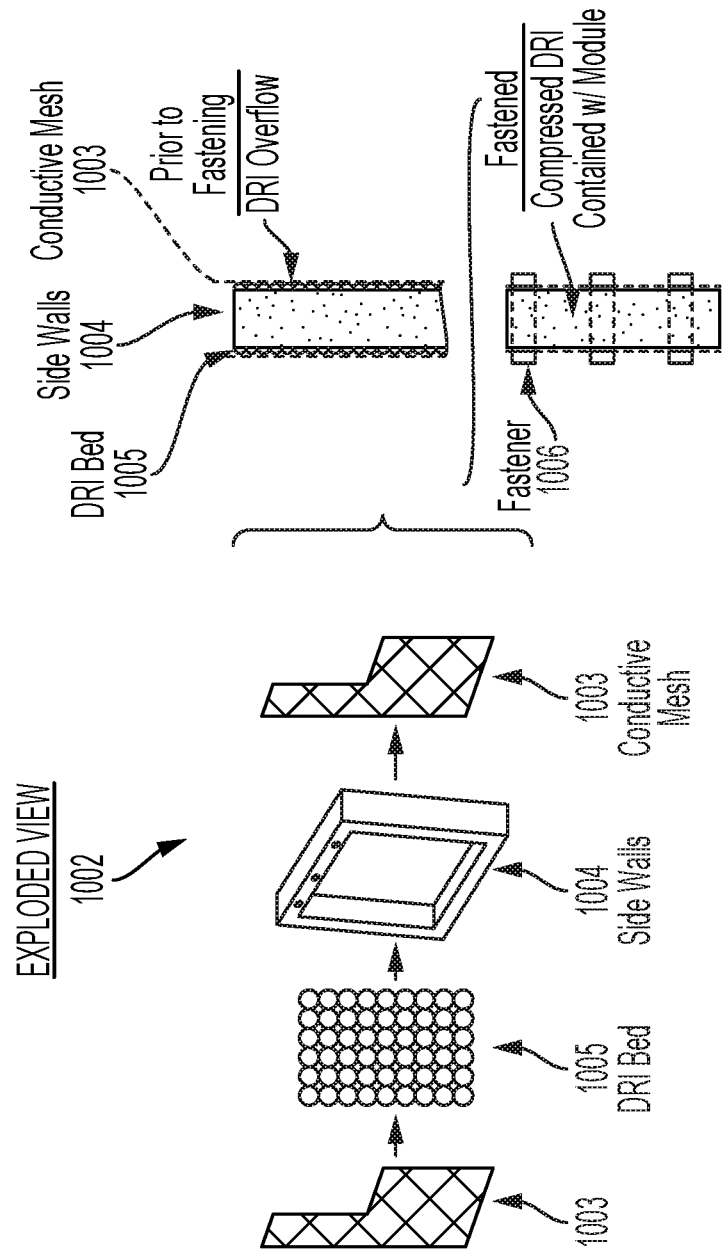
FIG. 10 illustrates a module consisting of a rigid side walls.

In another aspect, a compliant sheet or mesh may be used in combination with a rigid side wall to provide simultaneous compression, current collection, and containment. More specifically, in one exemplary embodiment, such as illustrated in FIG. 10, a module 1002 consisting of a rigid side walls 1004 may be slightly overfilled with iron electrode material 1005 with metal mesh top and bottom plates 1003, all enclosed with fasteners 1006 (e.g., bolts, threaded rods, zip ties, rivets etc). The mesh 1003 applies a compressive load to the iron electrode material 1005 when the fasteners 1006 are tightened as the side walls 1004 may be slightly overfilled with marbles (e.g., DRI marbles as the iron electrode material 1005). The mesh 1003 may serve as a current collector. The mesh 1003 may allow for good electrolyte circulation or diffusion to the iron electrode material 1005. The fasteners 1006, in combination with the other elements, may keep the iron electrode material 1005 contained and may apply a clamping load. In some embodiment, the fasteners 1006 may also serve as a current collector. The mesh 1003 may be wire mesh, perforated plate, resistive to corrosion i.e. nickel, stainless steel etc. The side walls 1004 may be any rigid material suitably stable in the electrochemical environment of the iron electrodes 1005, i.e. plastic, some metals, etc. The resulting assembly of iron electrode material 1005 and the current collecting apparatus may be a modular component or may be permanently connected to an electrochemical energy storage system entirely.

In another aspect, a compliant material, gasket-like material is used to contain the iron particulate electrode material on several faces. The compliant material permits variable displacement of the force-applying elements of the design according to the local compliance and/or packing of the bed. In one example, a compliant gasket borders a cylindrical cell and conducive, current collecting, perforated plates form the ends of the cylindrical cell. The plates are forced together at various points along the circumference of the cell via, e.g. bolts penetrating through the silicon gasket. The gasket may be made of a compliant, alkaline resistant material, such as an Ethylene propylene diene monomer (EPDM) rubber or related material. In some instances, the gasket may need to be highly compliant, in which case a foam of a polymeric material, such as an EPDM foam, may be useful.

In another aspect, a current collector may contain divots or other locating or contacting features on its surface. These features may serve to enhance the contact area between the current collector and the particulate iron material and/or to locate a particulate material such that it packs efficiently as a result of the templating provided by the surface of the current collector. In one example, a current collector may contain a series of divots sized and placed such that a spherical set of particles, such as those from a direct reduction process, may pack in a close-packed manner adjacent to the surface. Other templates, such as a body-centered cubic template are possible. For particulate materials with an axis of symmetry, such as rods, the templating may have an axis of symmetry like a divot that is a cylindrical trough. The divots may be introduced through machining, sheet metal dimpling or other deformation processing, or may include suitably-sized perforations or through-holes in the current collector. The current collector may be shaped so as to compress the particulate materials most optimally against each other, for example, in the case of rod-shaped particulate material, the current collector may comprise a sheet rolled into a cylinder around the cylindrical aggregates and compressed to constrain the cylinder diameter.

In order to reduce electrical resistance due to current collection, current collectors may be engineered to allow current collection to occur more homogeneously throughout the packed bed electrode by introducing current collecting components throughout the thickness of the electrode, or which penetrate a reasonable way through the thickness of the electrode.

In certain embodiments, a current collector may feature spikes, rods, tabs, or other high aspect ratio features that may project out into the electrode bed from a current collecting sheet or other boundary of the packed bed electrode. These high aspect ratio features may be configured in size and shape such that they contact many electrode material particles in the bed which would not be contacted by a simple, flat sheet current collectors. In certain embodiments, a sheet metal current collector with tabs that project into the space filled with particulate material is used as a current collector. In another aspect, an expanded sheet metal sheet is used as a current collector, and some struts within the sheet are cut and bent inward to serve as tabs projecting into the space filled with active material.

In certain embodiments, a conductive brush or series of wires are attached to a current collector. The wires flexibly project into the space filled by an iron electrode material. The wires are put in contact with the material due to their spring constants, and the contact may be improved by use of a compressive pressure.

In many embodiments, fasteners or other compression-providing elements are desired to retain current collectors in compressed position relative to one another. In what follows, the term fastener shall be understood to mean any element of a mechanical assembly that provides a fastening or compressive function through the use of an additional part that mechanically engages with other portions of the assembly. The performance of an iron positive electrode comprised of individual pellets increases when a sustained compressive load is applied to it before operating the cell. However, using metal fasteners such as stainless steel bolts to sustain the load is disadvantageous because of both added part count and assembly time, and because the bolts likely need to be electrically isolated from current collectors to mitigate the hydrogen evolution reaction (an undesired parasitic side reaction that lowers coulombic efficiency) occurring on the bolts, which adds more complexity to the design and likely adds to part count. Thus, while fasteners are desirable from a mechanical perspective, metallic fasteners are disadvantageous. Several methods of replacing metallic fasteners with other methods are considered below.

Figure 11:
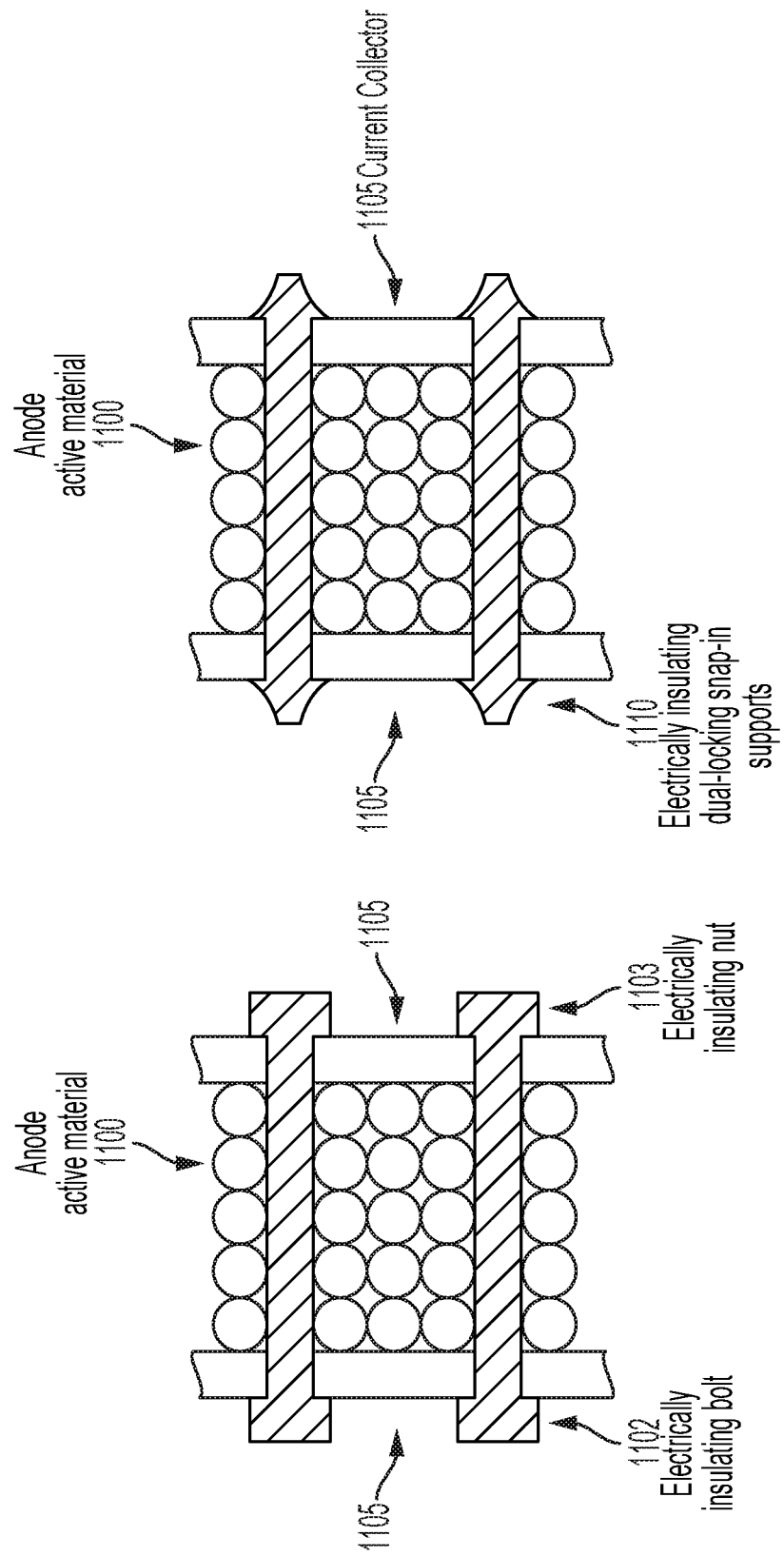
FIGS. 11A and 11B show fastening techniques according to various embodiments.

In some embodiments, non-metallic fasteners may be used in place of metallic fasteners. In one example embodiment, two sandwiching current collector plates may surround the iron electrode bed. The current collector plates could be made to apply a compressive force on the anode bed via fasteners made from an electrically insulating, non-metallic material that is resistant to degradation in the alkaline environment of the electrolyte. The electrically insulating and non-metallic nature of the fasteners would result in a lack of electron transport to the electrolyte-exposed surfaces of the fasteners, which would prevent the undesired hydrogen evolution reaction from occurring on the exposed surfaces of the fasteners. Reducing the HER rate means that more electrons participate in the desired anode reduction reaction, that is, a higher coulombic efficiency. In certain embodiments, the fasteners are bolts and nuts. In certain embodiments, the fasteners are made of one or more of acrylic, polytetrafluoroethylene, polyethylene, low density polyethylene, high density polyethylene, ultra high molecular weight polyethylene, polypropylene, or polyether ether ketone. In another exemplary embodiment, two sandwiching current collector plates that surround the anode bed could be made to apply a compressive force on the anode bed via fasteners that save assembly time by the use of a "snap-in" mechanism rather than a screw mechanism that requires rotation of a fastener. In certain embodiments, the fasteners are dual-locking snap-in supports of the appropriate length. Any combination of the above fastening techniques may be used to provide compression while avoiding the use of metallic fasteners. Some fastening techniques are illustrated in FIGS. 11A and 11B. The illustration in FIG. 11A shows an electrically insulating nut 1103 sandwiching two current collecting sheets 1105 against an iron electrode material 1100 and labeled as an 'anode active material' in FIG. 11A. The nut 1103 tightens on the bolt 1102 to draw the sheets 1105 together, thereby compressing the anode active material 1100. A second example of snap-in compressive features, such as snap in support 1110 is shown in FIG. 11B replacing, and operating in a similar manner to, the bolt 1102 and nut 1103 of FIG. 11A.

In some embodiments, it may be useful to use a compliant mechanism capable of applying a large, distributed load to a current collector or compressive platen. In one example, the last face dimension of a rectangular prism box for containing the anode is a leaf-spring mechanism that springs back after anode loading to compress and contain the pellet anode. The current collector itself may be a compliant mechanism such that applying load on relatively few points (as occurs with a leaf spring), may result in a distributed load across the system.

Figure 12:
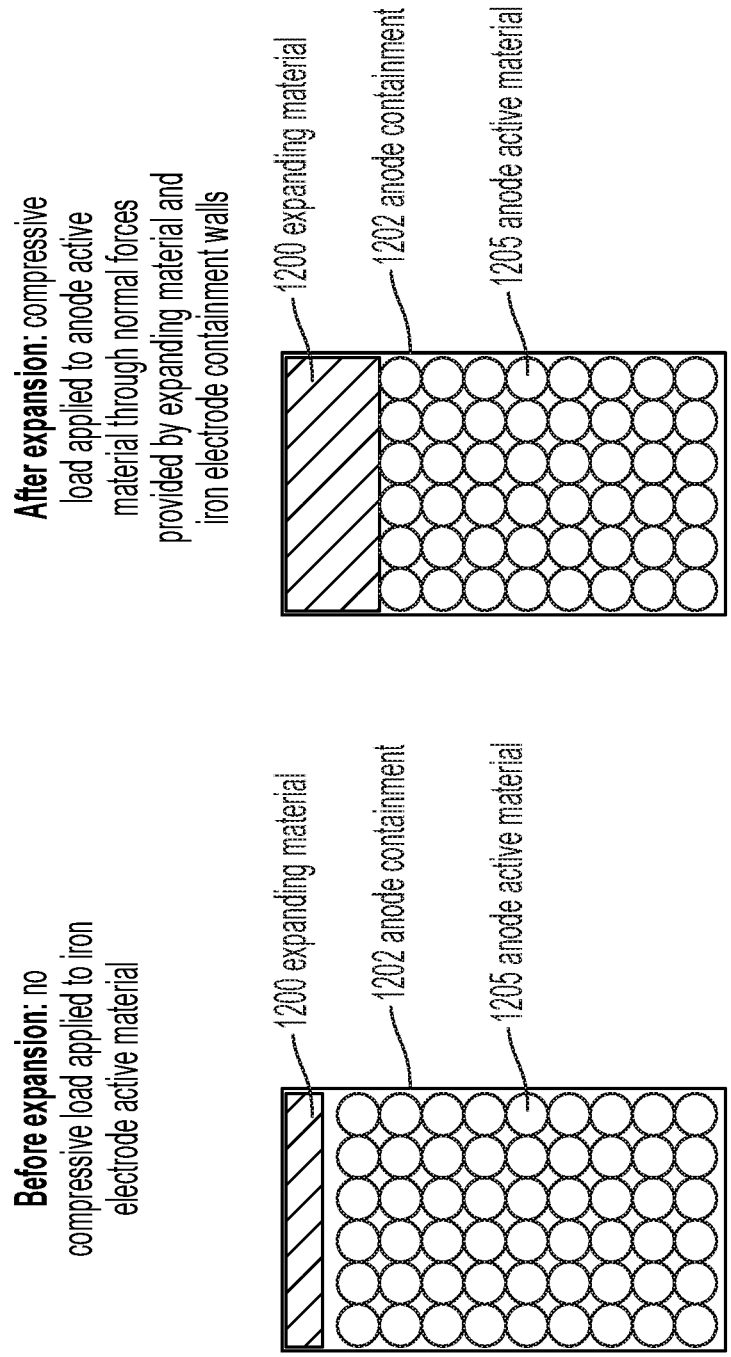
FIG. 12 illustrates an expanding material contained within a rigid iron electrode containment assembly.

Application of a compressive stress may be applied by alternative means from compression applied via mechanical fastening of the structure. In certain cases, iron electrode material may be contained by a rigid body (for example, a prismatic cell with current collectors or other mechanical supports on all faces), but the need for applying a compressive load during assembly may be eliminated by the use of an expanding material lining one face of the anode containment body. The expanding material may expand after assembly of the cell, thus providing a compressive load on the anode bed after filling the cell with electrolyte. In certain embodiments, the expanding material may be placed in between the iron electrode material and one of the small faces of the iron electrode material containment body. In certain embodiments, the expanding material is an expanding hydrogel that swells when in contact with the aqueous electrolyte, thus providing a compressive load on the anode active material upon filling with electrolyte. In certain embodiments, the expanding material is an inflatable plastic balloon with a port for pumping in air, thus providing a compressive load on the anode active material once pumped with air. The plastic balloon may be composed of poly (ethylene), poly(propylene) or similar polymers that are flexible and resistant to degradation in alkaline solution. FIG. 12 illustrates an example of an embodiment of an expanding material 1200 contained within a rigid iron electrode containment assembly 1202. The unexpanded state is illustrated in the left hand of FIG. 12 and the expanded state of the expanding material 1200 compressing the anode active material 1202 within the anode containment assembly 1202 is illustrated on the right-hand side of FIG. 12.

In another embodiment, the container for the iron electrode material is not rigid, but still conserves its volume or has a maximal volume to within a reasonable approximation over stress ranges below ~10 MPa, as with some metal textiles—this may be termed a flexible cage. In such a case, an expandable material may be placed within the flexible cage, and compression provided by the expansion of expandable material within the flexible cage. The expandable materials from above may be used, as well. The flexible cage may be conducting and serve as both a current collector and as a means of providing compression to the iron electrode material with which it is filled.

In another embodiment, the iron electrode material may exhibit a substantial magnetic moment in the presence of a magnetic field. The iron electrode material may be ferromagnetic, as is the case for iron. Thus, a magnetic field set up by one or more permanent magnets or electromagnets may be used to induce a magnetic force on the iron electrode material toward a rigid wall, thereby providing a compressive load to the anode active material.

In another embodiment, pumps existing within the system, for instance, those intended to move electrolyte, are used to provide suction on the particulate bed. The suction provided by the pump pulls the particulate bed together, and the particulates into contact with one another. Particulates are prevented from being sucked into the pump by means of a screen or mesh with openings smaller than the smallest expected particulate.

In another aspect, phosphates (including iron phosphate), phosphoric acid, or similar phosphor-containing additives may be usefully incorporated into a particulate iron electrode material in order to promote mechanical contact and bonding between particulate materials. The phosphate groups may form phosphate bridges between the metal oxide groups, thereby cementing the particulate materials of the electrode bed together, and forming an electrode that is better mechanically and electrically connected. The oxides of irons may serve as useful conductors because several of them (especially magnetite and wüstite) are semiconducting. In the case where the bonded oxides are electrochemically reduced to metallic species, such metallic species may electrochemically sinter or otherwise bond. Thus, the bonding of such oxides, even transiently may lead to enhanced electrochemical performance over many cycles. The electrode materials may be pre-treated with a phosphorus-containing solution before entering the electrolyte, or a phosphorus-containing compound may be introduced into the electrolyte for the purpose of forming such phosphate bonds. Phosphate bonds may occur across a variety of metal-oxide systems including in cadmium, magnesium, aluminum, and zinc. Phosphate additives may be particularly beneficial in iron electrodes as they may reduce the tendency for hydrogen evolution at the iron surface during charging as well.

In some embodiments, one may desire to create a conductive path between the particles of the iron electrode material via metallurgically bonding the particles of the iron electrode material prior to insertion into the electrolyte. Such a metallurgical bond may lead to sufficient conduction through the iron electrode material that compression is not needed to achieve satisfactory electrochemical performance. Below, a variety of methods for eliminating the need for compression of the iron electrode material are described.

Figure 13:
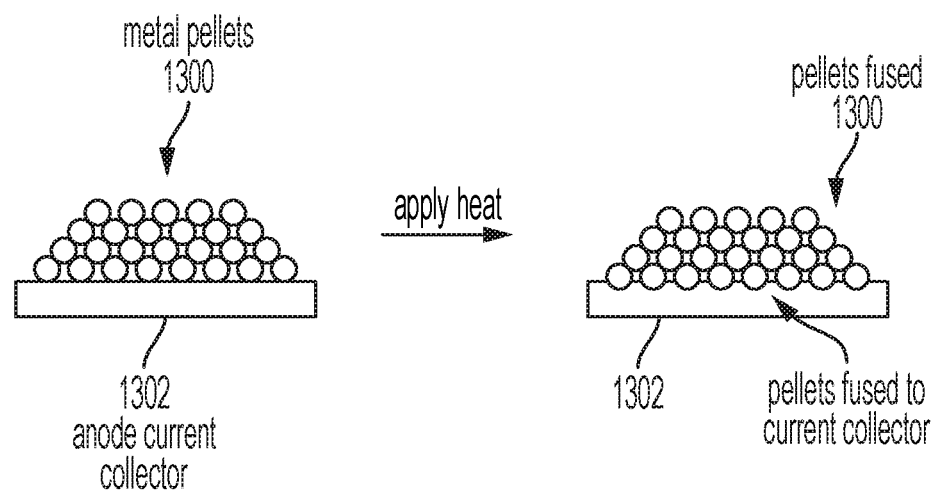
FIG. 13 illustrates thermal bonding.

In one embodiment, the iron electrode materials are thermally assembled via a high temperature process including sintering or brazing. A thermal step for bonding the iron electrode material to a current collector may decrease the contact resistance between particulate materials by fusing similar metals to one another for a more robust electrical connection. While sintering has been considered for the manufacturing of iron electrode materials, the sintering of some particulate iron materials has not been considered to date due to their unique particulate structure. In one example, direct reduced iron is an attractive feedstock for an iron electrode material, but due to its coarse particle size, it is not an obvious candidate for thermal bonding via a sintering process. Direct reduced iron may be used in a sintering process directly, or it may be used in combination with another bonding material at the surface of the direct reduced iron such that a suitable metallurgical bond is formed. The bonding material may be painted, sprayed or otherwise introduced onto the direct reduced iron or other particulate iron material in order to permit it to bond to other direct reduced iron particles during a thermal treatment process. The bonding material may be usefully concentrated at the contact points between the direct reduced iron or other particulate material as a means of gaining the most electrical contact with the smallest added cost. An example of a bonding material is a material with a low sintering temperature which may cause a metallurgical bond during a sintering process, such as a suspension of carbonyl iron that is painted or sprayed onto the direct reduced iron or other particulate material. In a second example, a bonding material may melt, or cause a fusion weld or braze upon exposure to heat. In a second example, a nickel brazing compound may be coated onto an iron electrode material, and the material may then be heated to the appropriate temperature for a metallurgical bond to form. The thermal bonding method is illustrated in FIG. 13. FIG. 13 illustrates that a plurality of metal pellets 1300 are provided on an anode current collector 1302. Heat is applied to the pellets 1300 and anode current collector 1302 resulting in the pellets 1300 being fused to the current collector as illustrated in FIG. 13.

A possible manufacturing technique for a thermally bonded particulate bed system may feature a rolled sheet of steel which may act as the furnace belt. This belt would unroll from a coil and straighten to become a horizontally translating surface inside of a continuous hydrogen furnace. At the inlet of the furnace, iron electrode material (such as direct reduced iron) would accumulate on the belt via a hopper. This iron electrode material and belt sheet would travel through the furnace rising to a maximum temperature bonding the iron electrode material and the belt. This iron electrode material and current collector sheet could then be cut into small sections to be used as an anode in reactors.

In various embodiments, the particulate materials for iron electrodes achieve excellent contact with each other via creation of 'flats' due to the stress concentration at a contact point. In some instances, the electrode material may not need to be held at high force throughout life, but rather the particulate materials may be pressed against one another during fabrication, the flat spots created, and then held with a smaller force throughout life. To accomplish this, an electrode cage may be supported during the high-load stress application to form the flats on the particulate materials and lower the inter-particle contact resistance. The force may then be partially released, the cage may be removed from the supporting structure, and then the electrode cage may be put into the reactor under this lower compressive force, but with the contact resistance that was lowered due to the application of the higher compressive force. If, at any point during life, the cage gets jumbled or the cell gets too resistive, the cage may be removed, put into the supporting structure, recompressed, and the force could be released again, the cage could be put back into the cell.

Figure 14:
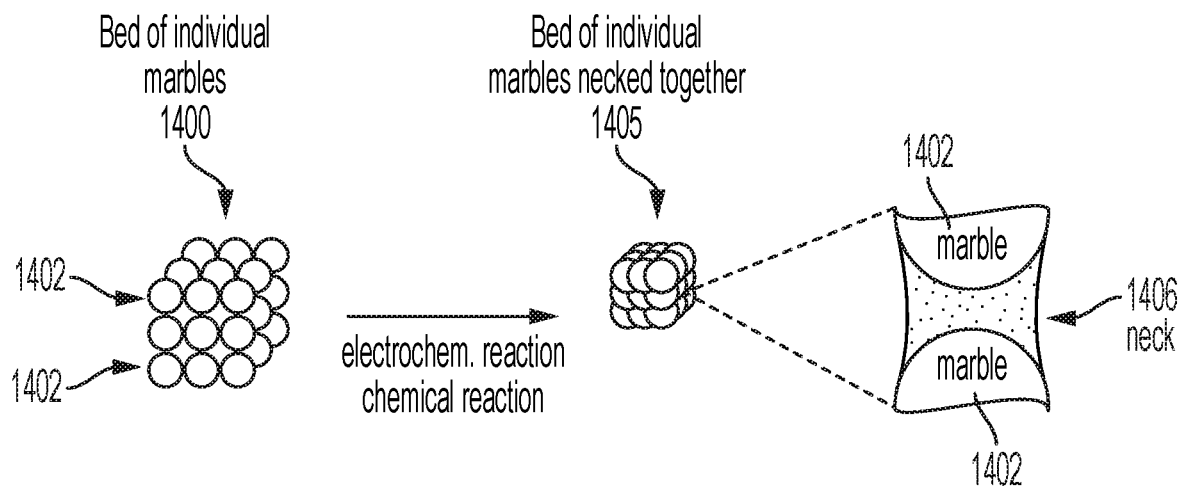
FIG. 14 illustrates mechanical interactions of pellets.

In various embodiments, the solubility of iron intermediates in alkaline media may be utilized to form necks between particulate material in an iron electrode material comprising a packed bed. The iron electrode may be held at appropriate pH, temperature, and optionally voltage ranges such that the $HFeO_2^-$ soluble intermediate may form in high enough concentrations that the bonds between particles within the packed bed grow due to solution-precipitation reactions mediated by the soluble species, as shown in the diagram below, wherein the particles are referred to as marbles. The bond between the particles may be referred to as a neck. The formation of such necks may be a preprocessing step or may happen in-situ in an electrochemical cell for energy storage. The coarsening may form necks between pellets to enhance inter-pellet conductivity, reducing overpotential at the anode. In one aspect of neck formation, the process involves soaking the pellet bed in an alkaline solution for >3 days, such that the soluble species coarsens the bed at the micron to millimeter scale and enhances inter-pellet contact. In another embodiment, electrochemical cycling is employed to enhance deposition of the soluble intermediate species. In a third embodiment, the pellets are coated in iron powder, such as atomized or sponge iron powder, to promote the formation of "necks" and reduce contact resistance between DRI pellets. As cycling continues, the powder particles can "sinter" to the host DRI pellet. Mechanistically this can occur due to the mass transfer of the soluble intermediate Fe species ($HFeO_2^-$) favoring deposition of discharge product at the interfaces of small and large particles, for example as illustrated in FIG. 14. Specifically, FIG. 14 illustrates that a bed 1400 of individual DRI pieces 1402 (e.g., DRI marbles) may be provided. An electrochemical and/or chemical reaction may result in the bed 1400 being formed into a necked together bed 1405 of DRI pieces 1402 (e.g., marbles) joined together by necks 1406 therebetween. In this manner, the bed 1405 may be a solid mass of joined DRI pieces as opposed to the original starting bed 1400 of separate pieces.

In various embodiments, the particulate materials may be bonded by techniques common for the welding of metallic materials. In one aspect, the particulate materials may be resistance welded by passage of a high current through the packed bed. The current may be applied by a compacting roller assembly such that the particles are brought into contact prior to or concurrently with a resistance welding process. In various embodiments, the particles may be mechanically deformed at high temperature such that a metallurgical bond forms at the contact points between the particles. In one example, a hot briquetting machine for the hot briquetting or direct reduced iron may be run at low compacting pressures such that the particulate material deforms at the contact points to form metallurgical bonds. For particulate materials with internal porosity (such as direct reduced iron) compacting may take advantage of the stress concentration at the contact points between particles such that metallurgical bonds form between particles, but the internal porosity of the particulate material may be largely unchanged away from the contact points. In various embodiments, the creation of the metallurgical bonds may take place in inert atmosphere to prevent oxidation of the iron electrode material. In various embodiments, the bed of particulate material may be ultrasonically consolidated or consolidated by other vibratory means. The ultrasonic or vibratory compaction may be accompanied by an axial pressure. In various embodiments, the particulate materials may be fusion welded together via any of the fusion welding techniques common in the art, including but not limited to tungsten inert gas welding, metal inert gas welding, and gas metal arc welding. In another aspect, the material may be explosively welded.

In various embodiments, a conducting metallic solder may be placed at the contact points between the particulate materials such that a metallic bond may be formed between the materials. In one example, tin or a may be dip coated onto a particulate material bed. In another example, copper may be dip coated onto the particulate material. In an additional embodiment, the conducting liquid is coated onto the particulate by means of passing both through a tube or nozzle and depositing the coated particulate. Precise control of the nozzle allows precision placement of individual particulates, which may aid in achieving optimized electrode geometries. Particulates deposited in this manner may be stacked to produce three-dimensional structures.

In various embodiments, the particulate material may be etched via any one of a variety of acids and subsequently mechanically deformed prior to insertion into an electrochemical cell. The etching action may remove any surface oxides impeding bonding, and may permit electrical contact between the anode materials. Acids such as hydrochloric acid, nitric acid, or any other asides used to strip iron oxides off of metallic iron surfaces may be used. In some instances, the compression may be done while the particulate material is in the acid.

In various embodiments, a particulate material for an iron electrode may comprise a direct reduced iron material. The direct reduced iron material may be fabricated without the cement coating used to decrease sticking during the reduction processing. These cements may inhibit charge transfer across the interfaces between pellets. In such a manner, the direct reduced iron materials may exhibit enhanced charge transfer properties for electrochemical cycling. In one example, a fluidized bed reduction process is used in order to enable the use of direct reduction iron materials which do not require cement coatings.

In various embodiments, particulate material to comprise an iron electrode material may be compressed around a current collector mesh. The current collecting mesh may then be heated (e.g. by electrical resistance) such that the chicken wire welds to the particulate material surrounding it. The pellets are then interconnected by the mesh, and may be welded to each other. The mesh may be comparatively thick and open, like a chicken-wire fence material.

Pellet Size and Shape Modification Before Battery Assembly

During operation of the battery with a pellet bed electrode, intra-pellet mass and electronic transfer may be difficult due to the size of pellets, resulting in polarization that can reduce the energy efficiency of the battery via (1) Voltage drops on charge and discharge resulting in lower voltaic efficiency and (2) Coulombic inefficiency due to insufficient competition with the hydrogen evolution reaction during charge. As a result of insufficient charging, the specific capacity of resultant iron electrodes is also reduced. For example, in certain cases the polarization is dominated by mass transport of hydroxide ions through pellet pores from the outside of a pellet to iron reaction sites at the center of the pellet. In other cases, the polarization is dominated by electronic transport through the intra-pellet network of iron material from an electrical point of contact on the outside of a pellet to the center of the pellet. Either of these sources of polarization may result in local electrochemical potential within the pellet that favors the hydrogen evolution reaction during charge more than the desired reduction reaction of iron oxide species, which reduces coulombic efficiency.

In one aspect, the size of the particulates may be chosen to promote better packing. For one non-limiting example, a bed may be comprised of 50% particles over 5 mm in diameter, 25% particles between 5 mm and 1 mm in diameter, and 25% particles under 1 mm diameter, in order for the smaller particles to fill space between the larger particles. Particles of smaller sizes than the native DRI size may be made from DRI by the methods detailed below. These particles may be added to their containment in a specific order in order to ensure optimal packing, for one non-limiting example, a layer of larger particles may first be added, followed by an addition of smaller particles to fill spaces, followed by another layer of larger particles and another addition of smaller particles.

Size reduction of iron pellets before battery assembly is disclosed as a method of addressing one or more of the energy efficiency and specific capacity losses due to the size of the pellets. Reducing the size of pellets reduces the characteristic length of intra-pellet mass and electrical transport, which reduces polarization and may enhance one or more of energy efficiency and specific capacity.

Reducing the size of pellets by means of a comminution process, such as a jaw crusher ("crushing") before assembling into a pellet bed has been shown to result in higher voltaic efficiency. However, the crushing of the pellets should result in both less particle-to-particle contacts on a per-particle basis (irregular particles achieve fewer contacts than spherical particles), and more interface resistances per particle in a bed of a given thickness. Further, 'rattlers,' wherein a particle is not in electrical contact with its neighbors due to the geometric packing of the bed are more likely for polydisperse, irregular shapes than for relatively monodisperse spheres. As a result, it is inferred that the gains in voltaic efficiency due to enhanced intra-pellet mass and electrical transport partially mask increases in electronic resistance-based voltage drops and a lack of electrically accessed material (and therefore lower capacity) due to an increased rattler fraction.

In certain embodiments, the size of pellets is reduced to half or less of its original size through crushing, which results in a reduction of the overpotential of the iron electrode by more than 10 mV (mV=millivolts=10−3 V).

Crushing of the pellets could lead to substantial performance gains if a secondary conductive additive were to be added to the pellet bed to enhance one more of inter-pellet electrical conductivity or pellet-to-current-collector electrical conductivity. The additive would increase conductivity by increasing the conductive surface area in contact with pellets, mitigating the added interface resistance in a pellet bed of crushed pellets. An additive is desired which does not inhibit mass transfer and results in substantially higher electrical conductivity of the bed. The optimal additive percolates at low volume fractions and is highly conductive.

In certain embodiments, the additive is one or more of carbon black or graphite that is added to the crushed pellet bed in greater than 1% volume fraction, such that the carbon black or graphite bridges crushed pellets together. In certain other embodiments, activated carbon or biochar or low to modest conductivity is used as a low-cost alternative to graphite.

In certain embodiments, the additives are pieces of conductive mesh such as stainless steel wire mesh.

In certain embodiments, the additives are conductive rods such as stainless steel rods of a diameter less than the average pellet size.

Before nominal operation of the battery, additives that improve iron electrode performance may be chemically incorporated into the iron electrode via various processes that rely on intra-pellet mass transport of chemical species in an electrolyte to active iron sites within the porous structure of the pellet. Homogeneous permeation of the additives into the pellets is often necessary to achieve the maximum desired performance-enhancing effect of the additive. However, it is often difficult to get homogeneous permeation of certain liquid-soluble and solid-state additives into pellets that are typically output from direct reduction processes, especially for those additives with low solubility that react with the direct reduced iron.

Size reduction of iron pellets before battery assembly is disclosed as a method of achieving more homogenous permeation of liquid-soluble and solid-state additives into the pellets during the additive incorporation process. Reducing the size of pellets reduces the characteristic length of intra-pellet mass transport, which reduces gradients in concentration of the additive, thus enabling a more homogeneous permeation and incorporation of the additive into the electrode.

In certain embodiments, the additive incorporation process is one or more of soaking in an electrolyte, electrochemical plating, and electrochemical cycling.

In certain embodiments, the additive is an initially liquid-soluble hydrogen evolution inhibitor that incorporates into the solid-state electrode via an electrochemical or spontaneous chemical reaction.

In certain embodiments, the additive is an initially solid-state hydrogen evolution inhibitor that is further incorporated into the solid-state electrode via an electrochemical or chemical dissolution-reprecipitation reaction.

In certain embodiments, additives include one or more of sodium thiosulfate, sodium thiocyanate, polyethylene glycol (PEG) 1000, trimethylsulfoxonium iodide, zincate (by dissolving ZnO in NaOH), hexanethiol, decanethiol, sodium chloride, sodium permanganate, lead (IV) oxide, lead (II) oxide, magnesium oxide, sodium chlorate, sodium nitrate, sodium acetate, iron phosphate, phosphoric acid, sodium phosphate, ammonium sulfate, ammonium thiosulfate, lithopone, magnesium sulfate, iron(III) acetylacetonate, hydroquinone monomethyl ether, sodium metavanadate, sodium chromate, glutaric acid, dimethyl phthalate, methyl methacrylate, methyl pentynol, adipic acid, allyl urea, citric acid, thiomalic acid, N-(2-aminoethyl)-3-aminopropyl trimethoxysilane, propylene glycol, trimethoxysilyl propyl diethylene, aminopropyl trimethoxysilane, dimethyl acetylenedicarboxylate (DMAD), 1,3-diethylthiourea, N,N'-diethylthiourea, aminomethyl propanol, methyl butynol, amino modified organosilane, succinic acid, isopropanolamine, phenoxyethanol, dipropylene glycol, benzoic acid, N-(2-aminoethyl)-3-aminopropyl, behenamide, 2-phosphonobutane tricarboxylic, mipa borate, 3-methacryloxypropyltrimethoxysilane, 2-ethylhexoic acid, isobutyl alcohol, t-butylaminoethyl methacrylate, diisopropanolamine, propylene glycol n-propyl ether, sodium benzotriazolate, pentasodium aminotrimethylene phosphonate, sodium cocoyl sarcosinate, laurylpyridinium chloride, steartrimonium chloride, stearalkonium chloride, calcium montanate, quaternium-18 chloride, sodium hexametaphosphate, dicyclohexylamine nitrite, lead stearate, calcium dinonylnaphthalene sulfonate, iron(II) sulfide, sodium bisulfide, pyrite, sodium nitrite, complex alkyl phosphate ester (e.g. RHODAFAC® RA 600 Emulsifier), 4-mercaptobenzioc acid, ethylenediaminetetraacetic acid, ethylenediaminetetraacetate (EDTA), 1,3-propylenediaminetetraacetate (PDTA), nitrilotriacetate (NTA), ethylenediaminedisuccinate (EDDS), diethylenetriaminepentaacetate (DTPA), and other aminopolycarboxylates (APCs), diethylenetriaminepentaacetic acid, 2-methylbenzenethiol, 1-octanethiol, bismuth sulfide, bismuth oxide, antimony(III) sulfide, antimony(III) oxide, antimony(V) oxide, bismuth selenide, antimony selenide, selenium sulfide, selenium(IV) oxide, propargyl alcohol, 5-hexyn-1-ol, 1-hexyn-3-ol, N-allylthiourea, thiourea, 4-methylcatechol, trans-cinnamaldehyde, Iron(III) sulfide, calcium nitrate, hydroxylamines, benzotriazole, furfurylamine, quinoline, tin(II) chloride, ascorbic acid, tetraethylammonium hydroxide, calcium carbonate, magnesium carbonate, antimony dialkylphosphorodithioate, potassium stannate, sodium stannate, tannic acid, gelatin, saponin, agar, 8-hydroxyquinoline, bismuth stannate, potassium gluconate, lithium molybdenum oxide, potassium molybdenum oxide, hydrotreated light petroleum oil, heavy naphthenic petroleum oil (e.g. sold as Rustlick® 631), antimony sulfate, antimony acetate, bismuth acetate, hydrogen-treated heavy naphtha (e.g. sold as WD-40®), tetramethylammonium hydroxide, NaSb tartrate, urea, D-glucose, C6Na2O6, antimony potassium tartrate, hydrazine sulfate, silica gel, triethylamine, potassium antimonate trihydrate, sodium hydroxide, 1,3-di-o-tolyl-2-thiourea, 1,2-diethyl-2-thiourea, 1,2-diisopropyl-2-thiourea, N-phenylthiourea, N,N'-diphenylthiourea, sodium antimonyl L-tartrate, rhodizonic acid disodium salt, sodium selenide, potassium sulfide, and combinations thereof.

Figure 15:
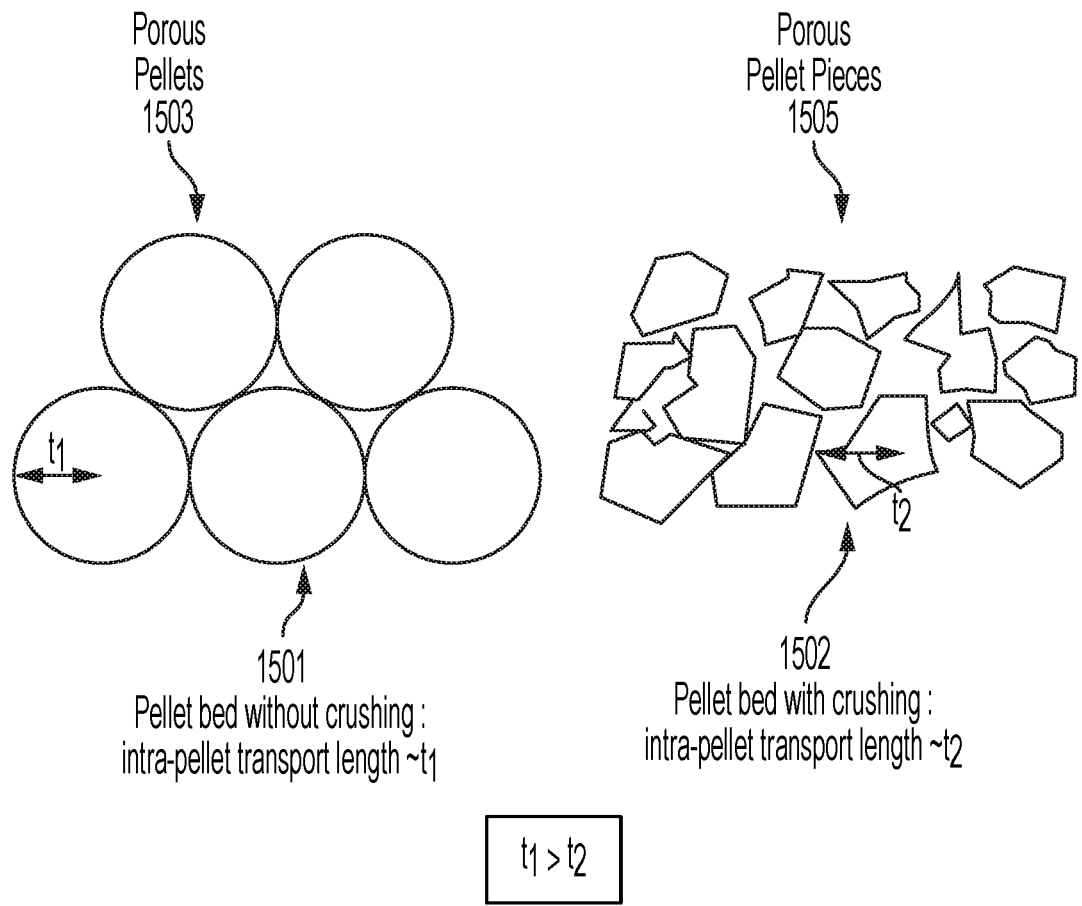
FIG. 15 illustrates pellet beds.

FIG. 15 illustrates example pellet beds 1501 and 1502 according to various embodiments. During operation of the battery with a pellet bed electrode, mass and electronic transfer through the pellet bed may be difficult due to the total thickness of the pellet bed, resulting in polarization that can reduce the energy efficiency of the battery via (1) voltage drops on charge and discharge resulting in lower voltaic efficiency and (2) coulombic inefficiency due to insufficient competition with the hydrogen evolution reaction during charge. As a result of insufficient charging, the specific capacity of resultant iron electrodes is also reduced. For example, in certain cases the polarization is partially due to mass transport of hydroxide ions from outside of the pellet bed to the center of the pellet bed. In other cases, the polarization is partially due to electronic transport through the network of iron pellets. Either of these sources of polarization may result in local electrochemical potential within the pellet that favors the hydrogen evolution reaction during charge more than the desired reduction reaction of iron oxide species, which reduces coulombic efficiency.

Increasing the volumetric packing density of pellets is one way to address one or more of the energy efficiency and specific capacity losses due to the total thickness of the pellet bed. By increasing the volumetric packing density, the thickness of the pellet bed for a given electrode capacity decreases, thereby reducing through-bed polarization and enhancing one or more of energy efficiency or specific capacity. For example, FIG. 15 illustrates a pellet bed 1501 with porous pellets 1503 that are formed as spheres or marbles and pellet bed 1502 with porous pellet pieces 1505 that may be formed by crushing spheres, marbles, or other shapes into pieces. The intra-pellet transport length t1 of the pellet bed 1501 may be greater than the intra-pellet piece length t2 of the pellet bed 1502.

Figure 16:
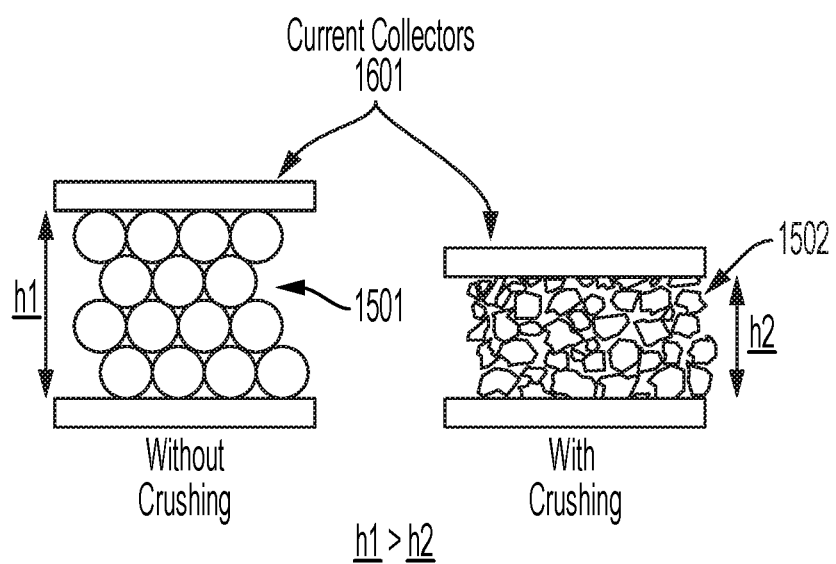
FIG. 16 illustrates example current collectors.

Processing the pellets by means of a jaw crusher ("crushing") before assembling into a pellet bed is disclosed as a method to increase volumetric packing density and reduce polarization. In this manner, the crushing may result in a pellet bed 1502 rather than the pellet bed 1501. Before crushing, the pellets may be roughly spherical and may have a narrow size range. The crushing operation may break the pellets into multiple pieces with non-spherical shapes and a broader size distribution that result in a higher volumetric packing density. The resulting higher volumetric packing density reduces the thickness of the pellet bed for a fixed projected area and mass of electrode material, thus reducing through-bed polarization and enhancing one or more of energy efficiency or specific capacity (for example when comparing pellet bed 1502 to pellet bed 1501 such that pellet bed 1502 has reduced through-bed polarization and enhanced one or more of energy efficiency or specific capacity in comparison to pellet bed 1502 when the material composition of the porous pellets 1503 and porous pellet pieces 1505 may be the same). FIG. 16 illustrates the pellet beds 1501 and 1502 with current collectors 1601 attached. The height of the pellet bed 1501 without crushing, h1, may be greater than the height, h2, of the pellet bed with crushing 1502 even though the same amount of pellet material may be present in pellet bed 1501 and 1502. As such, crushing may compact the size of the electrode.

In certain embodiments, the pellets after a crushing operation break into pieces with jagged edges and with a polydisperse size distribution such that smaller pieces fall within the interstices between larger pellets, thus increasing packing density.

Methods of Regaining Performance After Performance Decay

Certain performance attributes of a pellet bed electrode may worsen due to time-dependent or charge-throughput dependent mechanisms during battery operation. Performance attributes that worsen may include but are not limited to specific capacity (mAh/g), electrode overpotential (mV), self-discharge rate (mAh/mo.), and coulombic efficiency (%). Several methods of regaining iron electrode performance by treatments to the battery after beginning of life are disclosed here.

In certain cases, the specific capacity of the electrode may decrease with battery cycling because of a cycle-dependent change in microstructure of the electrode that hinders mass or electronic transport, thereby reducing the accessible capacity at a given polarization. More specifically, pores within the pellets may become increasingly constricted with cycling as they are filled with remnant electrochemical discharge products that have a larger molar volume (per mol iron) than metallic iron. The progressive pore filling results in a hindered mass transport to the iron within those pores, which may render the iron within pores less and less accessible for the electrochemical reaction to occur, which reduces specific capacity. In other cases, the electrical resistance to certain iron sites may increase because of a constriction of the conductive pathways provided by the metallic network within a pellet. In other cases, there may be a core of unreacted metallic iron within each pellet that is completely covered by a passivating layer.

Figure 17:
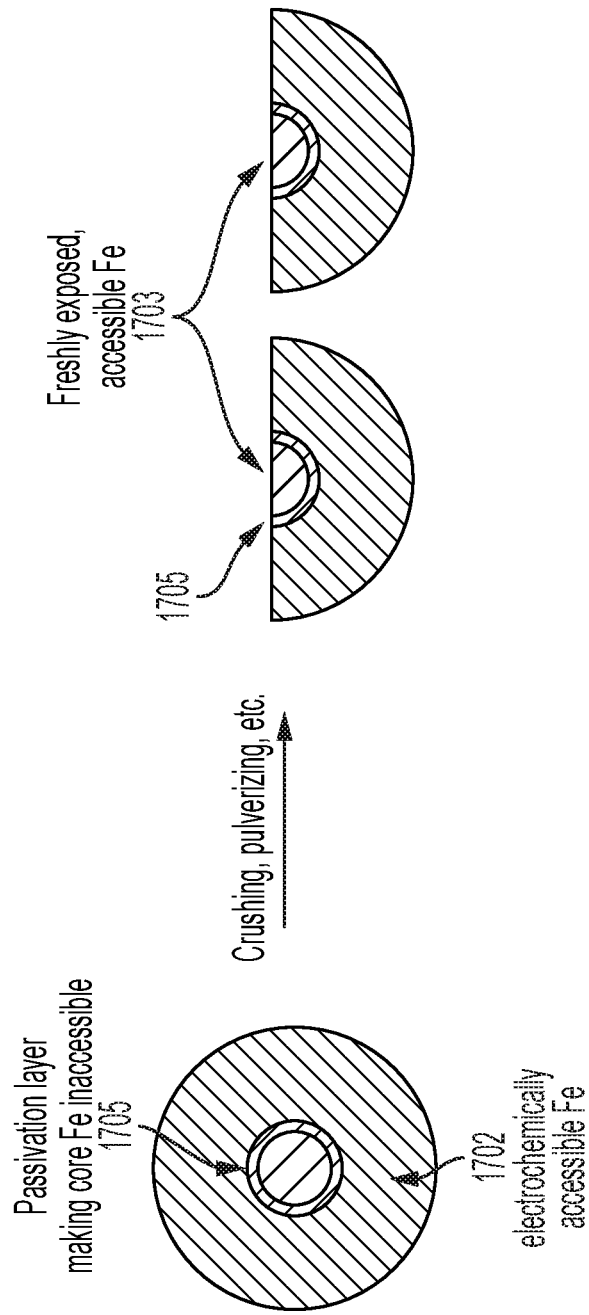
FIG. 17 illustrates a mechanically processed pellet.

The loss of accessible capacity due to battery use may be regained by ex-situ treatments that are performed on the pellets after the electrode capacity has decayed to a minimum threshold. Various embodiments include processing the used pellets with mechanical, chemical, electrochemical, and/or thermal processes before re-introducing the pellets into the electrochemical cell (i.e., processing the pellets ex-situ) to return the electrode to a state with better chemical and physical properties. Better chemical and physical properties may include higher content of desirable impurities (e.g., hydrogen evolution reaction (HER) suppressants), lower content of undesirable impurities (e.g., HER catalysts), higher specific surface area, higher total porosity, different pore size distribution (e.g. multimodal to reduce mass transport resistance), different pellet size distribution (e.g. multimodal to enhance bed packing), different aspect ratio (e.g. to enhance bed packing), etc. Mechanical processes that may be applied to the pellets ex-situ may include crushing, pulverizing, and/or powderizing that include but are not limited to size reduction. A mechanical size reduction re-exposes passivated metallic iron at the core of pellets, which makes the previously inaccessible iron accessible, thus increasing capacity. Note that mechanical processes that expose initially passivated iron at the core of pellets may not be desirable to be done before battery use, because more exposed metallic iron provides more sites at which the hydrogen evolution reaction might occur, either via the Faradaic parasitic reaction during charging, or via the spontaneous self-discharge reaction. However, mechanical processes done ex-situ may be desirable as a method to regain and/or improve capacity electrical resistance that have decayed due to battery usage, at which point a larger fraction of iron is passivated and inaccessible as illustrated for example in FIG. 17. Specifically, FIG. 17 shows a pellet 1702 after battery usage that is processed ex-situ, such as by crushing, pulverizing, etc., to expose the iron core 1703 in the pellet 1702. FIG. 17 shows the passivation layer 1705 which may make the core 1703 inaccessible until after processing.

Thermal processes that may be applied to the pellets ex-situ may include processing the pellets in at elevated temperature in reducing (e.g., hydrogen), oxidizing, and/or carburizing (e.g., carbon monoxide and/or carbon dioxide) atmosphere. In certain embodiments, the reducing condition is a gas mixture is 10% nitrogen, 30% carbon monoxide, 15% carbon dioxide, and 45% hydrogen at 800° C. for 90 minutes. Electrochemical processes that may be applied to the pellets ex-situ may include reverse electroplating, electrochemical dissolution, etc. Chemical processes that may be applied to the pellets ex-situ may include acid etching, etc. In various embodiments, to increase accessible capacity of the pellets during the discharge reaction, the pellets may be pretreated by soaking in an acid bath (e.g., concentrated HCl) that will etch the iron and enlarge pores in the pellets, increasing the total porosity of the pellets in comparison to used pellets. In various embodiments, to increase the accessible capacity of the pellets during the discharge reaction, the pellets may be pretreated by soaking in a neutral or slightly basic bath that removes excess discharge product from the electrode. For example, one of the expected discharge products, iron (II) hydroxide, is typically unstable at pH<8. By soaking in a bath at pH<8, the iron (II) hydroxide is preferentially removed while the metallic iron is preserved in the electrode. In the pH range pH>7 and pH<8, the bath may be a diluted form of the electrolyte used during electrochemical operation of the battery. After pretreatment, the etched and now more porous pellets may be re-assembled into the negative electrode. The chemical process time may be optimized to increase the usable capacity of the pellets, without losing too much active material to the acid etching solution. Any of the aforementioned processes may be optimized to preferentially make small pores in the pellets larger. In certain embodiments, an electrochemical process utilizes one or more large current pulses that result in a non-uniform current distribution within the pellet such that current is concentrated at sharp and small physical features within the pellet, which preferentially drives the electrochemical dissolution at small physical features and thus makes initially small pores larger. Any of the above processes may also be done before battery operation to make the chemical and physical properties of the pellets better relative to their unmodified, unused state.

Electrolyte Additives for Controlling Discharge Product Morphology

Figure 18:
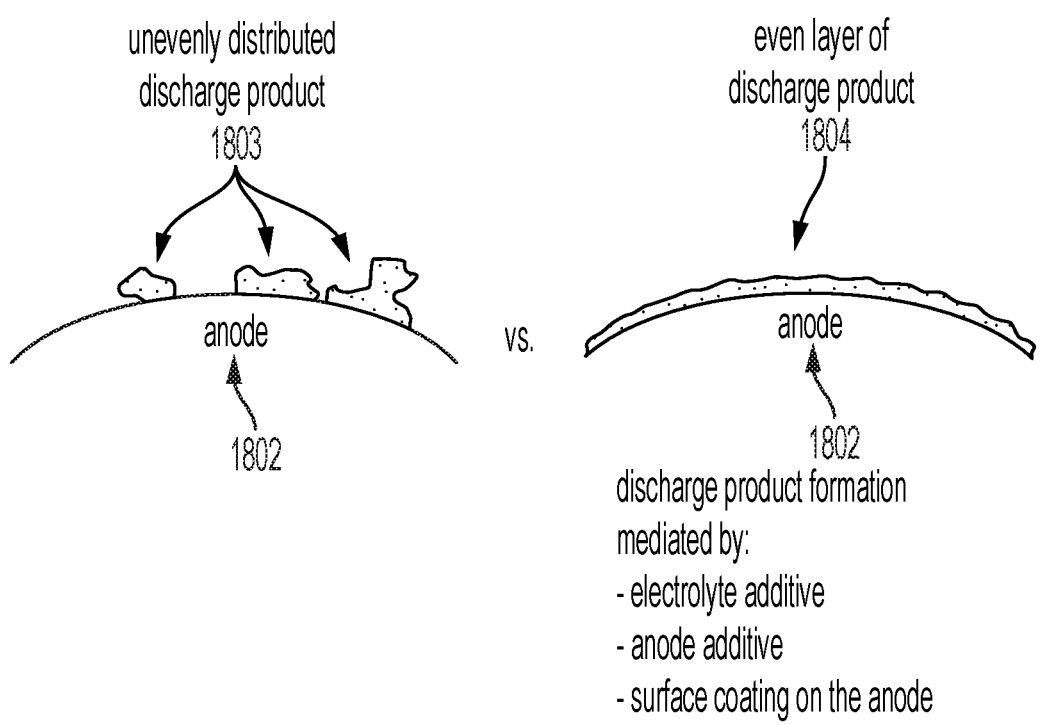
FIG. 18 compares discharge product distributions.

The shape and size of discharge product within the pores of the iron pellets can affect performance in a variety of ways. For example, a thin, uniform layer of discharge product may avoid clogging pores, which may improve capacity retention. On the other hand, a thin uniform layer of discharge product that is not porous may passivate underlying metallic iron such that mass transport of hydroxide ions through the discharge product layer during discharge becomes hindered, thus reducing accessible capacity of the electrode. In another example, an uneven, high-surface-area, porous discharge product may facilitate mass transport through the discharge layer while increasing the active surface area for the next discharge, both of which may increase total accessible capacity. FIG. 18 compares discharge product distributions. The left side of FIG. 18 shows discharge product 1803 unevenly distributed on a surface of an anode 1802. The right side of FIG. 18 shows discharge product 1804 in an even layer on the surface of the anode 1802. The discharge product formation may be mediated by the electrolyte additives, anode additives, and/or surface coatings of the anode 1802. Various methods of controlling discharge product morphology in iron electrodes are disclosed.

Additives and counterions in the electrolyte and/or in the electrode may be used to control the discharge product morphology. Additives and counterions may change the porosity of the discharge layer and accessibility electrochemically active sites by way of the following mechanism: Fe forms a two-layer discharge product with a relatively static inner layer of $Fe_3O_4$ and a very porous outer layer, which is affected strongly by electrolyte composition. Bivalent cations tend to inhibit uniform discharge and help produce a more porous outer layer. Monovalent cations inhibit uniform discharge and produce a more porous outer layer when they are not well-matched in size with the Fe cations in the outer layer of discharge product. For example, lithium and cesium cations tend to produce a more porous outer layer than sodium and potassium cations because lithium and cesium are less matched in size with the iron cation. Additives and counterions to control discharge product morphology include but are not limited to sulfide ($S_2-$), hydrosulfide (HS−), lithium cation (Li+), sodium cation (Na+), calcium cation ($Ca_2+$), selenide ($Se_2-$), cesium cation (Cs+), and barium cation ($Ba_2+$). In certain embodiments, sodium sulfide, lithium hydroxide, sodium hydroxide, calcium hydroxide, sodium selenide, and/or barium hydroxide are added into the electrolyte at various concentrations to provide the soluble additives and counterions that act to control discharge product morphology.

In certain embodiments, the additives to control discharge product morphology are initially contained within the solid-state electrode. The solid-state additives may be in the form of solid-state metal oxides and/or metal sulfides introduced as solids to an iron electrode. Metal sulfides and oxides of interest include: FeS, $FeS_2$, MnS, $Bi_2S_3$, $Bi_2O_3$, $Sb_2S_3$, FeAsS, PbS, SnS, HgS, AsS, $Pb_4FeSb_6S_{14}$, $Pb_3Sn_4FeSb_2Si_4$, $SeS_2$, among others.

In certain embodiments, additives to control discharge product morphology include one or more of sodium thiosulfate, sodium thiocyanate, polyethylene glycol (PEG) 1000, trimethylsulfoxonium iodide, zincate (by dissolving ZnO in NaOH), hexanethiol, decanethiol, sodium chloride, sodium permanganate, lead (IV) oxide, lead (II) oxide, magnesium oxide, sodium chlorate, sodium nitrate, sodium acetate, iron phosphate, phosphoric acid, sodium phosphate, ammonium sulfate, ammonium thiosulfate, lithopone, magnesium sulfate, iron(III) acetylacetonate, hydroquinone monomethyl ether, sodium metavanadate, sodium chromate, glutaric acid, dimethyl phthalate, methyl methacrylate, methyl pentynol, adipic acid, allyl urea, citric acid, thiomalic acid, N-(2-aminoethyl)-3-aminopropyl trimethoxysilane, propylene glycol, trimethoxysilyl propyl diethylene, aminopropyl trimethoxysilane, dimethyl acetylenedicarboxylate (DMAD), 1,3-diethylthiourea, N,N'-diethylthiourea, aminomethyl propanol, methyl butynol, amino modified organosilane, succinic acid, isopropanolamine, phenoxyethanol, dipropylene glycol, benzoic acid, N-(2-aminoethyl)-3-aminopropyl, behenamide, 2-phosphonobutane tricarboxylic, mipa borate, 3-methacryloxypropyl-trimethoxysilane, 2-ethylhexoic acid, isobutyl alcohol, t-butylaminoethyl methacrylate, diisopropanolamine, propylene glycol n-propyl ether, sodium benzotriazolate, pentasodium aminotrimethylene phosphonate, sodium cocoyl sarcosinate, laurylpyridinium chloride, steartrimonium chloride, stearalkonium chloride, calcium montanate, quaternium-18 chloride, sodium hexametaphosphate, dicyclohexylamine nitrite, lead stearate, calcium dinonylnaphthalene sulfonate, iron(II) sulfide, sodium bisulfide, pyrite, sodium nitrite, complex alkyl phosphate ester (e.g. RHODAFAC® RA 600 Emulsifier), 4-mercaptobenzioc acid, ethylenediaminetetraacetic acid, ethylenediaminetetraacetate (EDTA), 1,3-propylenediaminetetraacetate (PDTA), nitrilotriacetate (NTA), ethylenediaminedisuccinate (EDDS), diethylenetriaminepentaacetate (DTPA), and other aminopolycarboxylates (APCs), diethylenetriaminepentaacetic acid, 2-methylbenzenethiol, 1-octanethiol, bismuth sulfide, bismuth oxide, antimony(III) sulfide, antimony(III) oxide, antimony(V) oxide, bismuth selenide, antimony selenide, selenium sulfide, selenium(IV) oxide, propargyl alcohol, 5-hexyn-1-ol, 1-hexyn-3-ol, N-allylthiourea, thiourea, 4-methylcatechol, trans-cinnamaldehyde, Iron(III) sulfide, calcium nitrate, hydroxylamines, benzotriazole, furfurylamine, quinoline, tin(II) chloride, ascorbic acid, tetraethylammonium hydroxide, calcium carbonate, magnesium carbonate, antimony dialkylphosphorodithioate, potassium stannate, sodium stannate, tannic acid, gelatin, saponin, agar, 8-hydroxyquinoline, bismuth stannate, potassium gluconate, lithium molybdenum oxide, potassium molybdenum oxide, hydrotreated light petroleum oil, heavy naphthenic petroleum oil (e.g. sold as Rustlick® 631), antimony sulfate, antimony acetate, bismuth acetate, hydrogen-treated heavy naphtha (e.g. sold as WD-40®), tetramethylammonium hydroxide, NaSb tartrate, urea, D-glucose, C6Na2O6, antimony potassium tartrate, hydrazine sulfate, silica gel, triethylamine, potassium antimonate trihydrate, sodium hydroxide, 1,3-di-o-tolyl-2-thiourea, 1,2-diethyl-2-thiourea, 1,2-diisopropyl-2-thiourea, N-phenylthiourea, N,N'-diphenylthiourea, sodium antimonyl L-tartrate, rhodizonic acid disodium salt, sodium selenide, potassium sulfide, and combinations thereof A pretreatment involving electrochemical cycling may also serve to control the morphology of discharge products for an iron electrode. For example, the inventors have observed that the compactness of the discharge product changes with temperature and current density. A pretreatment involving electrochemical cycling at a temperature and current density that is not necessarily the nominal operating condition of the battery may be used to form a discharge product morphology that is conducive to high accessible capacity, and is sustained when the operating conditions are set to nominal values after the pretreatment. In various embodiments, the pretreatment consists of deep electrochemical charge and discharge cycling at 10° C. at a gravimetric current density of 25 mA/gFe for 100 cycles.

Using Temperature as a Means of Improving Performance

Figure 19:
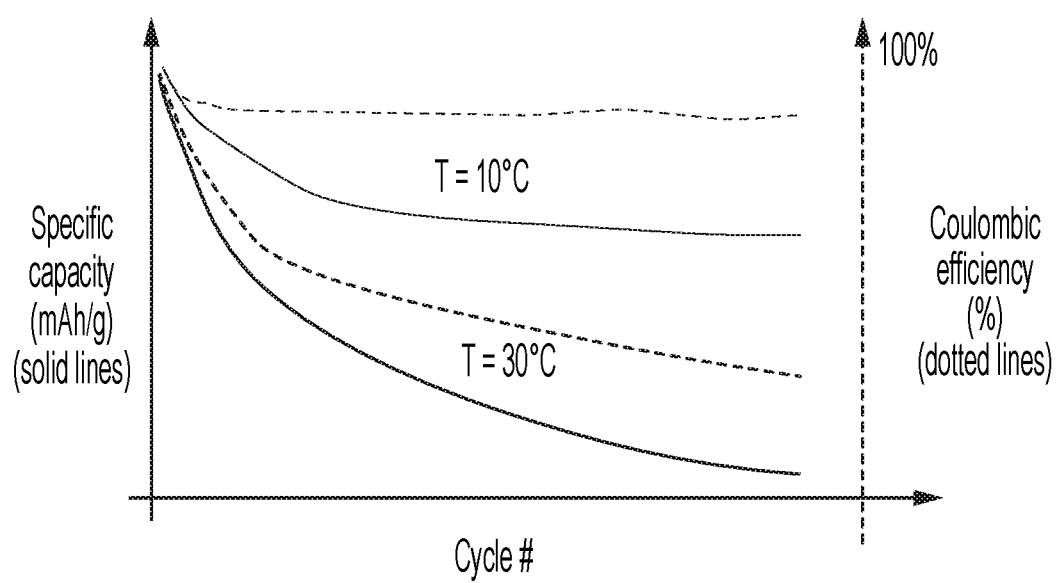
FIG. 19 is a temperature plot.

The inventors have found that decreasing the operating temperature of the iron electrode to below 30° C. improves various performance attributes, such as specific capacity, the retention of specific capacity over many electrochemical cycles, and Coulombic efficiency of the electrode. Various mechanisms may be at play simultaneously to result in these effects. For example, specific capacity may be improved at lower temperatures due to an increase in electrical conductivity of the electrode material, including but not limited to iron and iron oxide discharge products. The increase in electrical conductivity of the electrode material would enhance electrical transport to electrochemical reaction sites, which would result in an increase in specific capacity at a given polarization limit of the electrode. In another example, reducing temperature may slow the kinetics of undesirable electrolyte degradation or poisoning reactions that take place during the lifetime of the battery, such as carbonate formation due to carbon dioxide from the atmosphere. For example, carbonate formation consumes OH− ions, decreasing the conductivity of the electrolyte, which decreases the pH of the solution and leads to a decrease in specific capacity. Decreasing the temperature slows these undesirable reactions and result in better specific capacity retention at the iron electrode over the lifetime of the battery. In another example, the decrease in temperature may slow the kinetics of the undesirable hydrogen evolution reaction more so than the desired iron reduction reaction during charging of the battery, thus resulting in a higher coulombic efficiency during charging. In various embodiments, the iron electrode is maintained at 20° C.±5° C. to improve electrode performance In other embodiments, the iron electrode is maintained at 10° C.±5° C. to improve electrode performance. FIG. 19 is a temperature plot of specific capacity and Coulombic efficiency versus cycle number.

Redox Mediator to Improve Performance

Better electrochemical kinetics of the charging (reduction) and discharging (oxidation) reactions at the iron-based electrode would improve both voltaic efficiency and coulombic efficiency of the cell. A redox mediator can be used to improve the electrochemical kinetics of the iron-based electrode. A redox mediator is a chemical compound that acts as an electron "shuttle" to mediate a reduction or oxidation reaction. Though typically used in the field of biocatalysis, redox mediators can also be used to facilitate the desired oxidation and reduction reactions at the iron-based electrode. Requirements of the redox mediator include (1) fast and reversible redox kinetics; (2) similar redox potential to that of the reaction it facilitates (including but not limited to $Fe \leftrightarrows Fe(OH)_2$ and/or $Fe(OH)_2 \leftrightarrows Fe_3O_4$); (3) stable in the presence of the electrolyte of interest. The redox mediator can be either soluble or insoluble in the electrolyte of interest. In some embodiments, the redox mediator contains one or more unsaturated base groups, saturated base groups, or combinations thereof. In some embodiments, the base groups contain electron-withdrawing functional groups, electron-donating functional groups, or combinations thereof. In certain embodiments, the unsaturated base groups include but are not limited to cyclopenta-1,3-diene, benzene, 1H-pyrrole, pyridine, pyrazine, furan, 4H-pyran, 1,4-dioxine, thiophene, 4H-thiopyran, 1,4-dithiine, 1-methyl-1H-pyrrole, or combinations thereof. In certain embodiments, the saturated base groups include but are not limited to cyclopentane, cyclohexane, 1,4-dioxane, tetrahydrofuran, tetrahydro-2H-pyran, 1,4-dithiane, tetrahydrothiophene, tetrahydro-2H-thiopyran, 1,4-dimethylpiperazine, 1,3,5-troxane, 1,3,5-trithiane, or combinations thereof. In certain embodiments, the electron-withdrawing functional groups include but are not limited to nitro, trichloro, cyano, carboxyl, fluoro, hydroxyl, or combinations thereof. In certain embodiments, the electron-donating functional groups include but are not limited to primary amine, secondary amine, tertiary amine, amide, methoxy, methyl, alkyl, alkenyl, alkynyl, phenyl, or combinations thereof. In one embodiment, the redox mediator for the iron-based negative electrode are viologen-based compounds. In certain embodiments, the viologen-based compounds include but are not limited to methyl viologen, propyl viologen, hexyl viologen, octyl viologen or combinations thereof.

Sulfide Incorporation to the Iron Electrode via Electrolyte

In an electrochemical cell with an iron electrode, sulfur addition to the cell unlocks utilization of the iron electrode. However, sulfur is a known catalyst poison, so in electrochemical cell embodiment with a catalyst positive electrode, it may be optimal for the sulfur concentration around the iron electrode is high, while sulfur concentration at the catalyst electrode is low.

In one embodiment, sulfur may be concentrated at the iron electrode by submerging the iron electrode in a highly concentrated sulfur solution before it enters the electrochemical cell. Furthermore, if the iron electrode undergoes a single formation cycle of charge, then discharge, sulfur will be electrochemically added to the structure of the iron electrode. Then upon addition to the desired electrochemical cell it will remain concentrated near the anode.

In certain embodiments, the iron electrode is soaked in an electrolyte with a high sulfide concentration (i.e., >50 mM) prior to cycling in an electrolyte with a lower sulfide concentration (ie 50 mM).

In certain embodiments, the porous iron electrode is soaked in an electrolyte bath with any alkali or transition metal sulfide ($Na_2S$, $K_2S$, $Bi_2S_3$, $SbS_3$, etc.) to increase the presence of sulfide.

In certain embodiments, sulfide is incorporated through a high sulfide concentration electrolyte soak prior to cycling, after which the positive electrodes are inserted into the full cell wherein the initial sulfide concentration can be in the range of 10-250 mM (1.4-33.8 mgS/gFe) or higher.

In one non-limiting example, the porous iron electrode described above comprises a bed of DRI pellets.

Uniform or controlled incorporation of sulfide or other beneficial additives into a porous iron electrode is difficult. One method to uniformly incorporate additives into a porous material is vacuum infiltration, where a substrate is exposed to vacuum (<1 atm) to evacuate the pores and then exposed to a liquid or molten additive to infill any vacancies in the material.

Figure 20:
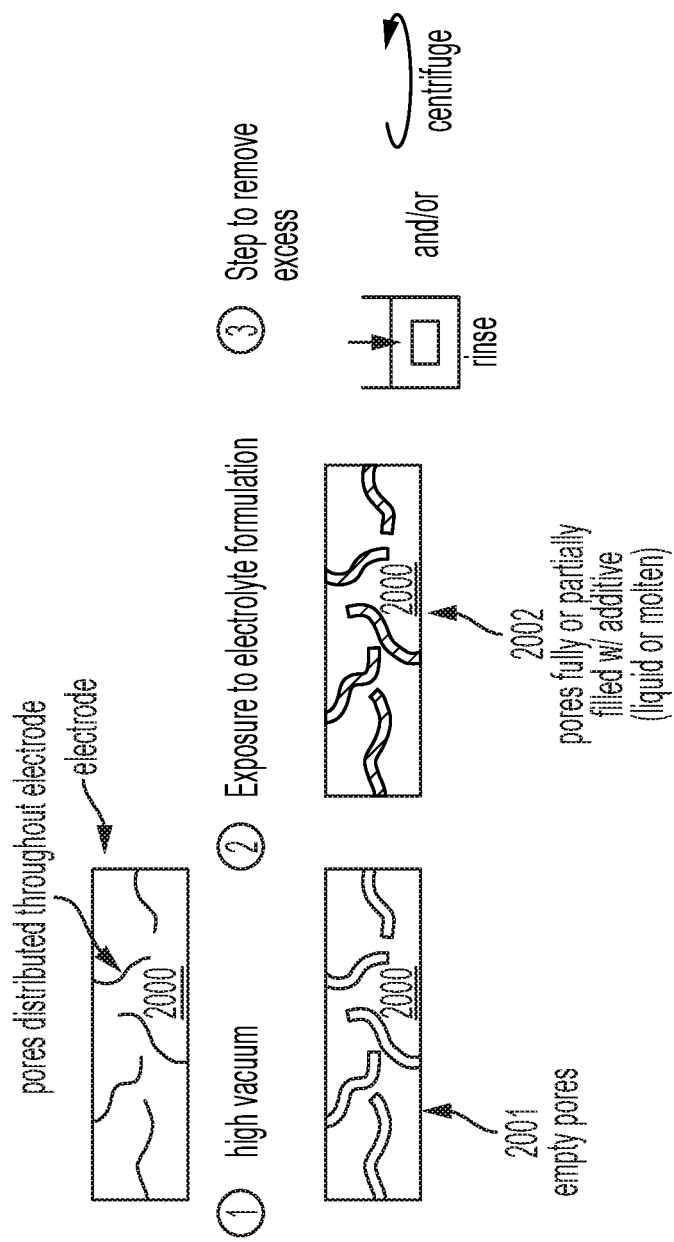
FIG. 20 illustrates one example method of evacuating pores.
Figure 22:
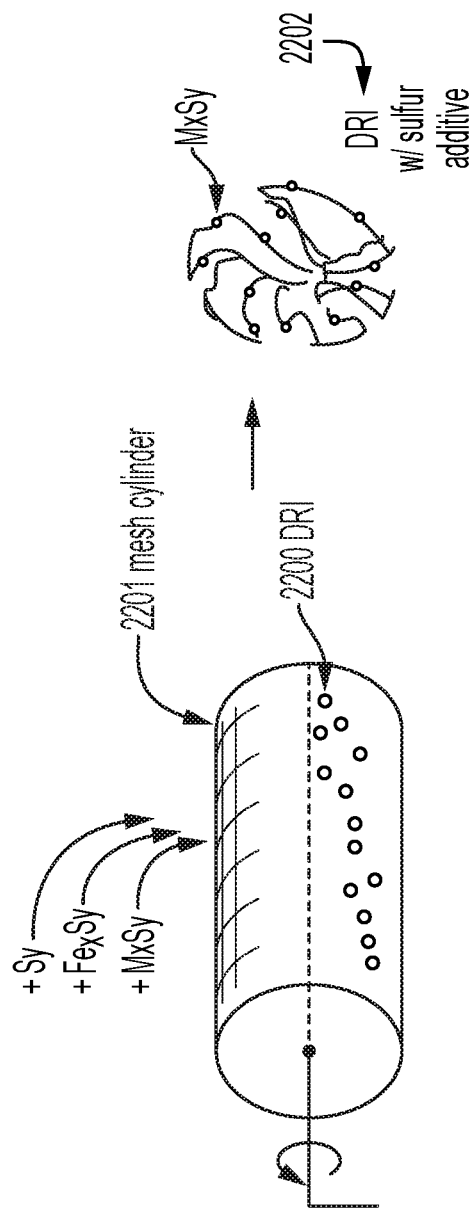
FIG. 22 illustrates an example additive incorporation process.

In various embodiments, a substrate is exposed to vacuum sufficient to evacuate pores. FIG. 20 illustrates one example method of evacuating pores. The substrate 2000 is in a first step exposed to a high vacuum to empty the pores 2001.

In one embodiment, the evacuated substrate is then exposed in a second step to an aqueous electrolyte formulation containing additives as specified previously at temperatures between 0 and 250° C. resulting in pores fully or partially filled with additive 2002. After specified time, such as less than 48 hours, the substrate 2000 may be rinsed or centrifuged to remove excess electrolyte in a third step.

In one embodiment, the evacuated substrate is then exposed to a liquid or molten form of additive, where additives are those specified previously in section ## that someone skilled in the art could identify as being compatible with melt processes (e.g. octanethiol, FeS), at temperatures between 25 to 250° C. or 250 and 2000° C. After a specified time less than 48 hours, substrate may be rinsed or centrifuged to remove excess liquid or molten material.

In one embodiment, the evacuated substrate is then exposed to a gaseous additive (e.g. $H_2S$, $H_2Se$, $CS_2$ above 50° C., $PH_3$). After a specified time, such as less than 48 hours, substrate may be purged with an inert gas or under vacuum to remove excess of the gaseous additive.

In a non-limiting example, a solution containing sodium sulfide is vacuum infiltrated into the pores of a porous iron electrode 2000 prior to cycling to improve the penetration. Better penetration of sulfide into the anode may improve overall performance capacity.

In a non-limiting example, sodium thiosulfate is heated until melted (>45° C.) and vacuum infiltrated into the pores of a porous iron electrode prior to cycling.

Additional methods to localize the sulfide to the iron particulate material electrode include sequestering the sulfide additive in a holder of variable permeability within or adjacent to the electrode. In this way, controlled amounts of sulfide could be added to the iron particulate electrode through passive or active electrochemical or chemical dissolution.

In one embodiment, the additive may be contained in a fully or semipermeable holder, where the holder is made of a plastic stable in an alkaline solution (e.g., polypropylene, polyethylene).

In one embodiment, the additive may be contained in the holder behind an ion-selective membrane, which permits flow of electrolyte into the holder and the slow diffusion of additive into solution.

In one embodiment, the additive may be contained in an electrically conductive material (e.g., conducting polymer mesh, metallic wire mesh).

In one embodiment, the holder may be made of a layer of porous oxide (e.g. silica).

In one embodiment, the additive holder may be in physical, electrical, or physical and electrical contact with the iron particulate material electrode.

In one embodiment, the additive holder may be in contact with the electrolyte and only in contact with the iron particulate material electrode through ionic transport in the electrolyte.

In one embodiment, the additive holder may be submerged in a separate container of electrolyte to provide a constant source of sulfide. The electrolyte in contact with the iron particulate material electrode is then replaced with the electrolyte in contact with the additive holder.

In one embodiment, the additive holder may be in electrical contact with a potentiostat or system, which maintains the holder at potentials that prevent the dissolution of the additive in the holder. FIG. 21 illustrates example additive holder configurations. In the configuration shown in the top portion of FIG. 21, the bag containing additive 2104 may be in contact with the iron particulate material 2103 disposed in the electrolyte 2100 between the current collectors 2102 along with the iron particulate material 2103. In the configuration shown in the bottom portion of FIG. 21, the bag containing additive 2104 may be suspended in the electrolyte 2100 separated from the iron particulate material 2103 and current collector 2102, such as by an optional electrical connection 2110.

Solid Sulfur Containing Additives

Sulfide ions in the electrolyte solution have been proven to increase accessible capacity and cyclability of iron electrodes in alkaline secondary batteries. Sulfide ions, however, have been shown to reduce in concentration in the electrolyte due to ageing with cycle number and time, which may reduce the positive impacts of the dissolved sulfide on anode performance. One method to enable improved performance throughout lifetime is to incorporate sulfur containing species directly into the iron electrode material.

In one embodiment, elemental sulfur is introduced directly into porous iron anodes by melt diffusing the sulfur into the porous metal. The sulfur will then be introduced to the anode as a solid and be in intimate contact with the active metal anode material, promoting positive interactions that improve accessible capacity and cycle life.

In another embodiment, metal sulfides are introduced as solids to an iron anode. Metal sulfides of interest include: FeS, $FeS_2$, MnS, $Bi_2S_3$, $Sb_2S_3$, FeAsS, PbS, SnS, HgS, AsS, $Pb_4FeSb_6S_{14}$, $Pb_3Sn_4FeSb_2S_{14}$, $SeS_2$, among others. The cation in the metal sulfide may contribute to the battery's capacity (i.e., Fe), be inert to the charge/discharge reaction (i.e., Mn), or retard the hydrogen evolution reaction (i.e., Pb, Sb, Hg, As, Bi).

In one non-limiting example, the metal sulfides are incorporated into a bed of direct reduced iron (DRI) pellets.

Methods for incorporation of sulfur containing species into iron electrodes include, but are not limited to: (1) Incorporation of bulk solid particles, powders, or agglomerates into voids between material in the electrode bed; (2) Incorporation via melt diffusion into the electrode pores for metal sulfides with melting points below the melting point of iron metal (i.e., $Bi_2S_3$); (3) Incorporation of metal sulfide powders by mixing into oxidized ore pellets (i.e., taconite pellets) during the pelletization process (In such an embodiment, the metal sulfide would remain in the pellet through the reduction process, producing a pellet with metallic iron, metal sulfide, and impurities.); (4) Incorporation of metal sulfides into pellets containing only the metal sulfide and a binder. In one non-binding example, these pellets could be directly incorporated into a pellet bed of DRI in a specific ratio with DRI pellets; and (5) Incorporation of metal sulfide powder using a mixing, milling, or rolling apparatus, such as a ball mill.

In another embodiment, the above-mentioned incorporation methods are used with sulfur containing additives including, but not limited to, metal sulfides.

In another embodiment, sulfur containing additives including, but not limited to, metal sulfides, are incorporated into the iron anode material via the Trommel screening process step of DRI production, such as illustrated in FIG.

22 in which DRI pellets 2200 in a mesh cylinder are infused with sulfur additives during production to result in DRI with sulfur additive pellets 2202.

Incorporation of Sulfide or Other Anionic Species into an Fe Anode

Uniform or controlled incorporation of additives into a preformed metal electrode is difficult and limits effectiveness of additives.

Various embodiments include selective precipitation with reactive counterions. In various embodiments, a metal is incorporated into the particulate iron material electrode in the neutral or oxidized state and subsequently reacted with a counterion of choice. The concentration of the metal additive is determined by the solubility of the source compound or final desired concentration of the reactive counterion in the electrode. In certain embodiments, this electrode is exposed to an electrolyte containing a source of a reactive counterion (e.g. $Na_2S$, $K_2S$, $Na_2Se$, $Na_2Te$) to form a compound (e.g. CdS, $Bi_2S_3$, $Bi_2Se_3$) in situ where the localization and concentration may be determined by the presence, concentration, and solubility of the additive metal, reactive counterion, or resulting compound. In certain embodiments, accessibility of these additives may be further adjusted by use of fugitive pore-formers. In certain embodiments this electrode is cycled electrochemically before or after exposure to an electrolyte containing the reactive counterion in a specified concentration to control the uptake of the reactive counterion.

In a non-binding example, 0.5 to 10 wt % $Bi_2O_3$ is incorporated into the electrode before being cycled electrochemically to potentials sufficiently reducing to form Bi(s). Exposure to an electrolyte containing 250 mM $Na_2S$ may form $Bi_2S_3$ distributed throughout the electrode in the reactions shown below:

$$Bi_2O_3 + 3H_2O \rightarrow 2Bi(s) + 6OH-$$

$$2Bi(s) + 3S_2^- \rightarrow Bi_2S_3.$$

In various embodiments, an additive of interest that is a source of sulfur, selenium, tellurium, nitrogen, or phosphorus (e.g. $Na_2S$, $Na_2Se$, $Na_3PO_4$) is incorporated into the electrode at a concentration determined by the solubility of the source compound or final desired concentration of the final compound in the electrode.

In certain embodiments, this electrode is exposed to an electrolyte containing a source of a reactive metal (e.g. Fe, Bi, Hg, As, Cd, Cu, Ni, In, Tl, Zn, Mn, Ag) or metal-containing ion (e.g., $Bi(NO_3)_3$, $NaAsO_4$, $Cd(NO_3)_2$, $CuSO_4 \cdot xH_2O$ (where x=0 to 12)) to form a compound (e.g. CdS, $Bi_2S_3$, $Bi_2Se_3$) in situ where the localization and concentration may be determined by the presence, concentration, and solubility of the additive metal, reactive counterion, or resulting compound. The solubility of the non-metallic additive may allow for the creation of local concentration gradients in the electrolyte, leading to regions where precipitation is more favored. In certain embodiments, accessibility of these additives may be further adjusted by use of fugitive pore-formers. In certain embodiments this electrode is cycled electrochemically before or after exposure to an electrolyte containing the metal or metal-containing ion in a specified concentration to control the uptake of the metal or metal-containing ion.

In a non-binding example, $Na_2S$ may be incorporated into the metal electrode. Exposure to an electrolyte containing $Bi(NO_3)_3$ may form $Bi_2S_3$ distributed throughout the electrode in the reaction shown below:

$$2Bi(NO_3)_3(aq) + 3Na_2S \rightarrow 6NaNO_3 + Bi_2S_3(s)$$

In various embodiments, an additive of interest that is a source of sulfur, selenium, tellurium, nitrogen, or phosphorus but may be not itself be ionic (e.g. S or Se metal) is incorporated into the electrode at a concentration determined by the solubility of the source compound or final desired concentration of the final compound in the electrode.

Figure 23:
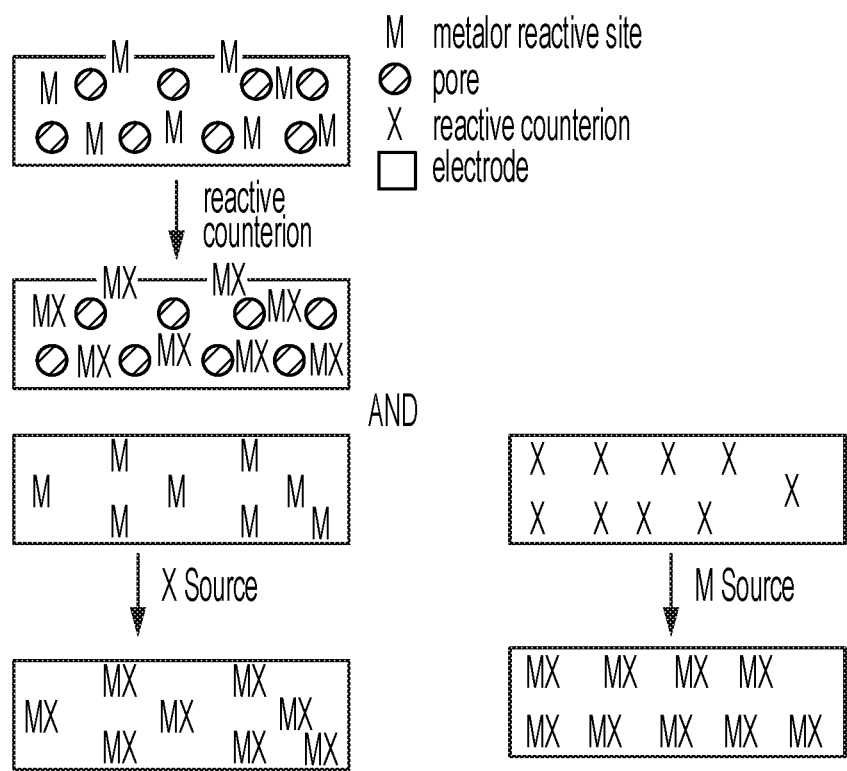
FIG. 23 illustrates an electrode formation process.

In various embodiments, this electrode containing a non-reactive additive may be exposed to an electrolyte, which in one embodiment contains NaOH or KOH, and, in one embodiment, is electrochemically cycled to generate anionic species on the anode or in the electrolyte (e.g. $S_2^-$, $S_2^{2-}$, polysulfides). The species may react to form $Bi_2S_3$ on the surface or sequestered in the anode as illustrated in FIG. 23. The exposure of the anode to this electrolyte may increase the overall porosity as the counterion reacts, which may be beneficial to overall accessible capacity.

Improve Longevity of Sulfide in Electrolyte

Water and air sensitive additives can rapidly degrade in aqueous alkaline electrolyte. For example, compounds containing sulfide ($S^{2-}$) and bisulfide ($HS^-$) such as $Na_2S$ or NaSH degrade on exposure to oxygen by forming sulfate or other sulfur-containing compounds (e.g. sulfite, thiosulfate, sulfur, polysulfides):

$$2HS^- + 3O_2 \rightarrow SO_3^{2-} + 2H^+$$

3 $$2HS^- + 3O_2 + 2OH^- \rightarrow SO_3^{2-} \cdot 2H_2O$$

$$2SO_3^{2-} + O_2 \rightarrow 2SO_4^{2-}$$

3 $$2SO_3^{2-} + 2HS^- + O_2 \rightarrow 2S_2O_3^{2-} - 2OH^-$$

It is favorable to maintain sulfur species in the electrode or electrolyte as sulfide or bisulfide as the reduction of sulfate or other oxidized sulfur-containing compounds back to sulfide, bisulfide, or hydrogen sulfide is difficult.

In one embodiment, oxidized sulfur-containing species (e.g., $Na_2SO_4$, $Na_2S_2O_3$, $Na_2SO_3$, S metal) are added to the electrolyte in sufficient quantity to reduce or completely suppress formation of oxidized sulfur species by shifting the equilibrium in favor of the reduced sulfur species, in accordance with Le Chatelier's principle.

In one embodiment, oxidized sulfur-containing species (e.g., $Na_2SO_4$, $Na_2S_2O_3$, $Na_2SO_3$, S metal) are added to the electrode. Upon exposure to the electrolyte, these soluble additives may dissolve in the electrolyte, increasing the porosity of the electrode and reducing or suppressing the formation of oxidized sulfur species in solution.

In one embodiment, oxidized sulfur-containing species that also contain a metallic cation (e.g. $FeSO_4$, $FeS_2O_3$, $FeSO_3$) is added to suppress the oxidation of reduced sulfur species as well as suppress the dissolution of metallic species from the iron electrode.

High Sulfide Compatibility of DRI-Based Iron-Air Batteries

DRI-based iron negative electrodes exhibit compatibility over a wide range of initial sulfide concentrations within the electrolyte. In addition, it has been shown that the initial sulfide concentration on a gS/gFe is the driving factor, not sulfide concentration in the electrolyte.

In certain embodiments, an initial sulfide concentration of 1 mM $Na_2S$ (0.1 mgS/gFe) is sufficient for stable capacity performance.

In certain embodiments, an initial sulfide concentration of 10 mM $Na_2S$ (1.4 mgS/gFe) is sufficient for stable capacity performance.

In certain embodiments, an initial sulfide concentration of 50 mM $Na_2S$ (6.8 mgS/gFe) is sufficient for stable capacity performance.

In certain embodiments, an initial sulfide concentration of 175 mM Na$_2$S (23.6 gS/gFe) is sufficient for stable capacity performance.

In certain embodiments, an initial sulfide concentration of >=250 mM Na$_2$S (33.8 gS/gFe) is sufficient for stable capacity performance.

Further, the method of sulfide incorporation into the iron negative electrode can be achieved with a variety of techniques.

In certain embodiments, sulfide is incorporated through a high sulfide concentration electrolyte within the full cell.

In certain embodiments, sulfide is incorporated through a high sulfide concentration electrolyte soak prior to cycling, which can be completed in a non-sulfide containing electrolyte (may be beneficial for the positive electrodes).

In certain embodiments, sulfide is incorporated through a high sulfide concentration electrolyte soak prior to cycling, after which the positive electrodes are inserted into the full cell wherein the sulfide concentration can be in the range of 10-250 mM (1.4-33.8 mgS/gFe) or higher.

Optimal sulfide incorporation may also be achieved via maintenance methods including, but not limited to: 1) periodic addition of high sulfide concentration solution or in solid form; and 2) continual addition of sulfide in solid or solution form, wherein the sulfide concentration can be in the range of 10-250 mM (1.4-33.8 mgS/gFe) or higher In an embodiment, −325 mesh iron sponge powders with open porosity internal to the particles are thermally bonded via sintering to comprise the base for an iron electrode material. Bismuth oxide and iron sulfide are incorporated throughout the sintered electrode material, and the materials are thermally bonded to a current collecting, perforated sheet, and the sintered connections to the current collectors and between the powder particles obviate the need for compression to attain conduction. An alkaline electrolyte is comprised of a mixture of 80% potassium hydroxide, 15% sodium hydroxide, and 5% lithium hydroxide on a molar basis, with a total hydroxide concentration of 6 molar (mol/L) in an aqueous solution.

In one embodiment, the iron electrode material may comprise direct reduced iron pellets, with an electrolyte comprising six molar potassium hydroxide, 0.1 molar lithium hydroxide, 0.05 molar sodium sulfide. The iron electrode may further comprise 1 wt. % bismuth sulfide distributed finely among the direct reduced iron pellets. The electrode materials may be compressed in a rigid cage comprising nickel-plated current collecting stainless steel plates applying uniaxial pressure to compress the pellets within a rigid wall structure comprised of poly(methylmethacrylate), the current collecting plates held in place by stainless steel bolts which are electrically isolated from the current collectors. The bed thicknesses of such an embodiment may range from one to ten centimeters thick.

In an embodiment, the iron electrode material may comprise a carbonyl iron powder, lead oxide, and iron sulfide. The lead oxide is added at 0.1 wt. %, and the iron sulfide is included as 1.5 wt. %, both of the total weight of solids in the electrode. The solids are lightly sintered such that they bond and agglomerate, and are subsequently compressed in a nickel mesh textile which is compressed by inflation of a polyethylene balloon. The electrolyte is five molar sodium hydroxide with additives of 0.005 molar sodium sulfide and 0.01 molar octanethiol.

In another embodiment, direct reduced iron pellets are crushed to form particle sizes in the range of 1-6 mm. The particles are mixed with natural flake graphite with a particle size of 200 microns at 1 wt. % of the solids mix and 100 micron particle size iron sulfide at 0.05 wt. %. The electrolyte is aqueous with 6.5 molar potassium hydroxide, 0.5 molar lithium hydroxide, and 0.25 molar sodium sulfide, and 0.001 molar octanethiol. The solids mix is loaded into a nickel mesh bag with a mesh size around 0.5 mm, and the bag is compressed via a cinching mechanism to compress the solids material lightly.

Various embodiments may provide devices and/or methods for use in bulk energy storage systems, such as long duration energy storage (LODES) systems, short duration energy storage (SDES) systems, etc. As an example, various embodiments may provide batteries for bulk energy storage systems, such as batteries for LODES systems. Renewable power sources are becoming more prevalent and cost effective. However, many renewable power sources face an intermittency problem that is hindering renewable power source adoption. The impact of the intermittent tendencies of renewable power sources may be mitigated by pairing renewable power sources with bulk energy storage systems, such as LODES systems, SDES systems, etc. To support the adoption of combined power generation, transmission, and storage systems (e.g., a power plant having a renewable power generation source paired with a bulk energy storage system and transmission facilities at any of the power plant and/or the bulk energy storage system) devices and methods to support the design and operation of such combined power generation, transmission, and storage systems, such as the various embodiment devices and methods described herein, are needed.

A combined power generation, transmission, and storage system may be a power plant including one or more power generation sources (e.g., one or more renewable power generation sources, one or more non-renewable power generations sources, combinations of renewable and non-renewable power generation sources, etc.), one or more transmission facilities, and one or more bulk energy storage systems. Transmission facilities at any of the power plant and/or the bulk energy storage systems may be co-optimized with the power generation and storage system or may impose constraints on the power generation and storage system design and operation. The combined power generation, transmission, and storage systems may be configured to meet various output goals, under various design and operating constraints.

FIGS. 24-32 illustrate various example systems in which one or more aspects of the various embodiments may be used as part of bulk energy storage systems, such as LODES systems, SDES systems, etc. For example, various embodiments described herein with reference to FIGS. 1-23 may be used as batteries for bulk energy storage systems, such as LODES systems, SDES systems, etc. and/or various electrodes as described herein may be used as components for bulk energy storage systems. As used herein, the term "LODES system" may mean a bulk energy storage system configured to may have a rated duration (energy/power ratio) of 24 hours (h) or greater, such as a duration of 24 h, a duration of 24 h to 50 h, a duration of greater than 50 h, a duration of 24 h to 150 h, a duration of greater than 150 h, a duration of 24 h to 200 h, a duration greater than 200 h, a duration of 24 h to 500 h, a duration greater than 500 h, etc.

Figure 24:
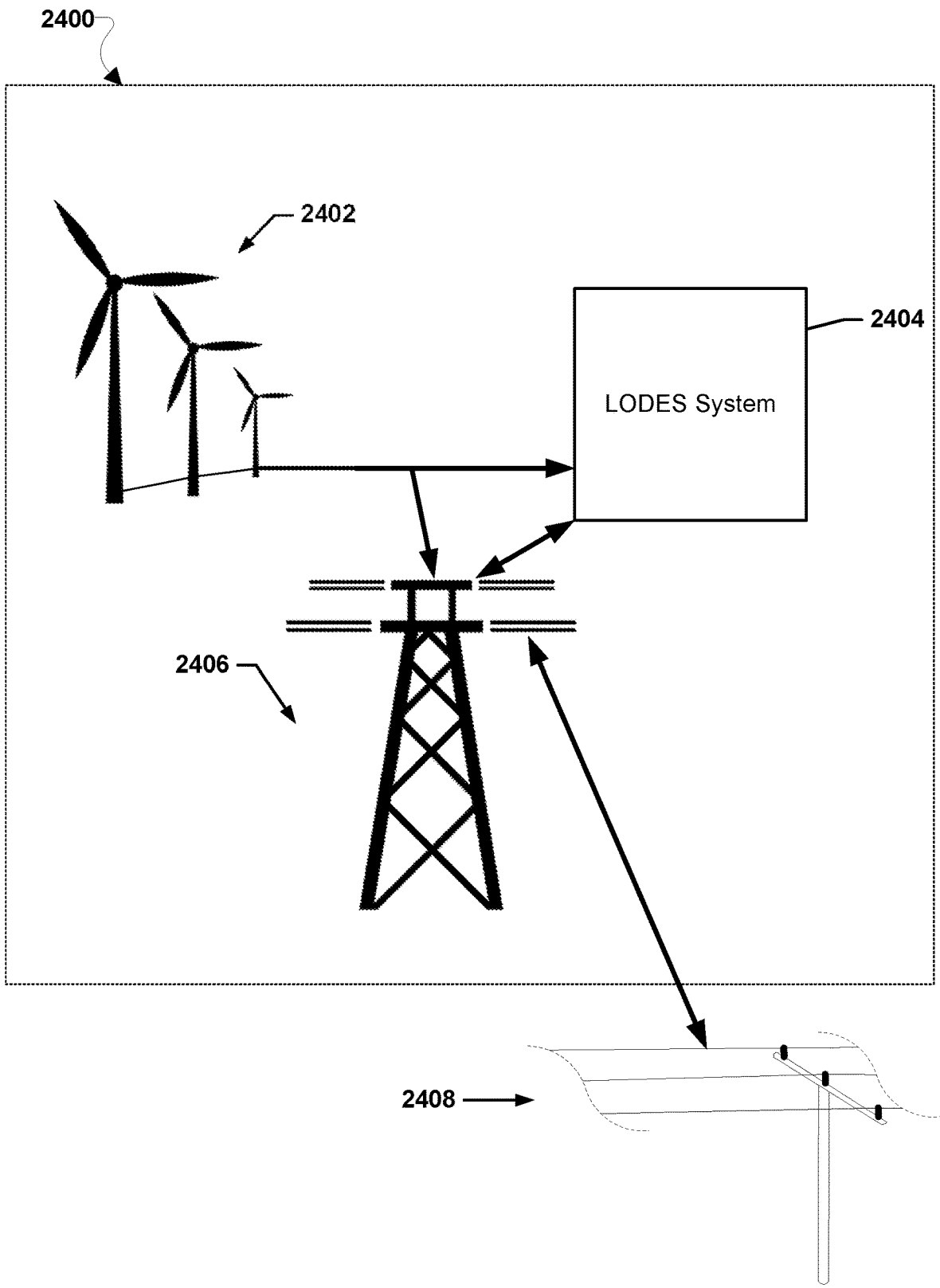
FIGS. 24-32 illustrate various example systems in which one or more aspects of the various embodiments may be used as part of bulk energy storage systems.

FIG. 24 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be electrically connected to a wind farm 2402 and one or more transmission facilities 2406. The wind farm 2402 may be electrically connected to the transmission facilities 2406. The transmission facilities 2406 may be electrically connected to the grid 2408. The wind farm 2402 may generate power and the wind farm 2402 may output generated power to the LODES system 2404 and/or the transmission facilities 2406. The LODES system 2404 may store power received from the wind farm 2402 and/or the transmission facilities 2406. The LODES system 2404 may output stored power to the transmission facilities 2406. The transmission facilities 2406 may output power received from one or both of the wind farm 2402 and LODES system 2404 to the grid 2408 and/or may receive power from the grid 2408 and output that power to the LODES system 2404. Together the wind farm 2402, the LODES system 2404, and the transmission facilities 2406 may constitute a power plant 2400 that may be a combined power generation, transmission, and storage system. The power generated by the wind farm 2402 may be directly fed to the grid 2408 through the transmission facilities 2406, or may be first stored in the LODES system 2404. In certain cases the power supplied to the grid 2408 may come entirely from the wind farm 2402, entirely from the LODES system 2404, or from a combination of the wind farm 2402 and the LODES system 2404. The dispatch of power from the combined wind farm 2402 and LODES system 2404 power plant 2400 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 2400, the LODES system 2404 may be used to reshape and "firm" the power produced by the wind farm 2402. In one such example, the wind farm 2402 may have a peak generation output (capacity) of 260 megawatts (MW) and a capacity factor (CF) of 41%. The LODES system 2404 may have a power rating (capacity) of 106 MW, a rated duration (energy/power ratio) of 150 hours (h), and an energy rating of 15,900 megawatt hours (MWh). In another such example, the wind farm 2402 may have a peak generation output (capacity) of 300 MW and a capacity factor (CF) of 41%. The LODES system 2404 may have a power rating of 106 MW, a rated duration (energy/power ratio) of 200 h and an energy rating of 21,200 MWh. In another such example, the wind farm 2402 may have a peak generation output (capacity) of 176 MW and a capacity factor (CF) of 53%. The LODES system 2404 may have a power rating (capacity) of 88 MW, a rated duration (energy/power ratio) of 150 h and an energy rating of 13,200 MWh. In another such example, the wind farm 2402 may have a peak generation output (capacity) of 277 MW and a capacity factor (CF) of 41%. The LODES system 2404 may have a power rating (capacity) of 97 MW, a rated duration (energy/power ratio) of 50 h and an energy rating of 4,850 MWh. In another such example, the wind farm 2402 may have a peak generation output (capacity) of 315 MW and a capacity factor (CF) of 41%. The LODES system 2404 may have a power rating (capacity) of 110 MW, a rated duration (energy/power ratio) of 25 h and an energy rating of 2,750 MWh.

Figure 25:
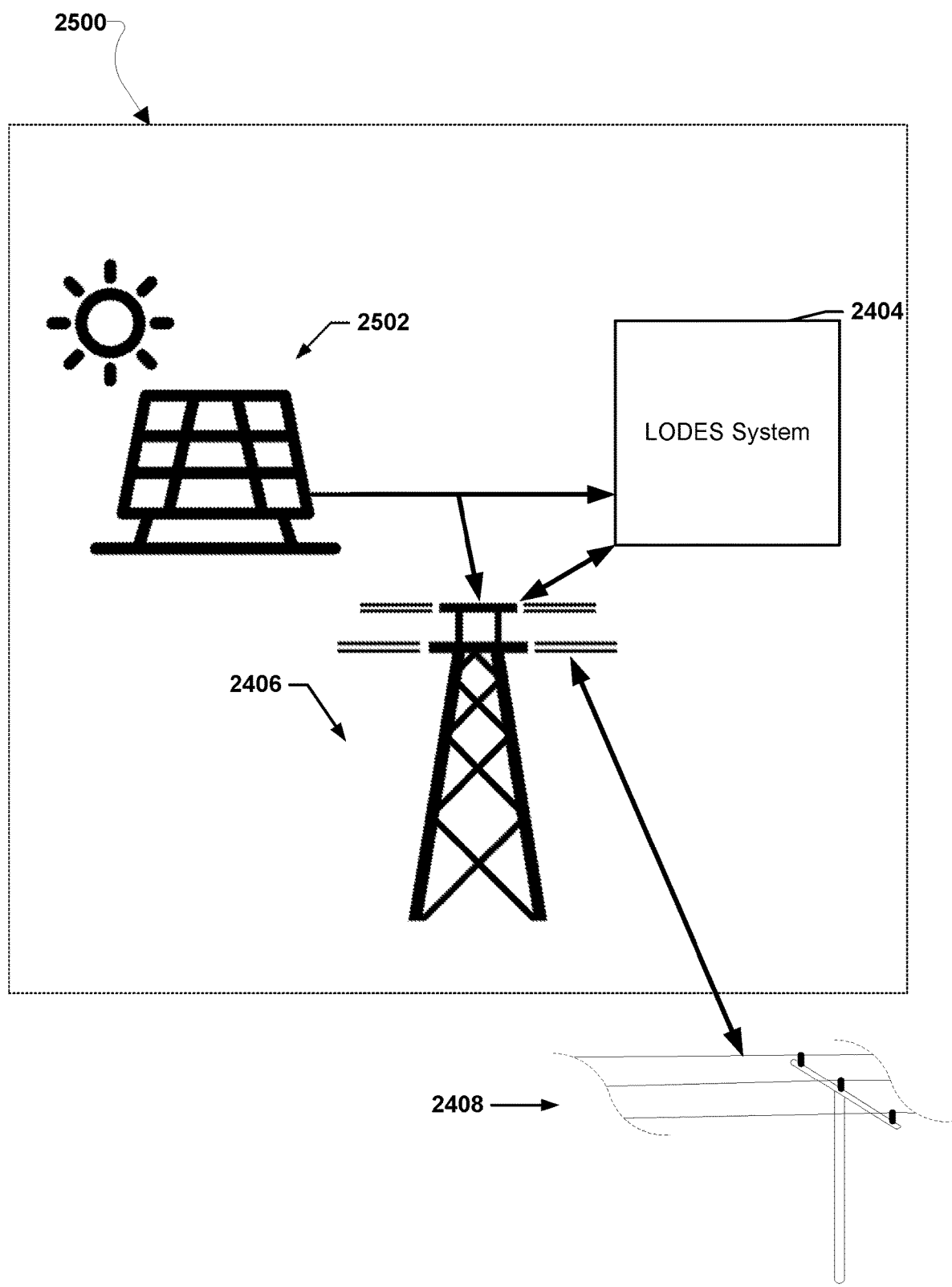

FIG. 25 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The system of FIG. 25 may be similar to the system of FIG. 24, except a photovoltaic (PV) farm 2502 may be substituted for the wind farm 2402. The LODES system 2404 may be electrically connected to the PV farm 2502 and one or more transmission facilities 2406. The PV farm 2502 may be electrically connected to the transmission facilities 2406. The transmission facilities 2406 may be electrically connected to the grid 2408. The PV farm 2502 may generate power and the PV farm 2502 may output generated power to the LODES system 2404 and/or the transmission facilities 2406. The LODES system 2404 may store power received from the PV farm 2502 and/or the transmission facilities 2406. The LODES system 2404 may output stored power to the transmission facilities 2406. The transmission facilities 2406 may output power received from one or both of the PV farm 2502 and LODES system 2404 to the grid 2408 and/or may receive power from the grid 2408 and output that power to the LODES system 2404. Together the PV farm 2502, the LODES system 2404, and the transmission facilities 2406 may constitute a power plant 2500 that may be a combined power generation, transmission, and storage system. The power generated by the PV farm 2502 may be directly fed to the grid 2408 through the transmission facilities 2406, or may be first stored in the LODES system 2404. In certain cases the power supplied to the grid 2408 may come entirely from the PV farm 2502, entirely from the LODES system 2404, or from a combination of the PV farm 2502 and the LODES system 2404. The dispatch of power from the combined PV farm 2502 and LODES system 2404 power plant 2500 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 2500, the LODES system 2404 may be used to reshape and "firm" the power produced by the PV farm 2502. In one such example, the PV farm 2502 may have a peak generation output (capacity) of 490 MW and a capacity factor (CF) of 24%. The LODES system 2404 may have a power rating (capacity) of 340 MW, a rated duration (energy/power ratio) of 150 h and an energy rating of 51,000 MWh. In another such example, the PV farm 2502 may have a peak generation output (capacity) of 680 MW and a capacity factor (CF) of 24%. The LODES system 2404 may have a power rating (capacity) of 410 MW, a rated duration (energy/power ratio) of 200 h, and an energy rating of 82,000 MWh. In another such example, the PV farm 2502 may have a peak generation output (capacity) of 330 MW and a capacity factor (CF) of 31%. The LODES system 2404 may have a power rating (capacity) of 215 MW, a rated duration (energy/power ratio) of 150 h, and an energy rating of 32,250 MWh. In another such example, the PV farm 2502 may have a peak generation output (capacity) of 510 MW and a capacity factor (CF) of 24%. The LODES system 2404 may have a power rating (capacity) of 380 MW, a rated duration (energy/power ratio) of 50 h, and an energy rating of 19,000 MWh. In another such example, the PV farm 2502 may have a peak generation output (capacity) of 630 MW and a capacity factor (CF) of 24%. The LODES system 2404 may have a power rating (capacity) of 380 MW, a rated duration (energy/power ratio) of 25 h, and an energy rating of 9,500 MWh.

Figure 26:
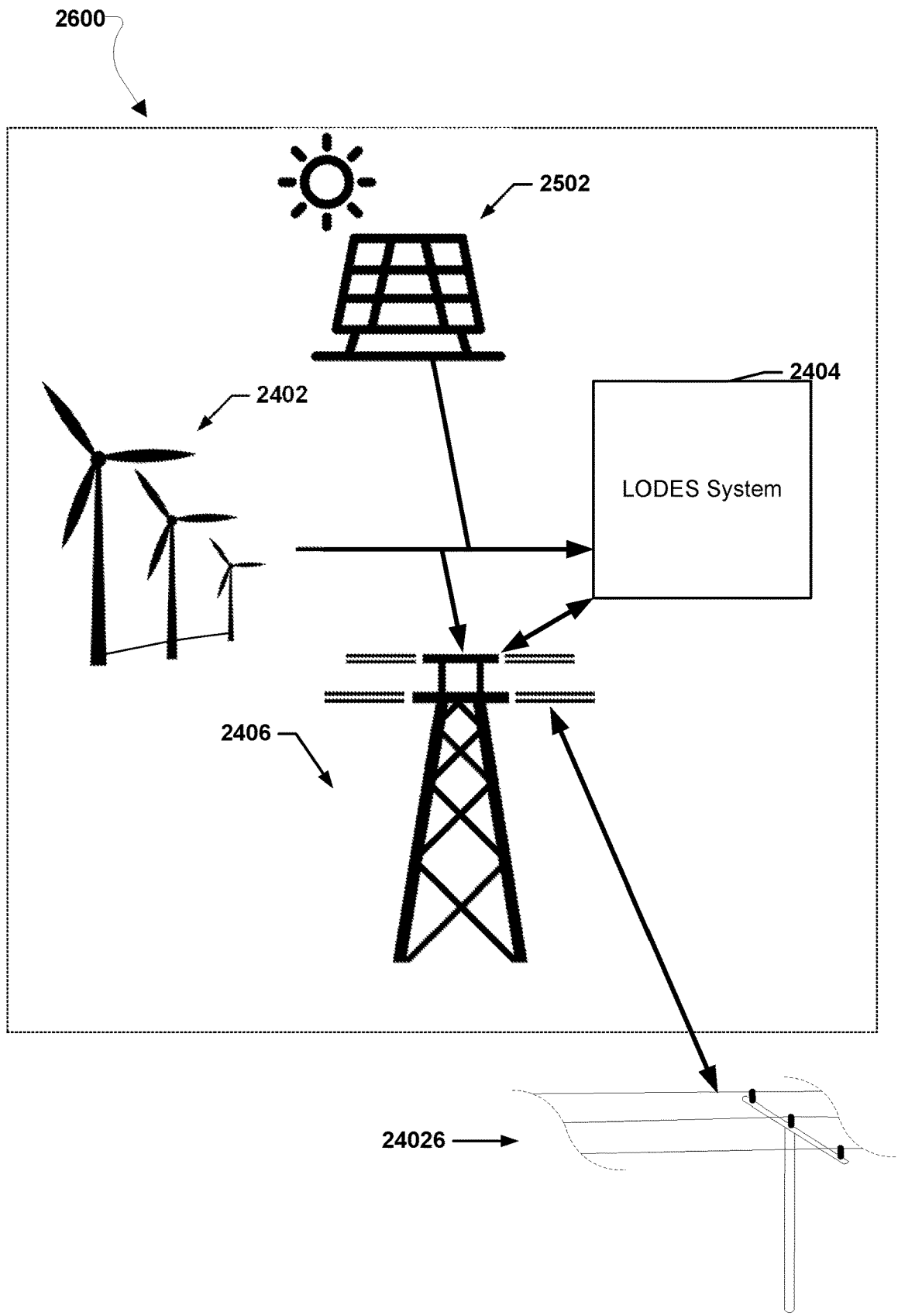

FIG. 26 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The system of FIG. 26 may be similar to the systems of FIGS. 24 and 25, except the wind farm 2402 and the photovoltaic (PV) farm 2502 may both be power generators working together in the power plant 2600. Together the PV farm 2502, wind farm 2402, the LODES system 2404, and the transmission facilities 2406 may constitute the power plant 2600 that may be a combined power generation, transmission, and storage system. The power generated by the PV farm 2502 and/or the wind farm 2402 may be directly fed to the grid 2408 through the transmission facilities 2406, or may be first stored in the LODES system 2404. In certain cases the power supplied to the grid 2408 may come entirely from the PV farm 2502, entirely from the wind farm 2402, entirely from the LODES system 2404, or from a combination of the PV farm 2502, the wind farm 2402, and the LODES system 2404. The dispatch of power from the combined wind farm 2402, PV farm 2502, and LODES system 2404 power plant 2600 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 2600, the LODES system 2404 may be used to reshape and "firm" the power produced by the wind farm 2402 and the PV farm 2502. In one such example, the wind farm 2402 may have a peak generation output (capacity) of 126 MW and a capacity factor (CF) of 41% and the PV farm 2502 may have a peak generation output (capacity) of 126 MW and a capacity factor (CF) of 24%. The LODES system 2404 may have a power rating (capacity) of 63 MW, a rated duration (energy/power ratio) of 150 h, and an energy rating of 9,450 MWh. In another such example, the wind farm 2402 may have a peak generation output (capacity) of 170 MW and a capacity factor (CF) of 41% and the PV farm 2502 may have a peak generation output (capacity) of 110 MW and a capacity factor (CF) of 24%. The LODES system 2404 may have a power rating (capacity) of 57 MW, a rated duration (energy/power ratio) of 200 h, and an energy rating of 11,400 MWh. In another such example, the wind farm 2402 may have a peak generation output (capacity) of 105 MW and a capacity factor (CF) of 51% and the PV farm 2502 may have a peak generation output (capacity) of 70 MW and a capacity factor (CF) of 31 The LODES system 2404 may have a power rating (capacity) of 61 MW, a rated duration (energy/power ratio) of 150 h, and an energy rating of 9,150 MWh. In another such example, the wind farm 2402 may have a peak generation output (capacity) of 135 MW and a capacity factor (CF) of 41% and the PV farm 2502 may have a peak generation output (capacity) of 90 MW and a capacity factor (CF) of 24%. The LODES system 2404 may have a power rating (capacity) of 68 MW, a rated duration (energy/power ratio) of 50 h, and an energy rating of 3,400 MWh. In another such example, the wind farm 2402 may have a peak generation output (capacity) of 144 MW and a capacity factor (CF) of 41% and the PV farm 2502 may have a peak generation output (capacity) of 96 MW and a capacity factor (CF) of 24%. The LODES system 2404 may have a power rating (capacity) of 72 MW, a rated duration (energy/power ratio) of 25 h, and an energy rating of 1,800 MWh.

Figure 27:
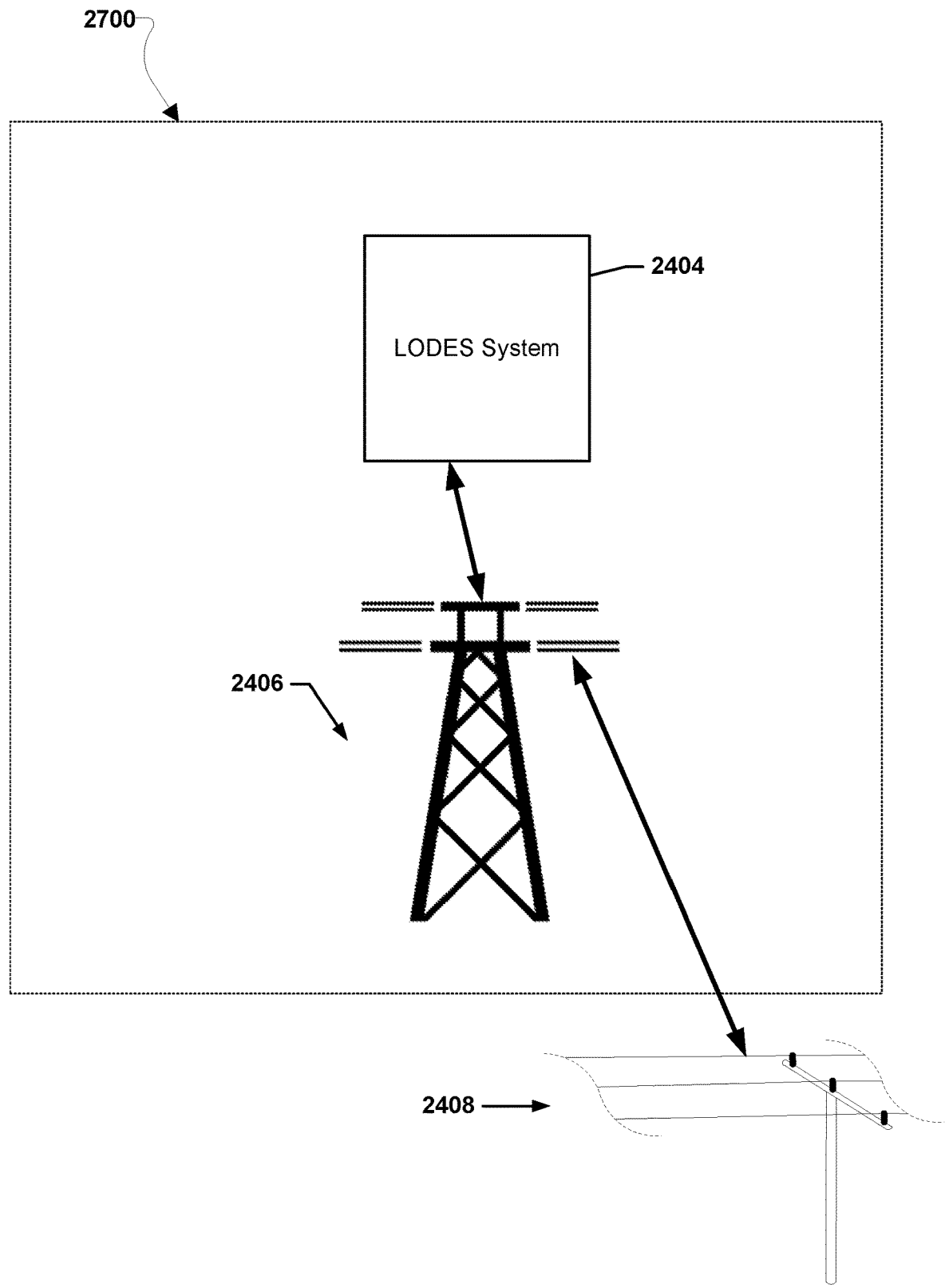

FIG. 27 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be electrically connected to one or more transmission facilities 2406. In this manner, the LODES system 2404 may operate in a "stand-alone" manner to arbiter energy around market prices and/or to avoid transmission constraints. The LODES system 2404 may be electrically connected to one or more transmission facilities 2406. The transmission facilities 2406 may be electrically connected to the grid 2408. The LODES system 2404 may store power received from the transmission facilities 2406. The LODES system 2404 may output stored power to the transmission facilities 2406. The transmission facilities 2406 may output power received from the LODES system 2404 to the grid 2408 and/or may receive power from the grid 2408 and output that power to the LODES system 2404.

Together the LODES system 2404 and the transmission facilities 2406 may constitute a power plant 900. As an example, the power plant 900 may be situated downstream of a transmission constraint, close to electrical consumption. In such an example downstream situated power plant 2700, the LODES system 2404 may have a duration of 24 h to 500 h and may undergo one or more full discharges a year to support peak electrical consumptions at times when the transmission capacity is not sufficient to serve customers. Additionally in such an example downstream situated power plant 2700, the LODES system 2404 may undergo several shallow discharges (daily or at higher frequency) to arbiter the difference between nighttime and daytime electricity prices and reduce the overall cost of electrical service to customer. As a further example, the power plant 2700 may be situated upstream of a transmission constraint, close to electrical generation. In such an example upstream situated power plant 2700, the LODES system 2404 may have a duration of 24 h to 500 h and may undergo one or more full charges a year to absorb excess generation at times when the transmission capacity is not sufficient to distribute the electricity to customers. Additionally in such an example upstream situated power plant 2700, the LODES system 2404 may undergo several shallow charges and discharges (daily or at higher frequency) to arbiter the difference between nighttime and daytime electricity prices and maximize the value of the output of the generation facilities.

Figure 28:
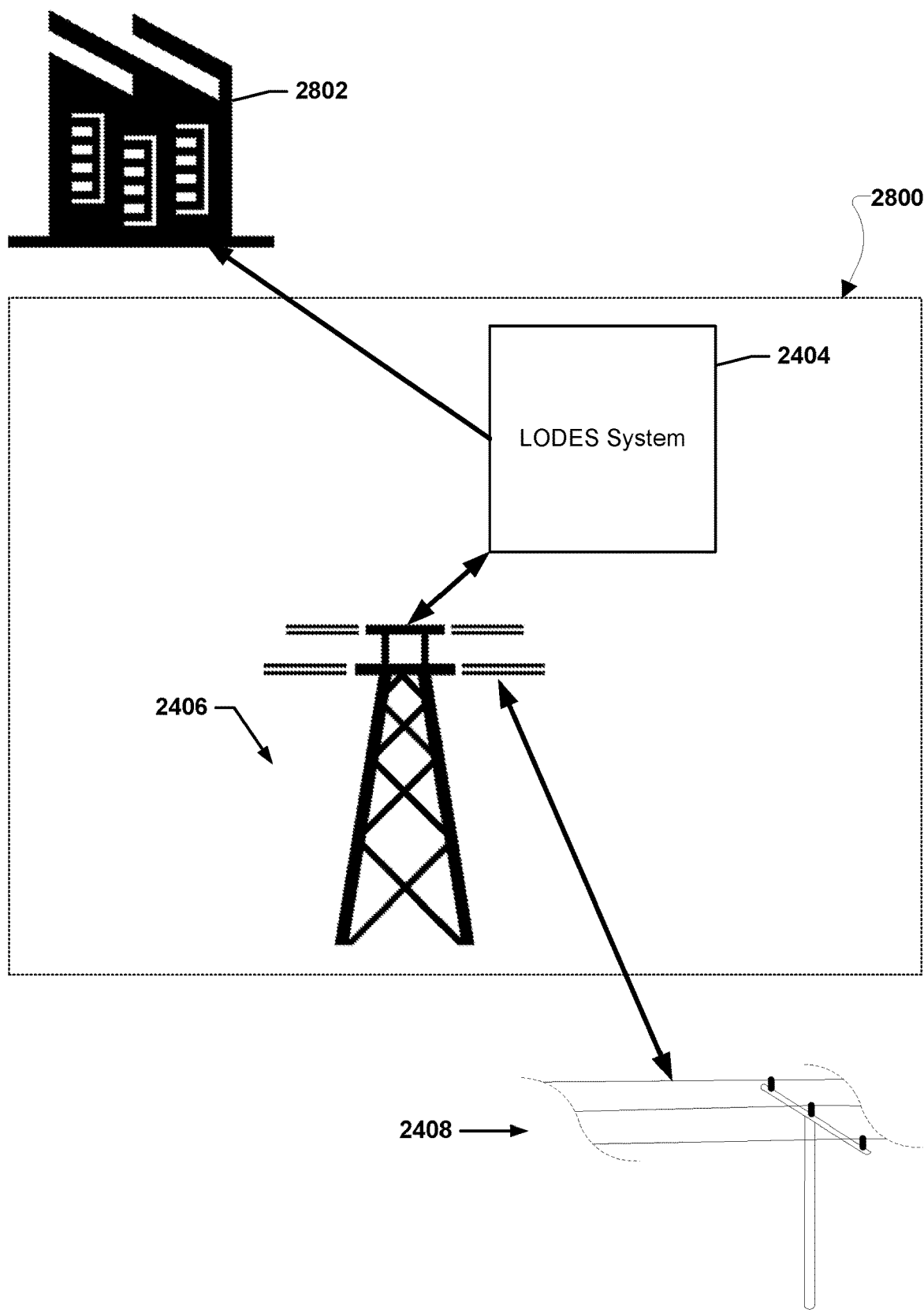

FIG. 28 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be electrically connected to a commercial and industrial (C&I) customer 2802, such as a data center, factory, etc. The LODES system 2404 may be electrically connected to one or more transmission facilities 2406. The transmission facilities 2406 may be electrically connected to the grid 2408. The transmission facilities 2406 may receive power from the grid 2408 and output that power to the LODES system 2404. The LODES system 2404 may store power received from the transmission facilities 2406. The LODES system 2404 may output stored power to the C&I customer 2802. In this manner, the LODES system 2404 may operate to reshape electricity purchased from the grid 2408 to match the consumption pattern of the C&I customer 2802.

Together, the LODES system 2404 and transmission facilities 2406 may constitute a power plant 2800. As an example, the power plant 2800 may be situated close to electrical consumption, i.e., close to the C&I customer 2802, such as between the grid 2408 and the C&I customer 2802. In such an example, the LODES system 2404 may have a duration of 24 h to 500 h and may buy electricity from the markets and thereby charge the LODES system 2404 at times when the electricity is cheaper. The LODES system 2404 may then discharge to provide the C&I customer 2802 with electricity at times when the market price is expensive, therefore offsetting the market purchases of the C&I customer 2802. As an alternative configuration, rather than being situated between the grid 2408 and the C&I customer 2802, the power plant 2800 may be situated between a renewable source, such as a PV farm, wind farm, etc., and the transmission facilities 2406 may connect to the renewable source. In such an alternative example, the LODES system 2404 may have a duration of 24 h to 500 h, and the LODES system 2404 may charge at times when renewable output may be available. The LODES system 2404 may then discharge to provide the C&I customer 2802 with renewable generated electricity so as to cover a portion, or the entirety, of the C&I customer 2802 electricity needs.

Figure 29:
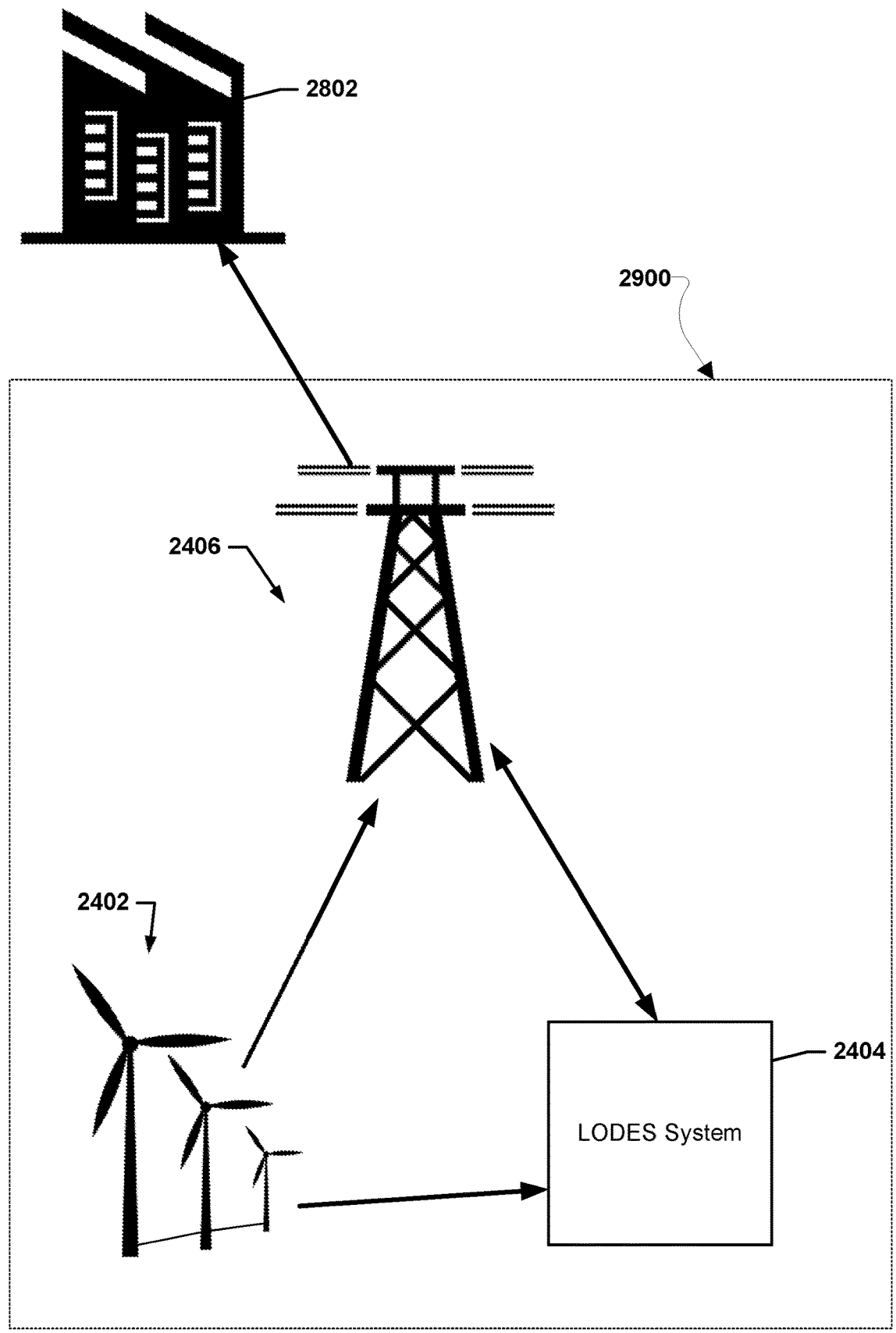

FIG. 29 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be electrically connected to a wind farm 2402 and one or more transmission facilities 2406. The wind farm 2402 may be electrically connected to the transmission facilities 2406. The transmission facilities 2406 may be electrically connected to a C&I customer 2802. The wind farm 2402 may generate power and the wind farm 2402 may output generated power to the LODES system 2404 and/or the transmission facilities 2406. The LODES system 2404 may store power received from the wind farm 2402.

The LODES system 2404 may output stored power to the transmission facilities 2406. The transmission facilities 2406 may output power received from one or both of the wind farm 2402 and LODES system 2404 to the C&I customer 2802. Together the wind farm 2402, the LODES system 2404, and the transmission facilities 2406 may constitute a power plant 2900 that may be a combined power generation, transmission, and storage system. The power generated by the wind farm 2402 may be directly fed to the C&I customer 2802 through the transmission facilities 2406, or may be first stored in the LODES system 2404. In certain cases, the power supplied to the C&I customer 2802 may come entirely from the wind farm 2402, entirely from the LODES system 2404, or from a combination of the wind farm 2402 and the LODES system 2404. The LODES system 2404 may be used to reshape the electricity generated by the wind farm 2402 to match the consumption pattern of the C&I customer 2802. In one such example, the LODES system 2404 may have a duration of 24 h to 500 h and may charge when renewable generation by the wind farm 2402 exceeds the C&I customer 2802 load. The LODES system 2404 may then discharge when renewable generation by the wind farm 2402 falls short of C&I customer 2802 load so as to provide the C&I customer 2802 with a firm renewable profile that offsets a fraction, or all of, the C&I customer 2802 electrical consumption.

Figure 30:
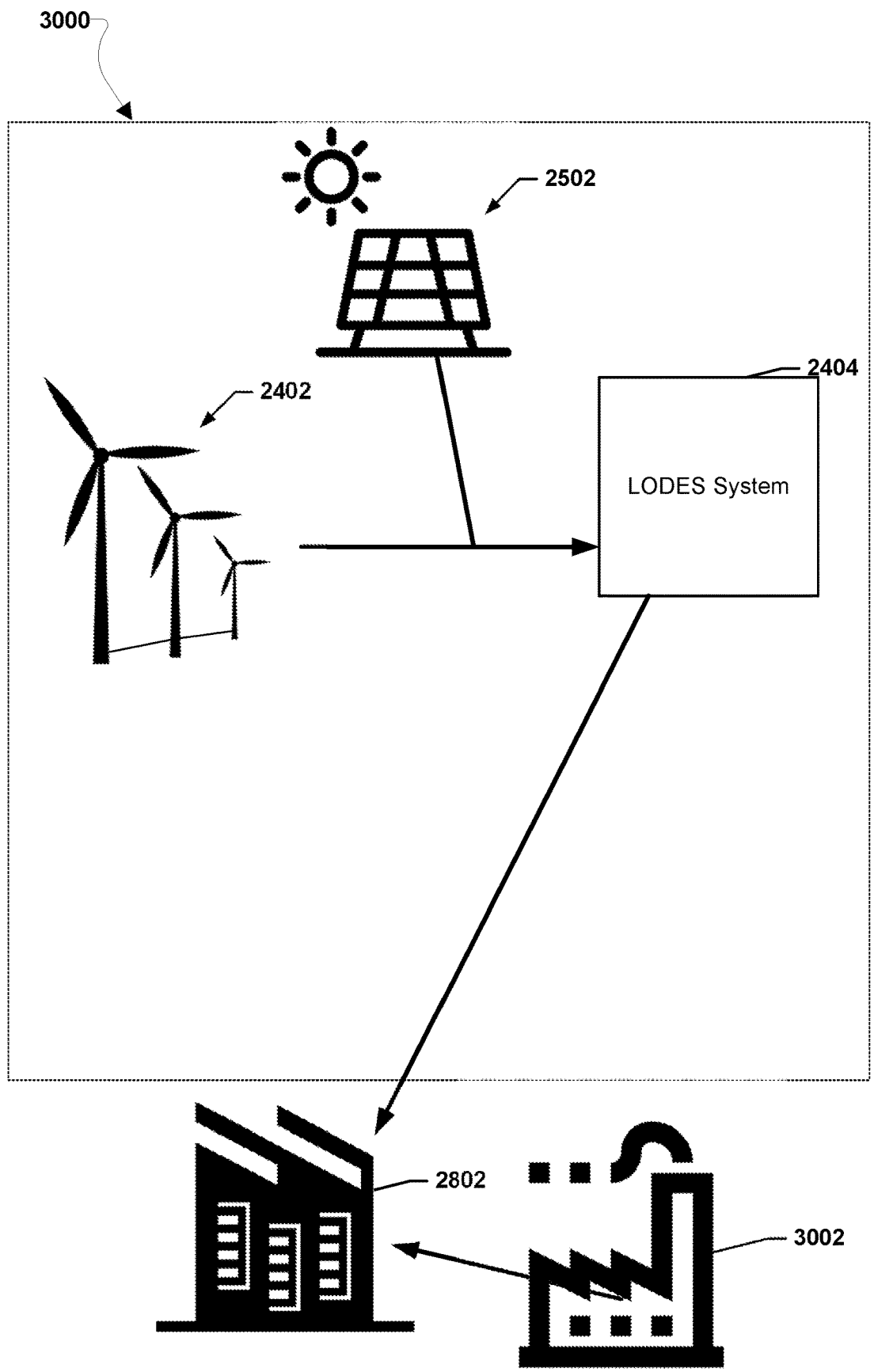

FIG. 30 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be part of a power plant 3000 that is used to integrate large amounts of renewable generation in microgrids and harmonize the output of renewable generation by, for example a PV farm 2502 and wind farm 2402, with existing thermal generation by, for example a thermal power plant 3002 (e.g., a gas plant, a coal plant, a diesel generator set, etc., or a combination of thermal generation methods), while renewable generation and thermal generation supply the C&I customer 2802 load at high availability. Microgrids, such as the microgrid constituted by the power plant 3000 and the thermal power plant 3002, may provide availability that is 90% or higher. The power generated by the PV farm 2502 and/or the wind farm 2402 may be directly fed to the C&I customer 2802, or may be first stored in the LODES system 2404.

In certain cases the power supplied to the C&I customer 2802 may come entirely from the PV farm 2502, entirely from the wind farm 2402, entirely from the LODES system 2404, entirely from the thermal power plant 3002, or from any combination of the PV farm 2502, the wind farm 2402, the LODES system 2404, and/or the thermal power plant 3002. As examples, the LODES system 2404 of the power plant 3000 may have a duration of 24 h to 500 h. As a specific example, the C&I customer 2802 load may have a peak of 100 MW, the LODES system 2404 may have a power rating of 14 MW and duration of 150 h, natural gas may cost S6/million British thermal units (MMBTU), and the renewable penetration may be 58%. As another specific example, the C&I customer 2802 load may have a peak of 100 MW, the LODES system 2404 may have a power rating of 25 MW and duration of 150 h, natural gas may cost S8/MMBTU, and the renewable penetration may be 65%.

Figure 31:
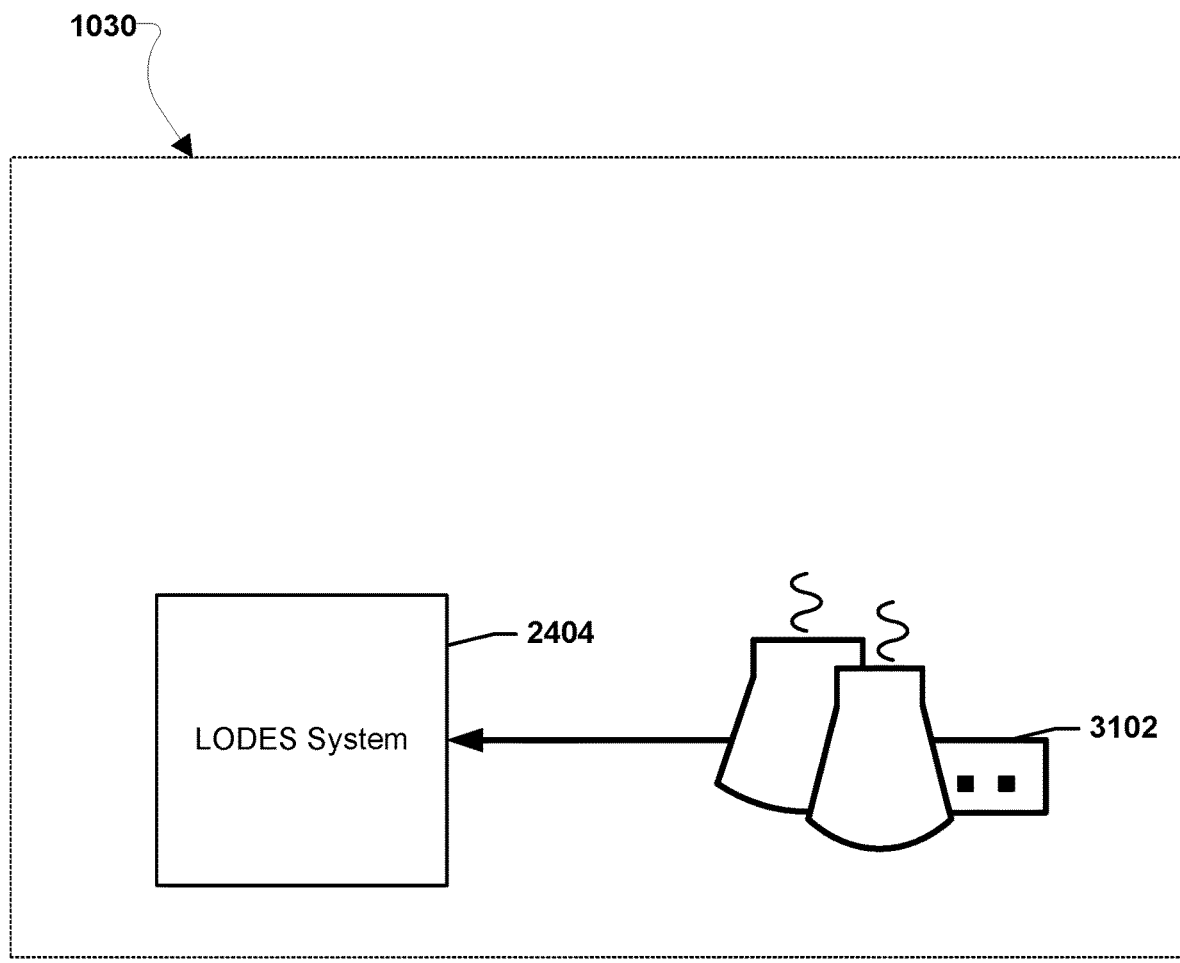

FIG. 31 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may be used to augment a nuclear plant 3102 (or other inflexible generation facility, such as a thermal, a biomass, etc., and/or any other type plant having a ramp-rate lower than 50% of rated power in one hour and a high capacity factor of 80% or higher) to add flexibility to the combined output of the power plant 3100 constituted by the combined LODES system 2404 and nuclear plant 3102. The nuclear plant 3102 may operate at high capacity factor and at the highest efficiency point, while the LODES system 2404 may charge and discharge to effectively reshape the output of the nuclear plant 3102 to match a customer electrical consumption and/or a market price of electricity. As examples, the LODES system 2404 of the power plant 3100 may have a duration of 24 h to 500 h. In one specific example, the nuclear plant 3102 may have 1,000 MW of rated output and the nuclear plant 3102 may be forced into prolonged periods of minimum stable generation or even shutdowns because of depressed market pricing of electricity. The LODES system 2404 may avoid facility shutdowns and charge at times of depressed market pricing; and the LODES system 2404 may subsequently discharge and boost total output generation at times of inflated market pricing.

Figure 32:
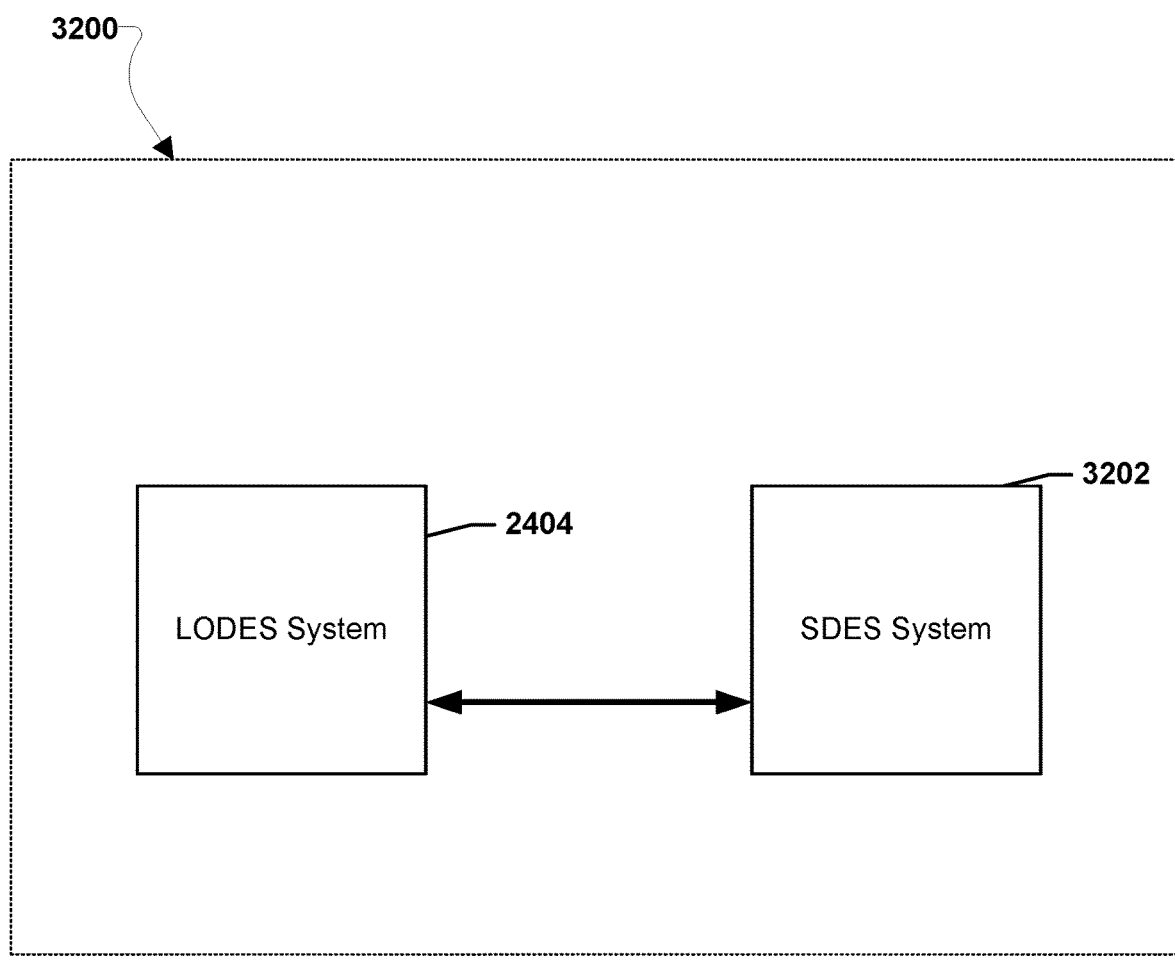

FIG. 32 illustrates an example system in which one or more aspects of the various embodiments may be used as part of bulk energy storage system. As a specific example, the bulk energy storage system incorporating one or more aspects of the various embodiments may be a LODES system 2404. As an example, the LODES system 2404 may include various embodiment batteries described herein, various electrodes described herein, etc. The LODES system 2404 may operate in tandem with a SDES system 3202. Together the LODES system 2404 and SDES system 3202 may constitute a power plant 3200. As an example, the LODES system 2404 and SDES system 3202 may be co-optimized whereby the LODES system 2404 may provide various services, including long-duration back-up and/or bridging through multi-day fluctuations (e.g., multi-day fluctuations in market pricing, renewable generation, electrical consumption, etc.), and the SDES system 3202 may provide various services, including fast ancillary services (e.g. voltage control, frequency regulation, etc.) and/or bridging through intra-day fluctuations (e.g., intra-day fluctuations in market pricing, renewable generation, electrical consumption, etc.). The SDES system 3202 may have durations of less than 10 hours and round-trip efficiencies of greater than 80%. The LODES system 2404 may have durations of 24 h to 500 h and round-trip efficiencies of greater than 40%. In one such example, the LODES system 2404 may have a duration of 150 hours and support customer electrical consumption for up to a week of renewable under-generation. The LODES system 2404 may also support customer electrical consumption during intra-day under-generation events, augmenting the capabilities of the SDES system 3202. Further, the SDES system 3202 may supply customers during intra-day under-generation events and provide power conditioning and quality services such as voltage control and frequency regulation.

Various embodiments may include a battery comprising: a first electrode; an electrolyte; and a second electrode, wherein at least one of the first electrode and the second electrode comprises iron agglomerates. In some embodiments, the electrolyte comprises a soluble sulfide. In some embodiments, at least one of the first electrode and the second electrode further comprises a solid sulfide. In some embodiments, at least one of the first electrode or the second electrode is subjected to a compressive load. In some embodiments, the compressive load is applied on one side of at least one of the first electrode or second electrode by a current collecting member. In some embodiments, the iron agglomerates comprise at least one of magnetite, hematite, or wustite. In some embodiments, the electrolyte comprises a corrosion inhibitor. In some embodiments, the iron agglomerates have an average length ranging from about 50 um to about 50 mm. In some embodiments, the iron agglomerates have an average internal porosity ranging from about 10% to about 90% by volume. In some embodiments, the iron agglomerates have an average specific surface area ranging from about 0.1 $m^2/g$ to about 25 $m^2/g$. In some embodiments, the electrolyte is infiltrated between the iron agglomerates. In some embodiments, the electrolyte comprises 1-octanethiol. In some embodiments, the electrolyte comprises a molybdate anion and a sulfide anion. In some embodiments, the iron agglomerates are supported within a metal textile mesh providing compressive force and current collection for the iron agglomerates. In some embodiments, the iron agglomerates are bonded to one another and bonded to a current collector.

Various embodiments may include a battery comprising: a first electrode; an electrolyte; and a second electrode, wherein at least one of the first electrode and the second electrode comprises atomized metal powder. In some embodiments, the electrolyte comprises a soluble sulfide. In some embodiments, at least one of the first electrode and the second electrode further comprises a solid sulfide. In some embodiments, at least one of the first electrode or the second electrode is subjected to a compressive load. In some embodiments, the compressive load is applied on one side of at least one of the first electrode or second electrode by a current collecting member. In some embodiments, the atomized metal powder comprise at least one of magnetite, hematite, or wustite. In some embodiments, the electrolyte comprises a corrosion inhibitor. In some embodiments, the electrolyte is infiltrated between the atomized metal powder. In some embodiments, the electrolyte comprises 1-octanethiol. In some embodiments, the electrolyte comprises a molybdate anion and a sulfide anion. In some embodiments, the atomized metal powder is supported within a metal textile mesh providing compressive force and current collection for the atomized metal powder. In some embodiments, the atomized metal powder is bonded together and bonded to a current collector.

Various embodiments include a method of making an electrode, comprising: electrochemically producing metal powder; and forming the metal powder into an electrode. In some embodiments, electrochemically producing the metal powder comprises electrochemically producing the metal powder at least in part using a molten salt electrochemistry. In some embodiments, electrochemically producing the metal powder comprises electrochemically producing the metal powder at least in part using gas atomization. In some embodiments, electrochemically producing the metal powder comprises electrochemically producing the metal powder at least in part using water atomization.

Various embodiments may include a bulk energy storage system, comprising: one or more batteries, wherein at least one of the one or more batteries comprises: a first electrode; an electrolyte; and a second electrode, wherein at least one of the first electrode and the second electrode comprises iron agglomerates. In some embodiments, the bulk energy storage system is a long duration energy storage (LODES) system. In some embodiments, the electrolyte comprises a soluble sulfide. In some embodiments, at least one of the first electrode and the second electrode further comprises a solid sulfide. In some embodiments, at least one of the first electrode or the second electrode is subjected to a compressive load. In some embodiments, the compressive load is applied on one side of at least one of the first electrode or second electrode by a current collecting member. In some embodiments, the iron agglomerates comprise at least one of magnetite, hematite, or wustite. In some embodiments, the electrolyte comprises a corrosion inhibitor. In some embodiments, the iron agglomerates have an average length ranging from about 50 um to about 50 mm. In some embodiments, the iron agglomerates have an average internal porosity ranging from about 10% to about 90% by volume. In some embodiments, the iron agglomerates have an average specific surface area ranging from about 0.1 $m^2/g$ to about 25 $m^2/g$. In some embodiments, the electrolyte is infiltrated between the iron agglomerates. In some embodiments, the electrolyte comprises 1-octanethiol. In some embodiments, the electrolyte comprises a molybdate anion and a sulfide anion. In some embodiments, the iron agglomerates are supported within a metal textile mesh providing compressive force and current collection for the iron agglomerates. In some embodiments, the iron agglomerates are bonded to one another and bonded to a current collector.

Various embodiments may include a bulk energy storage system, comprising: one or more batteries, wherein at least one of the one or more batteries comprises: a first electrode; an electrolyte; and a second electrode, wherein at least one of the first electrode and the second electrode comprises atomized metal powder. In some embodiments, the bulk energy storage system is a long duration energy storage (LODES) system. In some embodiments, the electrolyte comprises a soluble sulfide. In some embodiments, at least one of the first electrode and the second electrode further comprises a solid sulfide. In some embodiments, at least one of the first electrode or the second electrode is subjected to a compressive load. In some embodiments, the compressive load is applied on one side of at least one of the first electrode or second electrode by a current collecting member. In some embodiments, the atomized metal powder comprise at least one of magnetite, hematite, or wustite. In some embodiments, the electrolyte comprises a corrosion inhibitor. In some embodiments, the electrolyte is infiltrated between the atomized metal powder. In some embodiments, the electrolyte comprises 1-octanethiol. In some embodiments, the electrolyte comprises a molybdate anion and a sulfide anion. In some embodiments, the atomized metal powder is supported within a metal textile mesh providing compressive force and current collection for the atomized metal powder. In some embodiments, the atomized metal powder is bonded together and bonded to a current collector.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular. Further, any step of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A battery comprising:
    a first electrode;
    an electrolyte comprising a molybdate anion and a sulfide anion; and
    a second electrode,
    wherein at least one of the first electrode and the second electrode comprises iron agglomerates, and wherein the electrolyte is infiltrated between the iron agglomerates.

2. The battery of claim 1, wherein the electrolyte comprises a soluble sulfide.

3. The battery of claim 1, wherein at least one of the first electrode and the second electrode further comprises a solid sulfide.

4. The battery of claim 1, wherein at least one of the first electrode or the second electrode is subjected to a compressive load.

5. The battery of claim 4, wherein the compressive load is applied on one side of at least one of the first electrode or second electrode by a current collecting member.

6. The battery of claim 1, wherein the iron agglomerates comprise at least one of magnetite, hematite, or wustite.

7. The battery of claim 1, wherein the electrolyte comprises a corrosion inhibitor.

8. The battery of claim 1, wherein the iron agglomerates have an average length ranging from about 50 um to about 50 mm.

9. The battery of claim 1, wherein the iron agglomerates have an average internal porosity ranging from about 10% to about 90% by volume.

10. The battery of claim 1, wherein the iron agglomerates have an average specific surface area ranging from about 0.1 $m^2/g$ to about 25 $m^2/g$.

11. The battery of claim 1, wherein the electrolyte comprises 1-octanethiol.

12. The battery of claim 1, wherein the iron agglomerates are supported within a metal textile mesh providing compressive force and current collection for the iron agglomerates.

13. The battery of claim 1, wherein the iron agglomerates are bonded to one another and bonded to a current collector.

14. A bulk energy storage system, comprising:
    one or more batteries, wherein at least one of the one or more batteries comprises:
        a first electrode;
        an electrolyte comprising a molybdate anion, and a sulfide anion; and
        a second electrode,
        wherein at least one of the first electrode and the second electrode comprises iron agglomerates, and wherein the electrolyte is infiltrated between the iron agglomerates.

15. The bulk energy storage system of claim 14, wherein the bulk energy storage system is a long duration energy storage (LODES) system.

16. The bulk energy storage system of claim 14, wherein the electrolyte comprises a soluble sulfide.

17. The bulk energy storage system of claim 14, wherein at least one of the first electrode and the second electrode further comprises a solid sulfide.

18. The bulk energy storage system of claim 14, wherein at least one of the first electrode or the second electrode is subjected to a compressive load.

19. The bulk energy storage system of claim 18, wherein the compressive load is applied on one side of at least one of the first electrode or second electrode by a current collecting member.

20. The bulk energy storage system of claim 14, wherein the iron agglomerates comprise at least one of magnetite, hematite, or wustite.

21. The bulk energy storage system of claim 14, wherein the electrolyte comprises a corrosion inhibitor.

22. The bulk energy storage system of claim 14, wherein the iron agglomerates have an average length ranging from about 50 um to about 50 mm.

23. The bulk energy storage system of claim 14, wherein the iron agglomerates have an average internal porosity ranging from about 10% to about 90% by volume.

24. The bulk energy storage system of claim 14, wherein the iron agglomerates have an average specific surface area ranging from about 0.1 m²/g to about 25 m²/g.

25. The bulk energy storage system of claim 14, wherein the electrolyte comprises 1-octanethiol.

26. The bulk energy storage system of claim 25, wherein the iron agglomerates are supported within a metal textile mesh providing compressive force and current collection for the iron agglomerates.

27. The bulk energy storage system of claim 25, wherein the iron agglomerates are bonded to one another and bonded to a current collector.

\* \* \* \* \*